United States Patent
Nakai et al.

[11] Patent Number: 6,094,281
[45] Date of Patent: *Jul. 25, 2000

[54] IMAGE READING DEVICE WITH OFFSET FACES FOR VISIBLE AND NON-VISIBLE LIGHT SENSORS

[75] Inventors: Takehiko Nakai, Tokyo; Hiroshi Tanioka; Shinobu Arimoto, both of Yokohama; Kazuo Yoshinaga, Machida; Toshio Hayashi, Kawasaki; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/944,418

[22] Filed: Oct. 6, 1997

Related U.S. Application Data

[63] Continuation of application No. 08/174,453, Dec. 28, 1993, abandoned.

[30] Foreign Application Priority Data

| Jan. 1, 1993 | [JP] | Japan | 5-015087 |
| Jan. 1, 1993 | [JP] | Japan | 5-015088 |
| Jan. 1, 1993 | [JP] | Japan | 5-015093 |
| Jan. 1, 1993 | [JP] | Japan | 5-015094 |

[51] Int. Cl.$^7$ ................................. H04N 1/54
[52] U.S. Cl. .................. 358/512; 358/514; 358/530; 250/208.1
[58] Field of Search .................. 358/447, 461, 358/482, 483, 443, 448, 511, 515, 529, 530; 382/140, 212, 274; 348/29, 33; 359/350–353, 356; 250/208.1; 399/32; H04N 1/54

[56] References Cited

U.S. PATENT DOCUMENTS

| 4,146,792 | 3/1979 | Stenzel et al. ........... 250/365 |
| 4,279,000 | 7/1981 | Fukuda et al. . |
| 4,451,521 | 5/1984 | Kaule et al. ........... 428/199 |
| 4,598,205 | 7/1986 | Kaule et al. ........... 250/458.1 |
| 4,763,189 | 8/1988 | Komatsu et al. . |
| 4,791,469 | 12/1988 | Ohmi et al. ........... 357/30 |
| 5,140,411 | 8/1992 | Haneda et al. . |
| 5,172,220 | 12/1992 | Beis . |
| 5,197,105 | 3/1993 | Uemura et al. . |
| 5,357,354 | 10/1994 | Matsunawa et al. ........... 358/530 |
| 5,453,611 | 9/1995 | Oozu et al. . |
| 5,471,281 | 11/1995 | Hayashi et al. . |
| 5,481,334 | 1/1996 | Arimoto et al. . |
| 5,617,187 | 4/1997 | Hayashi et al. . |
| 5,724,152 | 3/1998 | Hayashi et al. ........... 358/296 |
| 5,801,373 | 9/1998 | Oozu et al. ........... 358/514 |
| 5,929,432 | 7/1999 | Yamakawa ........... 358/514 |

FOREIGN PATENT DOCUMENTS

| 382549 | 8/1990 | European Pat. Off. . |
| 2-191798 | 7/1990 | Japan . |
| 4-034348 | 2/1992 | Japan . |
| 4-286350 | 10/1992 | Japan . |
| 6-205161 | 7/1994 | Japan . |
| 7-023176 | 1/1995 | Japan . |
| 7-123205 | 5/1995 | Japan . |
| 81/03510 | 12/1981 | WIPO . |
| 91/03031 | 3/1991 | WIPO . |

*Primary Examiner*—Kim Yen Vu
*Attorney, Agent, or Firm*—Fitzpatrick, Cella, Harper & Scinto

[57] ABSTRACT

This invention provides an image reading device capable of precise detection of the optical signal over a wide wavelength range, by forming a photoelectric converting unit for converting the visible light into an electrical signal and a photoelectric converting unit for converting the invisible light into an electrical signal, in monolithic manner on a single semiconductor chip.

19 Claims, 50 Drawing Sheets

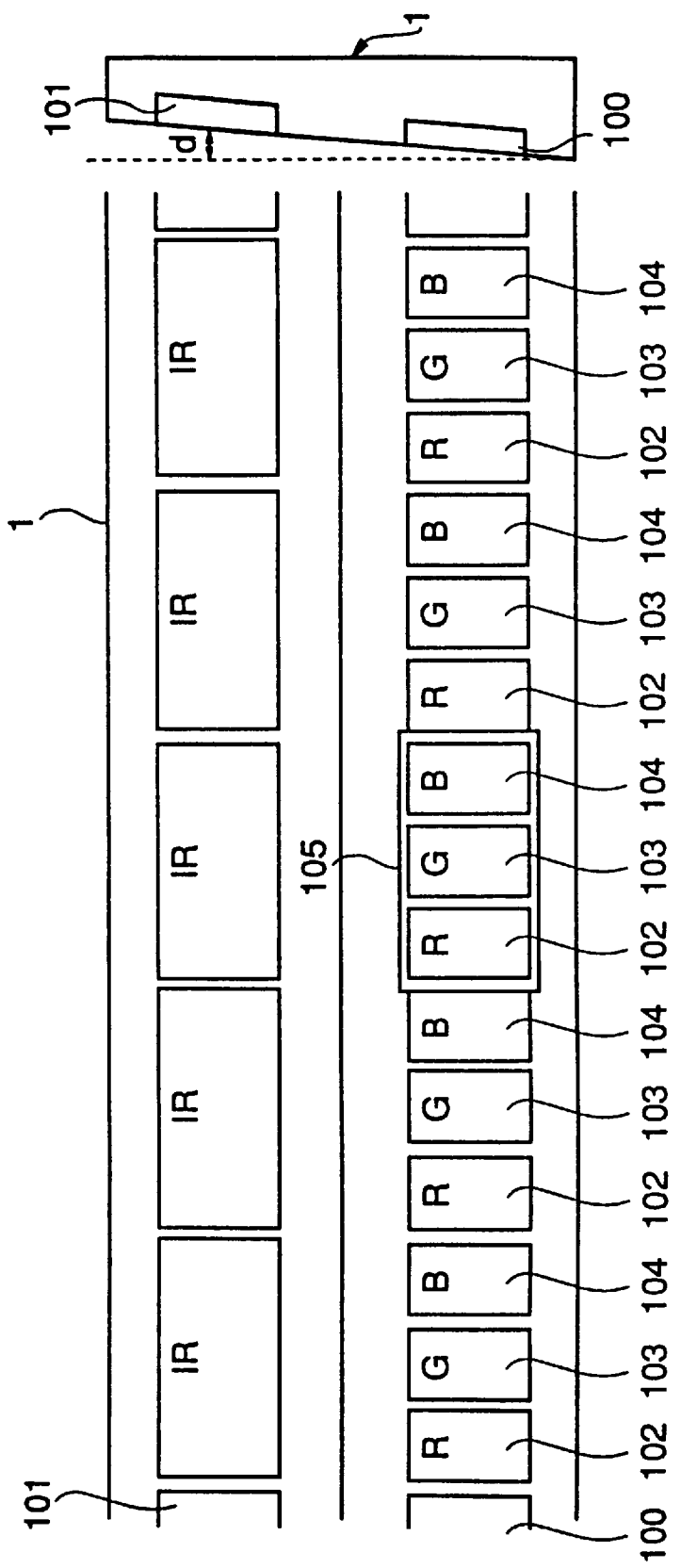

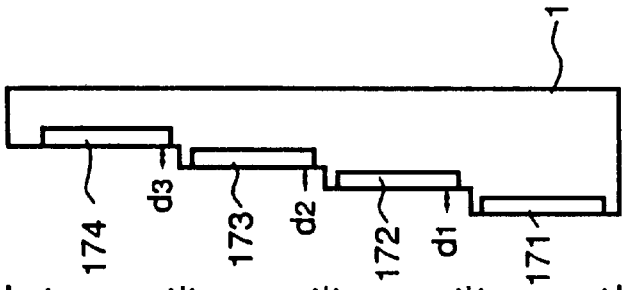
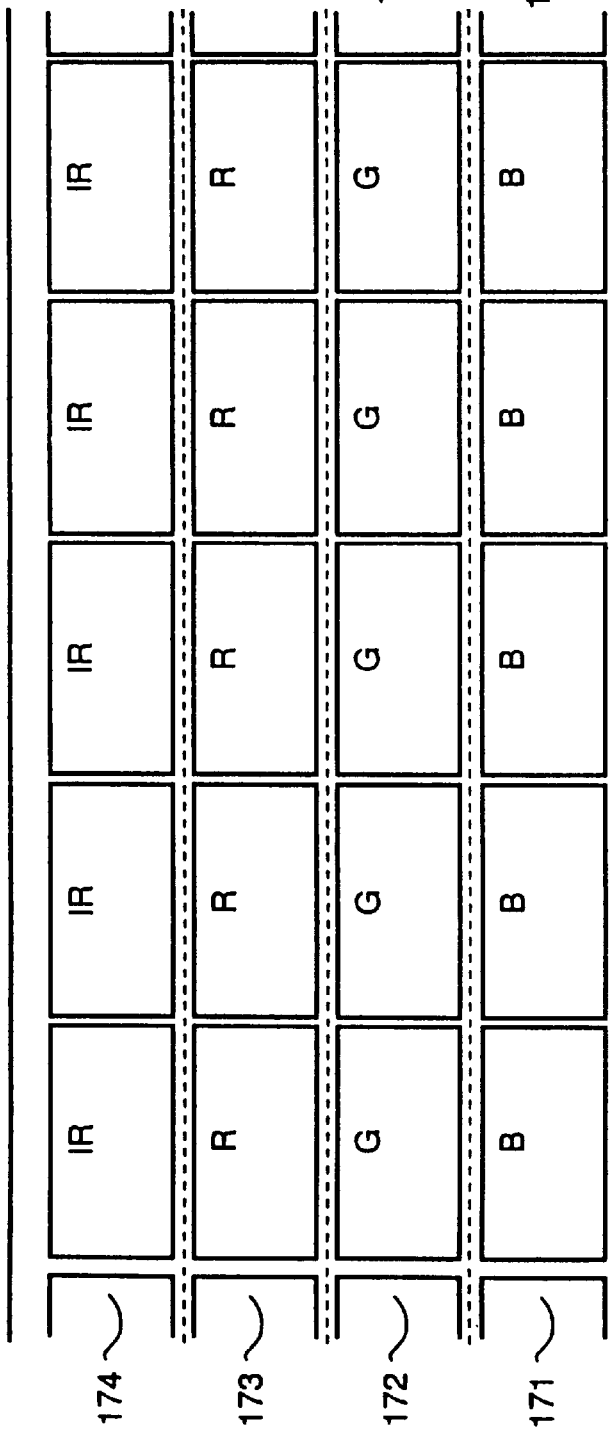

IMAGE READING DEVICE WITH OFFSET FACES FOR VISIBLE AND NON-VISIBLE LIGHT SENSORS

This application is a continuation, of application Ser. No. 08/174,453 filed Dec. 28, 1993, now abandoned.

BACKGROUND OF THE INVENTION

1. Field of the Invention

The present invention relates to an image reading device adapted for use in an image information processing apparatus such as a facsimile, an image scanner, a copying machine or the like, and more particularly to an image reading device and a photoelectric converting element capable of converting optical signal not only of visible spectral region but also of invisible spectral region into electrical signal.

2. Related Background Art

In the field of image reading device, there are already known a charge-coupled device (CCD), a MOS device and an amplifying device formed by connecting a capacitative load to the emitter of a phototransistor, as disclosed in the U.S. Pat. No. 4,791,469 granted to the inventors T. Ohmi and N. Tanaka.

Also there are recently conceived various applications, and image reading devices having novel functions are being required.

For example the copying machine is required, in addition to the improvement in image quality and the color image reproduction, to have the ability to recognize, reproduce and record an invisible image to the human eyes.

An example of such invisible image is the image formed with ink absorbing infrared light.

In general, the sensor for detecting the invisible light is an individual device, and requires a new design concept for effecting image detection, in combination with a sensor for detecting the visible light.

As a basic design concept, the present inventors already found a technology of incorporating a sensor for visible light detection and a sensor for invisible light detection in a single semiconductor chip. However, said technology still has a room for improvement.

On the other hand, the image quality improvement and the color copying capability of the copying machine has brought the danger of forgery of banknotes, stamps, valuable securities etc. into reality. For this reason, in the recognition of banknote or the like, there have been devised various methods such as detection of the stamp pattern on the banknote.

Also utilizing the fact that the pattern of the original image is formed with certain color hues, the present applicant already proposed a method of recognizing the banknote etc. from the color hue of said original pattern.

Also certain banknotes enable recognition of the true one and the false one, by printing a predetermined mark with fluorescent ink which emits visible light when irradiated with ultraviolet light.

Also for forming such predetermined mark, the use of ink capable of absorbing infrared light was also proposed by the present applicant.

In such infrared light detecting device, the Japanese Patent Application Laid-open No. 4-286350 of which U.S. counterpart is U.S. Ser. No. 139174 entitled "Image Processing Apparatus and Method Therefore" filed on Oct. 21, 1993 proposing to achieve making compact of the device and easy optical adjustment by a monolithic structure of a sensor for ordinary color image formation and a sensor for infrared light detection, thereby enabling to use a common optical system.

However, such conventional system is difficult to design in common for plural valuable securities, because a visible pattern is the target of recognition. Therefore, for distinguishing the valuable securities of N kinds, it has been necessary to select the features of N kinds in advance and to independently recognize each security, and it has been difficult to realize such apparatus inexpensively.

Also a CCD sensor for reading the images of visible and infrared regions by separating the spectral regions additionally requires, in comparison with the conventional sensor, an optical filter for reading the infrared light and an increased number of elements or lines of the sensor, whereby the sensor itself and the post-processing system therefor become complex and a decrease in the light-receiving area of the sensor or an increase in the size of the sensor is unavoidable.

Also, since the sensor elements for the visible light and those for the infrared light are arranged on a same plane, at least one of the sensors may become out of focus, due to the difference in the focus position.

Also in case of using such sensors for respectively reading the infrared information and the visible information, it becomes necessary to clearly separate the visible information and other information.

Furthermore, for obtaining a satisfactory resolving power on a monolithic CCD sensor over a wide spectral range from visible to near-infrared region or from visible to near-ultraviolet region, there is required a significantly increased number of lenses, leading to an increased cost and a larger space of the device. Also in an optical system employing a short-focus lens array, it has been impossible to maintain a constant resolving power over a wide spectral range, because such lens array is composed of single lenses.

Also the conventional image reading device employed in the office equipment such as copying machine is composed for example of a CCD or a MOS sensor requiring a long optical path, or a contact image sensor employing amorphous silicon, and such image reading device is sometimes combined with color filters for the color image reproduction.

However, such photoelectric converting device combined with filters is not necessarily superior, in terms of spectral sensitivity and resolving power for infrared light detection, to the device for visible light detection, and still has a room for improvement.

SUMMARY OF THE INVENTION

In consideration of the foregoing, the object of the present invention is to provide a compact image reading device capable of detecting the optical signal over a wide spectral range from visible to invisible region, and not giving much burden on the designing of the optical system.

The above-mentioned object can be attained, according to an embodiment of the present invention, by an image reading device in which the light-receiving face of a first sensor for converting the optical signal of the visible region into a first electrical signal and that of a second sensor for converting the optical signal of the invisible region into a second electrical signal are provided in different positions with respect to the incident direction of light.

According to another embodiment, there is provided an image reading device comprising reading means in which the light-receiving face of a first sensor for converting the optical signal of the visible region into a first electrical signal and that of a second sensor for converting the optical signal of the invisible region into a second electrical signal are provided in different positions with respect to the incident direction of light, image forming means for forming an image based on said first electrical signal, discrimination means for effecting discrimination based on said second electrical signal and a reference signal, and control means for controlling the function of said image forming means based on the output of said discrimination means.

This embodiment enables highly precise image reading over a wide spectral range, since the light-receiving face of the visible light sensor and that of the invisible light sensor can be independently positioned at optimum conditions.

Still another embodiment of the present invention provides an image reading device for secure recognition of a specified original image.

Still another embodiment of the present invention enables reading of the original image in the visible light region and the infrared region, inexpensively and securely in a simple configuration.

The above-mentioned object can be attained, in said embodiments, by an image reading device provided with means for recognizing that an object pixel is a specified image, based on the image information in the visible region and that in the infrared region, in the position of the object pixel and in the positions of the pixels in the vicinity, wherein the image information of said visible region and infrared region are read by common use of a same image reading sensor or a part thereof, by switching an optical filter for limiting the absolute light amount or a specified spectral region.

Also there is provided an image reading device provided with means for recognizing that an object pixel is a specified image, based on the image information in the visible region and that in the infrared region, in the object pixel and in the pixels in the vicinity, comprising a switchable optical distance correcting filter for correcting the difference in the focus position between said visible region and infrared region.

Still another embodiment of the present invention provides an image reading device capable of satisfactorily reading the light of visible region and that of an invisible region.

The image reading device of this embodiment comprises a filter for intercepting the invisible light only between a sensor for reading the visible information and the original image, in reading the visible and invisible information by focusing on a solid-state image sensors formed in monolithic manner on a same substrate.

Also there is provided means for correcting the difference in focus position between the visible and invisible information, in reading the visible and invisible information by focusing on a solid-state image sensors formed in monolithic manner on a same substrate.

Still another embodiment of the present invention provides a photoelectric converting device improved in spectral sensitivity and resolving power.

According to this embodiment, there is provided a photoelectric converting device for converting the optical signal of infrared region into an electrical signal, comprising a photoelectric converting element for converting the optical signal of visible region into an electrical signal, and infrared-visible light conversion means for selectively generating an optical signal of visible region to irradiate said photoelectric converting element, based on the optical signal of infrared region.

An electrical signal improved in spectral sensitivity and resolving power can be obtained by detecting the visible light generated according to the intensity or the presence or absence of the infrared light, instead of the conventional selective detection of the infrared light within a wide spectral range covering from the visible to infrared region.

BRIEF DESCRIPTION OF THE DRAWINGS

FIGS. 9A and 9B are schematic views of an embodiment 1-2 of the image reading device of the present invention;

FIGS. 10A and 10B are schematic views of an embodiment 1-3 of the image reading device of the present invention;

DETAILED DESCRIPTION OF THE PREFERRED EMBODIMENTS

The image reading device of the present invention is featured by a fact that the light-receiving face of the sensor for visible light and that of the sensor for invisible light are made respectively different for the direction of the incident light, but the planar positions (positions in a plane perpendicular to the incident direction) of said sensors are not particularly limited. However, in case of a lineosensor, the sensor array for visible light and that for invisible light are preferably constructed as separate lines. Also in the sensor array for visible light, the sensor elements for red (R), green (G) and blue (B) or the sensor elements for yellow (Y), cyan (C) and magenta (M) may be positioned in an in-line arrangement or may be arranged to constitute three parallel lines.

Figure 1:
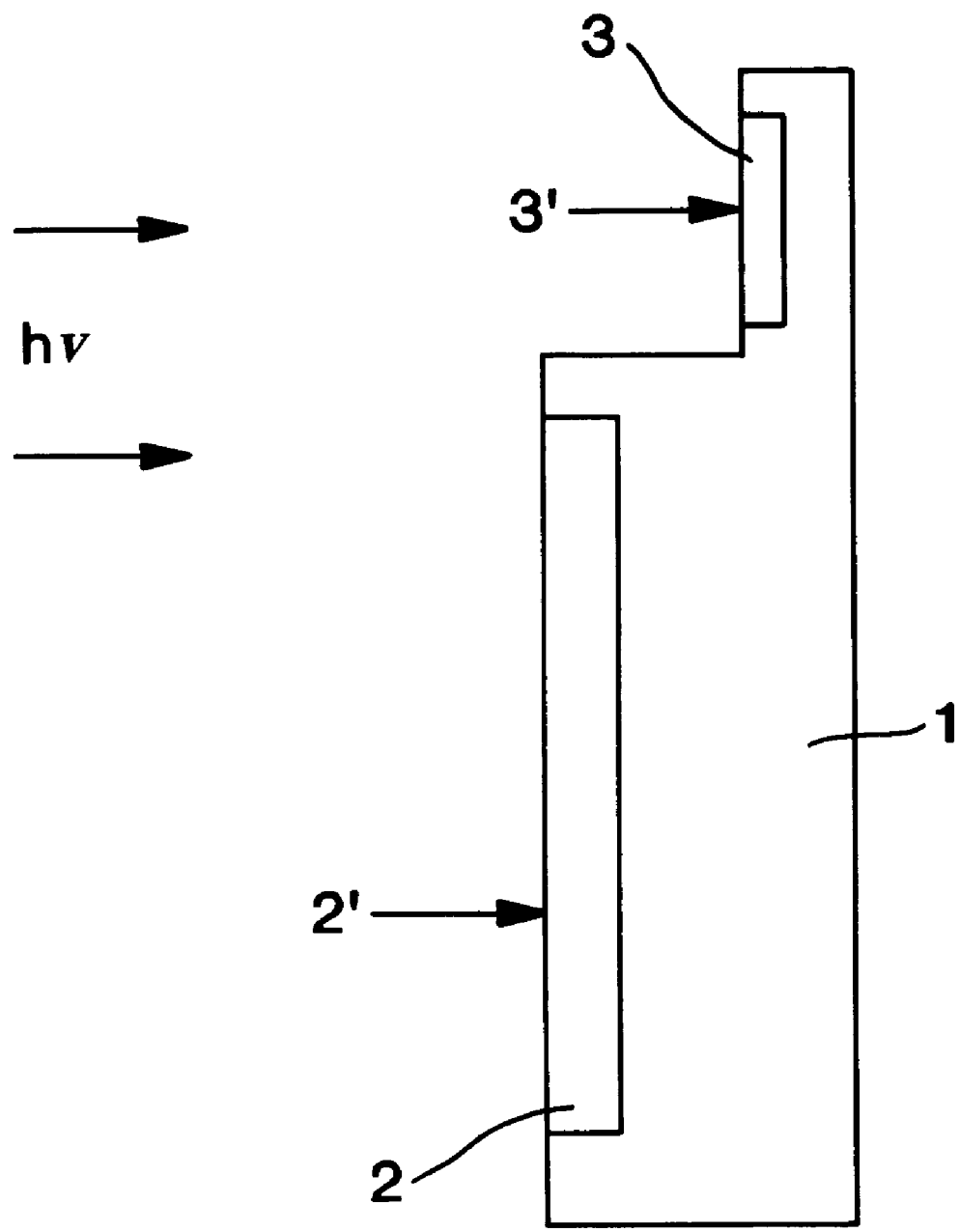
FIG. 1 is a schematic cross-sectional view of an embodiment 1-1 of the image reading device of the present invention.

FIG. 1 is a schematic cross-sectional view of the image reading device of the present invention, wherein a sensor 2 for visible light has a light-receiving face 2' which is different from that 3' of a sensor 3 for invisible light.

The photoelectric converting elements (sensor elements) constituting the light-receiving face of the present invention are advantageously composed of photo-voltaic elements or photoconductive elements such as photodiodes or phototransistors. The photoelectric converting elements for converting the optical signal of the visible region into the electric signal may be constituted by the elements composed of a material capable of selectively absorbing the optical signal of the visible region only, or by the elements provided with a filter capable of transmitting the light of visible region but intercepting the light of a spectral region to be utilized for photoelectric conversion in other photoelectric converting elements, among the invisible region.

More specifically, for obtaining a black-and-white signal, there is attained selective sensitivity in the visible wavelength region from 400 to 700 nm, by selecting the material constituting said elements or by providing the elements with a filter selectively transmitting the light of the above-mentioned wavelength region. Also the optical signal of a specified region within the visible spectral region may be obtained by constructing said elements with a material selectively having sensitivity in said specified region, or by providing the elements with a filter capable of transmitting the light of said specified spectral region.

Also for obtaining color signals, such as of red (R), green (G) and blue (B), there are employed elements of plural kinds, consisting of elements (R elements) having selective sensitivity in the R region (spectral region for example from 580 to 700 nm), elements (G elements) having selective sensitivity in the G region (spectral region for example from 480 to 580 nm), and elements (B elements) having selective sensitivity in the B region (spectral region for example from 400 to 480 nm).

Also in this case, there may be employed elements composed of materials having selective sensitivities in, namely capable of selectively absorbing the lights of the above-mentioned R, G and B regions, or provided elements having sensitivity in all the R, G and B regions with filters selectively transmitting the lights of said R, G and B regions respectively.

Alternatively, a position of a semiconductor junction such as a PN junction of the photodiode or the phototransistor may be varied to obtain a selective sensitivity.

Figure 2:
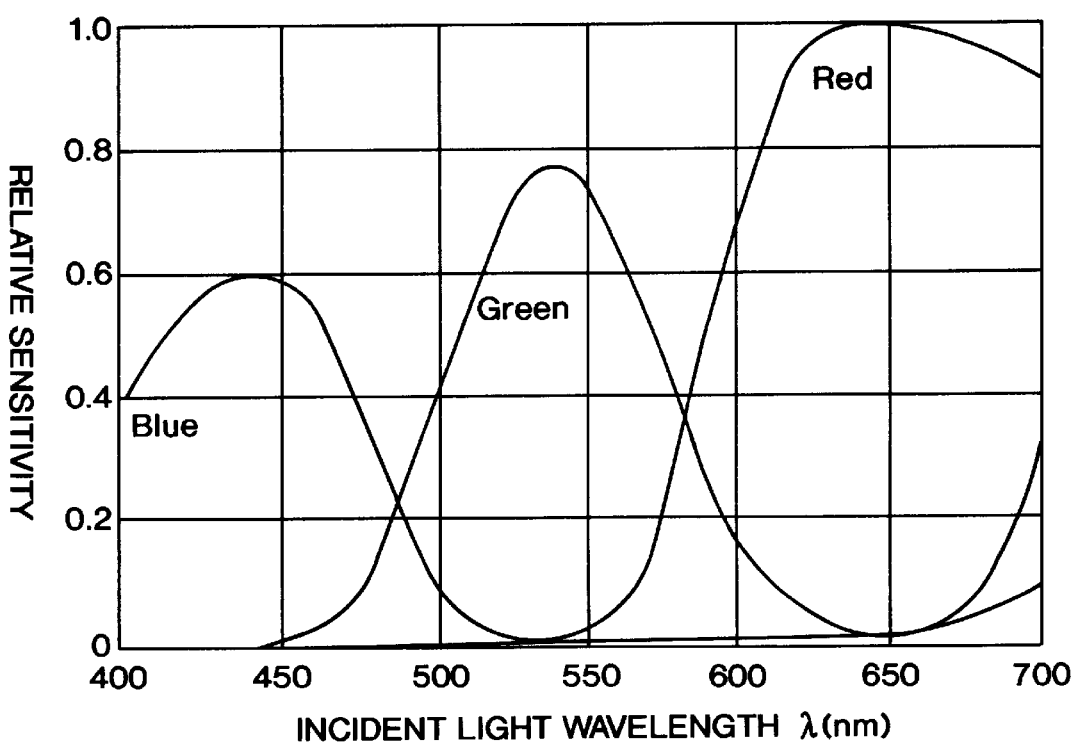
FIG. 2 is a chart showing spectral characteristics of color filters to be employed in the present invention.

FIG. 2 is a chart showing the representative spectral characteristics of the light transmitted by the filters, wherein the relative sensitivity in the ordinate corresponds to the transmittance for the visible light. In case the elements are given the selective sensitivities by the selection of the constituting materials, the elements are formed with the materials having the light absorbing characteristics corresponding to the relative sensitivities shown in FIG. 2.

In the present invention, any of the visible and invisible spectral regions, and the R, G and B spectral regions are not clearly distinguished by the wavelength, but the photoelectric converting elements to be employed therein need only to be so constructed as to photoelectrically convert the ultraviolet, blue, green, red and/or infrared lights by a necessary amount and substantially not to convert the unnecessary lights, in order to obtain the required signals.

On the other hand, for converting the optical signal of the invisible spectral region into the electrical signal, there are employed cphotoelectric converting elements having selective sensitivity for example for the ultraviolet light or the infrared light. Also in this case there may be employed elements composed of a material having selective sensitivity in said invisible spectral region, or elements composed of a material having sensitivity in a wide spectral range including said invisible spectral region, composed with a filter having selective transmittance for the light of said invisible spectral region.

Figure 3:
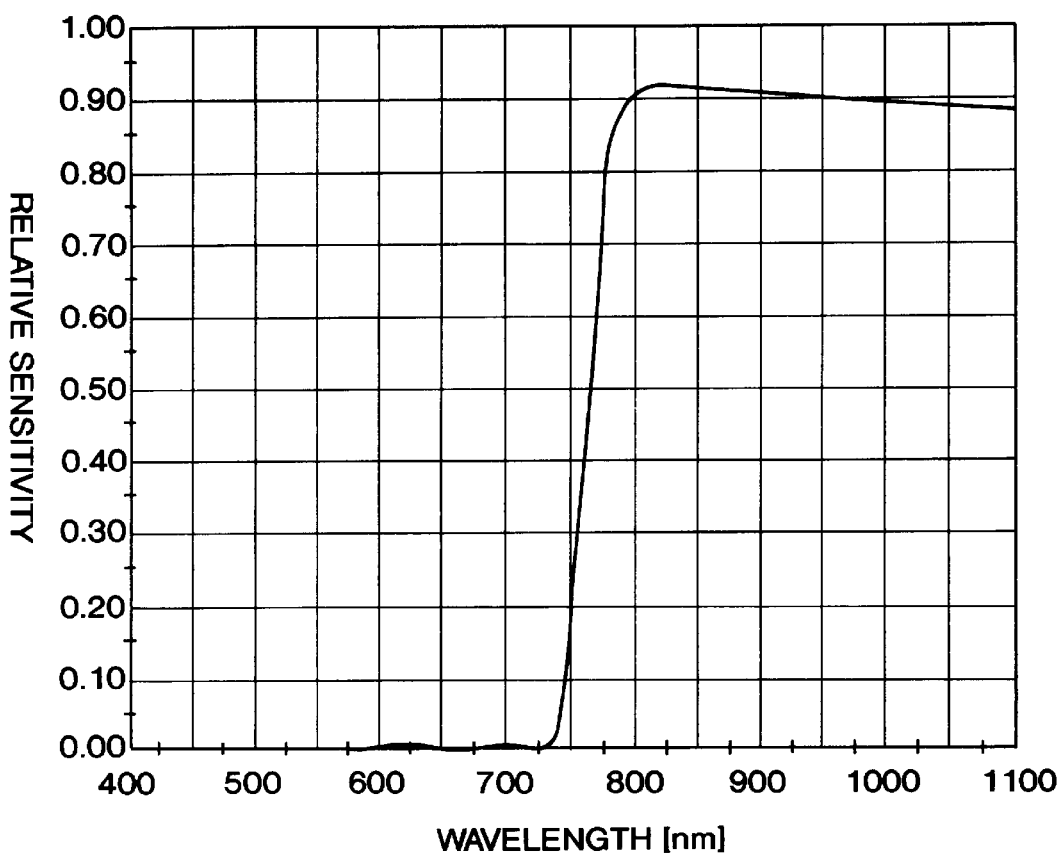
FIG. 3 is a chart showing spectral characteristics of a visible light cut-off filter to be employed in the present invention.

FIG. 3 is a chart showing representative spectral characteristics of the above-mentioned filter, wherein the relative sensitivity in the ordinate corresponds to the transmittance for the invisible light. There is shown an example of filter having selective sensitivity in the infrared region (wavelength region for example above 750 nm), but such example is not limitative.

The solid-state image reading device of the present invention may be constructed as a color line sensor as shown in FIG. 1, in which the elements for visible light and those for invisible light are periodically arranged in mutually separate lines. Preferably it is so constructed that a pixel in terms of the resolving power of the color signal contains an element (R element) having selective sensitivity in the R region, an element (G element) having selective sensitivity in the G region, an element (B element) having selective sensitivity in the B region, and an element (IR element) having selective sensitivity in the invisible region.

Figure 4:
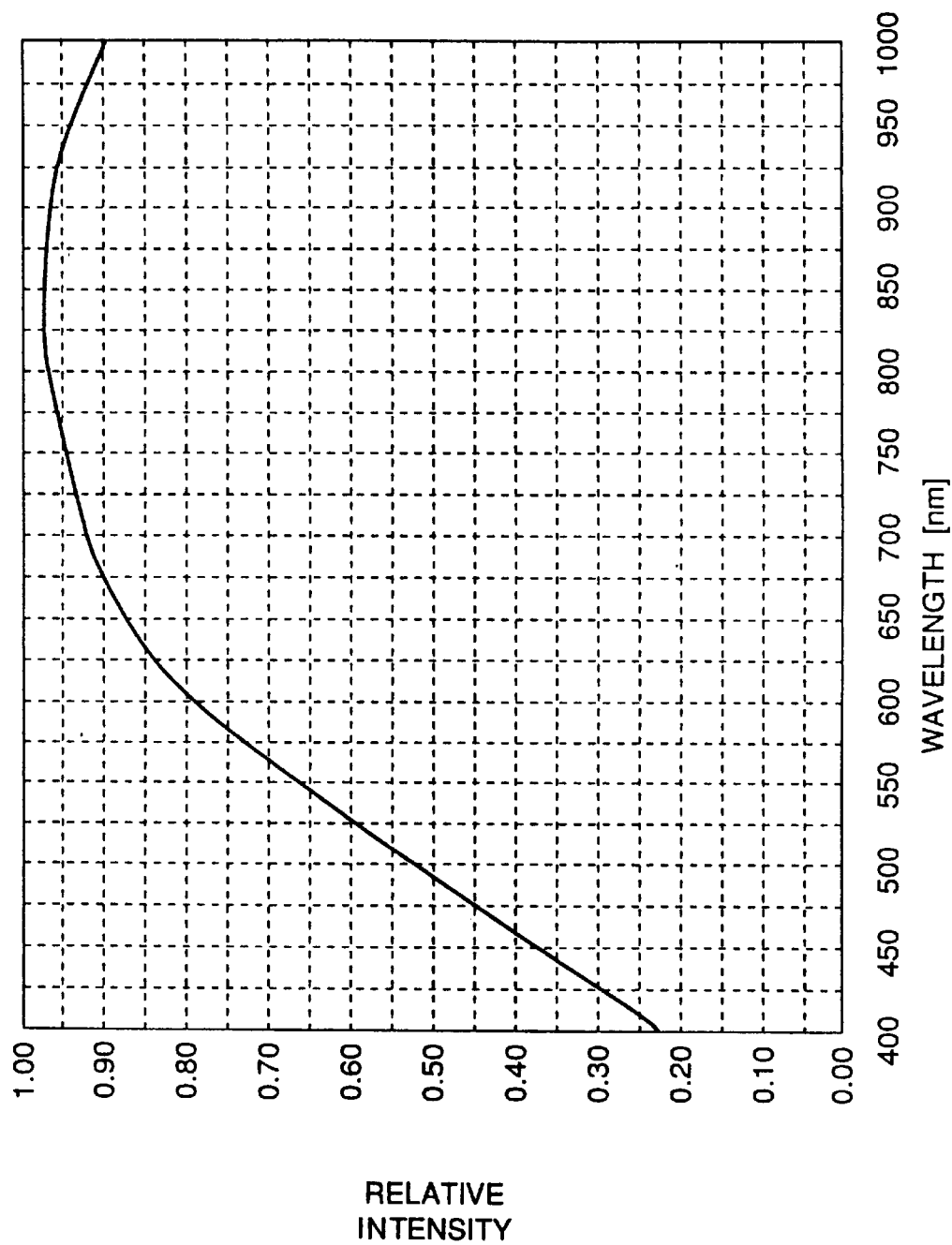
FIG. 4 is a chart showing light emission characteristics of a light source to be employed in the present invention.

The optical signal to be detected may be generated from a three-dimensional image or a two-dimensional image, and a representative example of said two-dimensional image is a flat image such as an original document. Consequently, in case of use in a system for reading the image of an original document, there is preferably provided illumination means for illuminating the original. Such illumination means may be composed for example of a light-emitting diode, a xenon lamp or a halogen lamp. FIG. 4 shows representative light emission spectral characteristics of the light source. However the light source needs only to emit the light of a spectral region required corresponding to the optical signal to be detected, and is not limited to that having the characteristics shown in FIG. 4. A light source emitting the light of the characteristics shown in FIG. 4 can at least provide the light in the R, G and B regions and the infrared light in the invisible spectral region.

In the following there will be explained embodiments of the present invention, but it is to be understood that the present invention is not limited to these embodiments but can be realized in any form attaining the objects of the present invention.

(Embodiment 1-1)

Figure 5:
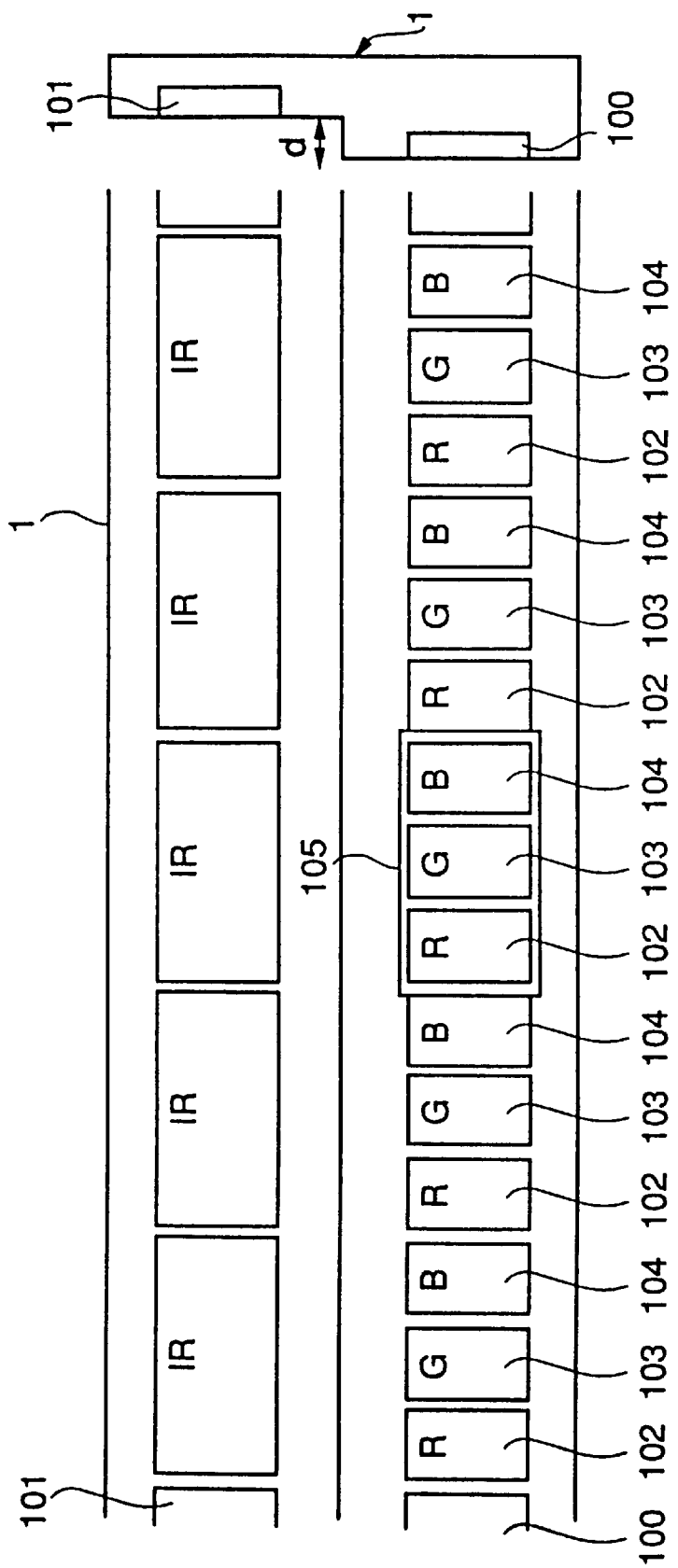
FIGS. 5A and 5B are schematic views of the embodiment 1-1 of the image reading device of the present invention.

FIG. 5A is a plan view, seen from above, of a CCD 1 serving as the image reading device, and FIG. 5B is a cross-sectional view thereof.

The CCD 1 is composed of a first element array 100 and a second element array 101.

In the first element array 100, the elements are cyclically provided with R filters 102, G filters 103, and B filters 104, formed by evaporation, in the order of R, G, B, R, G, B, . . . thereby constituting a reading system in which a pixel 105, consisting of a set of three elements of R, G and B, constitutes a minimum reading area.

The filters provided by evaporation on respective elements have the spectral characteristics as shown in FIG. 2.

On the other hand, in the second element array 101, the elements are arranged with a pitch equal to three times of the pitch of the elements in the first element array 100. Stated differently, the element pitch of the second array 101 is same as the pixel pitch of the first element array 100.

The second element array 101 is provided, by evaporation, with a visible light cut-off filter of the characteristics shown in FIG. 3, so that the light components less than 700 nm are cut off and the element array 101 can read the infrared component.

Also, as shown in FIG. 5B, the second element array 101 has a step difference d of 300 $\mu$m to the first element array 100, for obtaining a longer optical path. This is because the focal length of the optical system varies depending on the wavelength, and the image becomes out of focus for the infrared light unless the optical path is made longer.

Figure 6:
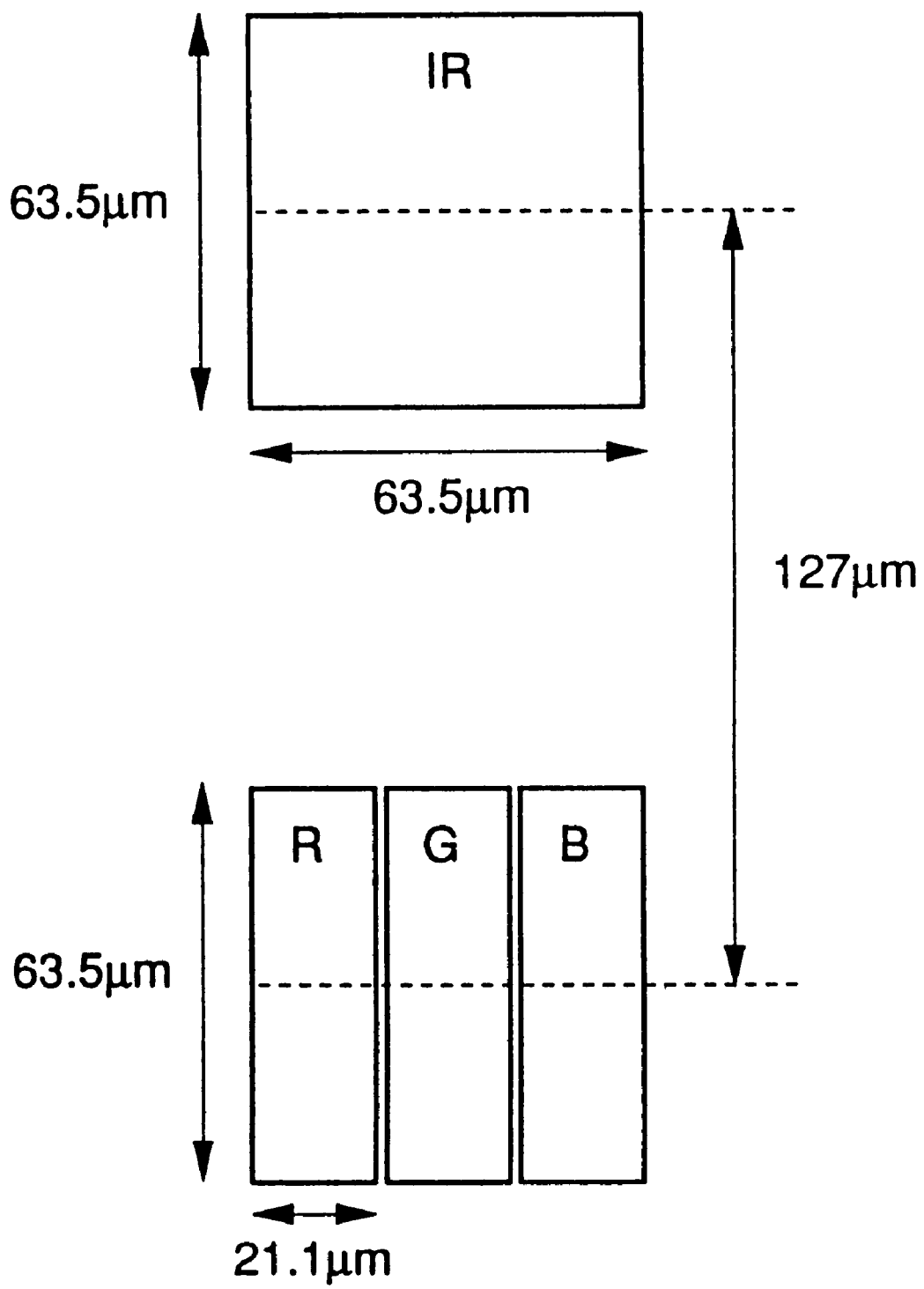
FIG. 6 is a schematic view of a pixel of the embodiment 1-1 of the image reading device.

FIG. 6 shows the dimension and the positional relationship of the elements of the first element array 100 and the second element array 101. It is assumed that the reading unit has a resolving power of 400 dpi and that, for the purpose of simplicity, an equal-size optical system is employed.

For realizing the resolving power of 400 dpi, the minimum reading area becomes 63.5×63.5 $\mu$m. Consequently the size of the R, G and B elements becomes 21.1×63.5 $\mu$m, while the IR elements becomes 63.5×63.5 $\mu$m. The distance between the first and second element arrays is selected as 127 $\mu$m. Stated differently, said arrays are separated by a distance corresponding to twice of the array 100 or 101.

The signals read by the arrays 100, 101 are so controlled as to be transmitted to a signal processing unit 211.

(Embodiment 1-2)

Figure 7:
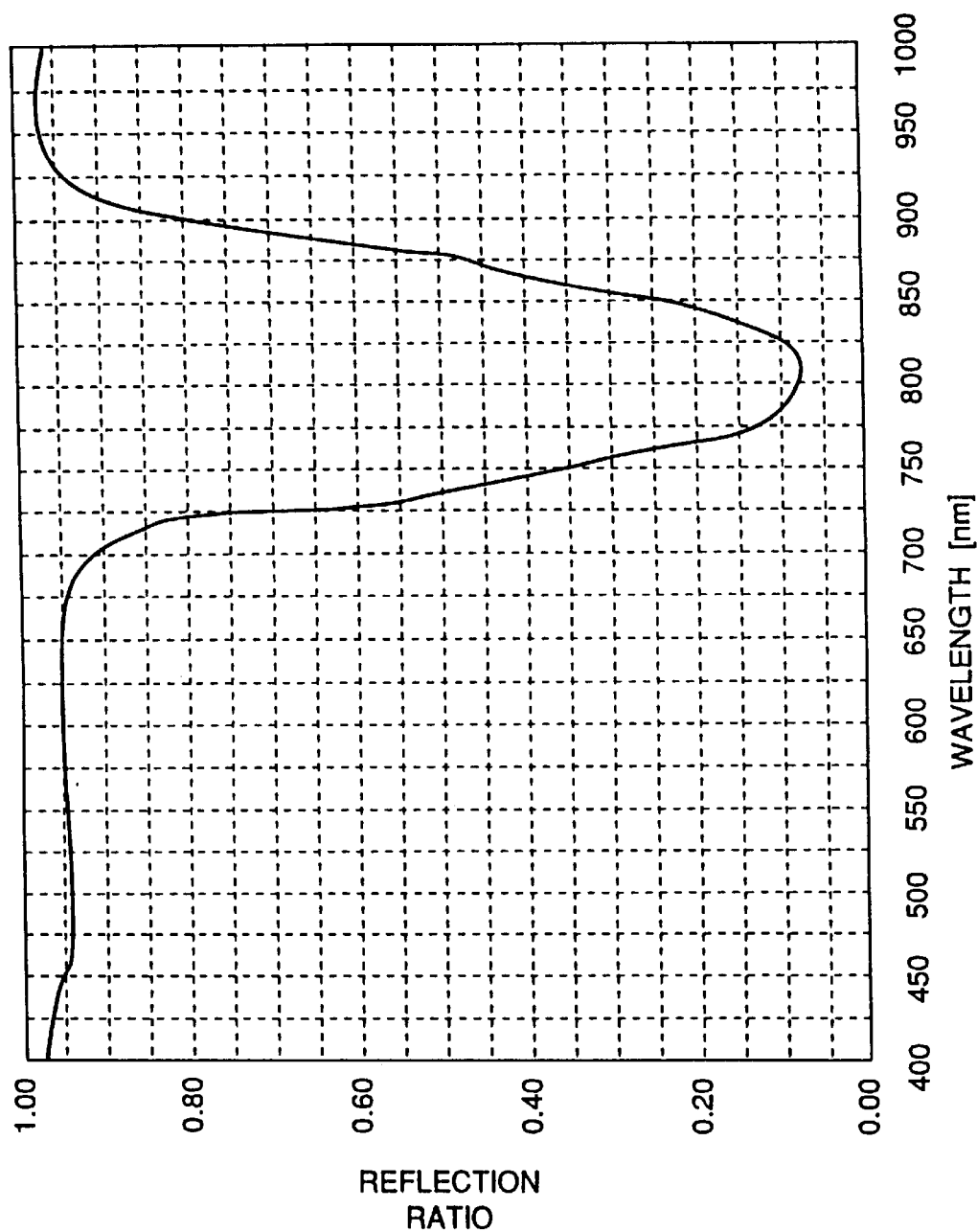
FIG. 7 is a chart showing spectral characteristics of infrared absorbing paint to be employed in the present invention.

In this embodiment, the element array 101 can read the signal in a spectral region exceeding 700 nm, but the infrared absorbing paint has a spectral distribution having an extremely narrow band width, with a peak at 800 nm, as shown in FIG. 7.

However, depending on the light source to be employed, there may be provided enough energy even in a region exceeding 1000 nm.

Figure 8:
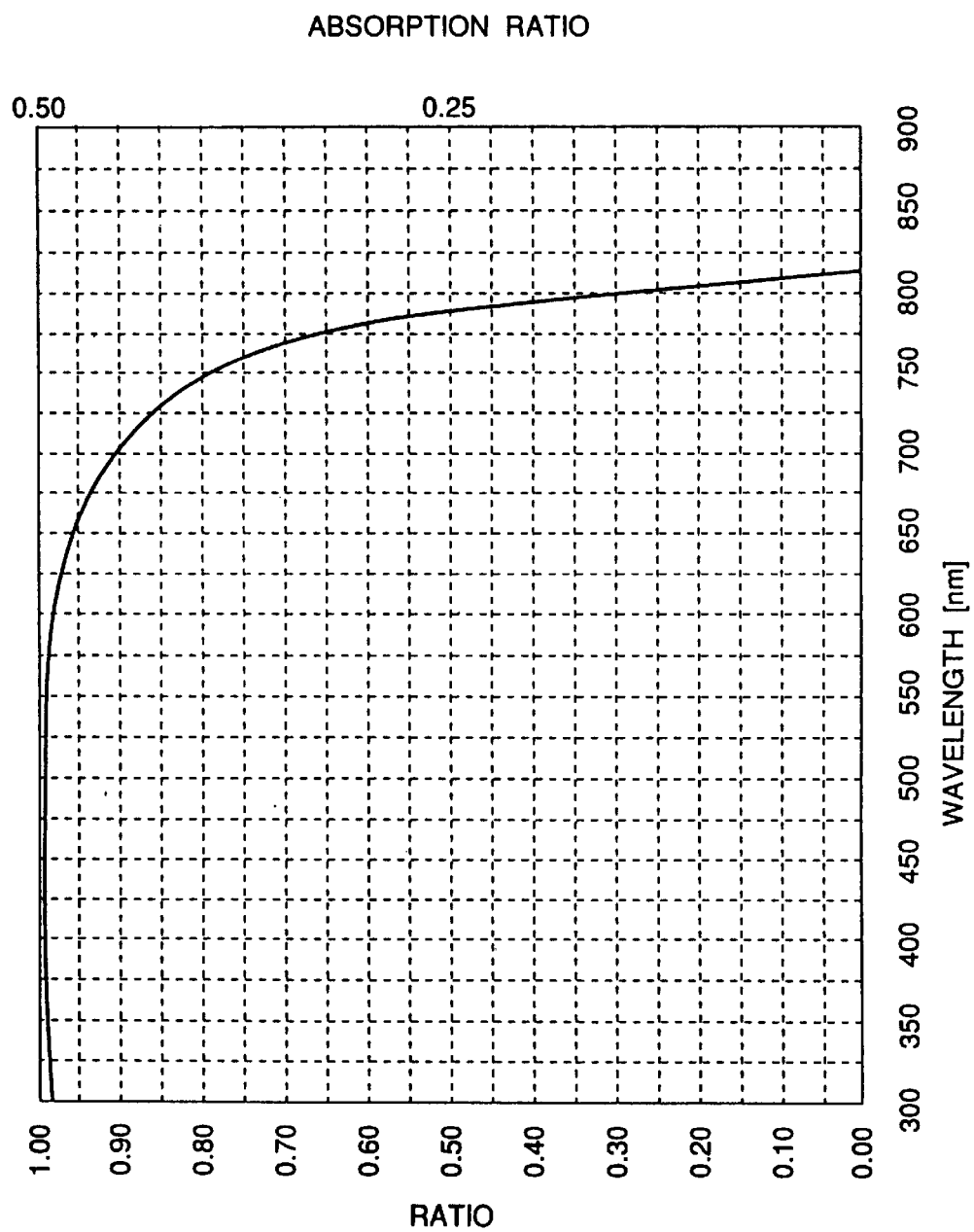
FIG. 8 is a chart showing spectral characteristics of a far-infrared cut-off filter to be employed in the present invention.

If such light source is employed, the discrimination of absorption becomes difficult because of the unnecessary energy above 800 nm. For this reason, the element array 101 is preferably provided with a far infrared cut-off filter of the characteristics as shown in FIG. 8.

Said far infrared cut-off filter may be provided in any position in the optical path, because, in the element array 100, the far infrared light is already cut off by a filter evaporated on the surface of the elements.

For example, said filter may be conveniently positioned in front of or behind a lens 209, because the filter can be easily replaced when the fluorescent characteristics of the fluorescent paint to be printed on the original document is varied.

(Embodiment 1-3)

In the foregoing embodiments, the color sensor is constructed as shown in FIGS. 5A and 5B. In the present embodiment, the substrate of the CCD is formed in an inclined shape as shown in FIGS. 9A and 9B, in such a manner that the first line 100 and the second line 101 has a optical path difference d of 300 μm.

In this manner the visible optical signal and the infrared optical signal are both in focus, so that the precision of discrimination becomes improved.

Also as a variation of this embodiment, a similar effect can be obtained by placing planar CCD sensors in an inclined position.

(Embodiment 1-4)

In this embodiment, a color sensor consisting of an array 171 having sensitivity to blue, an array 172 having sensitivity to green, an array 173 having sensitivity to red and an array 174 having sensitivity to infrared region is given step differences, matching the focal positions of respective colors. There are preferably provided a step difference d1 of 20 μm between B and G, a step difference d2 of 50 μm between G and R, and a step difference d3 of 280 μm between R and IR.

These values depend on the optical system to be employed, and are preferably optimized according to each optical system.

The presence of four CCD lines requires phase matching of all the color signals with a FIFO memory.

Also as modifications of this embodiment, it is possible to form the substrate in inclined manner or to place a planar sensor in inclined manner.

In this manner the visible optical signal and the infrared optical signal are both in focus, so that the precision of discrimination can be improved.

Also the distance between the array of the infrared component reading elements and the array of the visible component reading elements, selected as an integral multiple of the resolving power of the reading system, enables electrical compensation of said difference for example by a line buffer, and facilitates comparison of the signals from the two element arrays which read a same image area. It is furthermore possible to dispense with said line buffer, by utilizing the FIFO memory for example in an edge enhancing circuit.

(Image Information Processing Apparatus)

In the following there will be explained a representative example of the image information processing apparatus equipped with the image reading device, according to any of the foregoing embodiments of the present invention.

(Structure of Image Scanner Unit)

Figure 11:
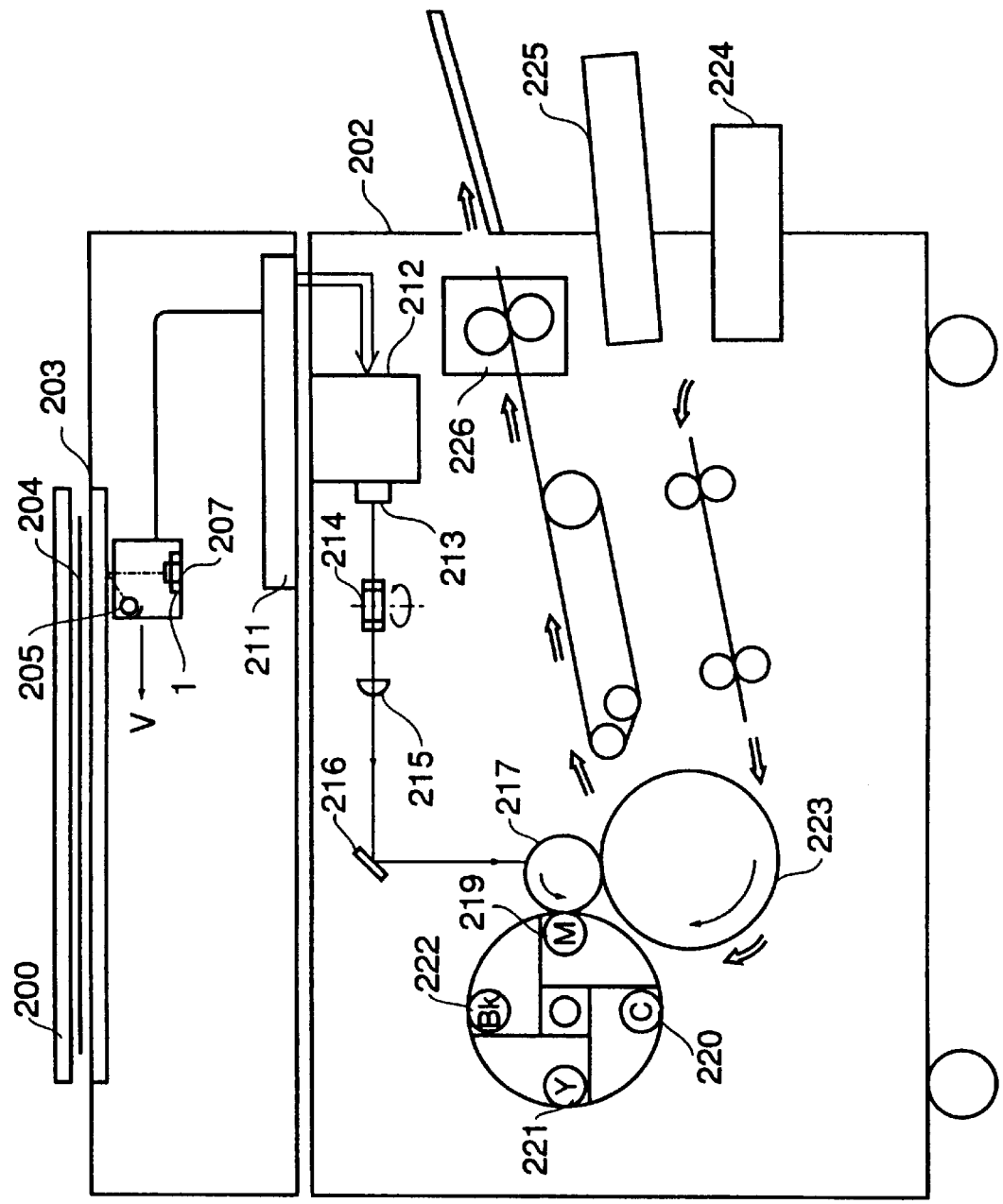
FIG. 11 is a schematic view showing an example of the image information processing apparatus of the present invention.

In FIG. 11 there are shown an image scanner unit 201 for reading the original image and effecting digital signal processing, and a printer unit 202 for printing a full-color image on a sheet, corresponding to the original image read by the image scanner unit 201.

In the image scanner unit 201, there is provided a mirror-surface thick plate 200. An original 204 placed on an original supporting glass (hereinafter called platen) 203 is illuminated by a halogen lamp 205, and the reflected light from the original is focused, by a lens 209, on said color sensor 1 serving as the image reading device, whereby the full-color signals of the red (R), green (G), blue (B) and infrared (IR) components are supplied to a signal processing unit 211.

A reading unit 207 is mechanically moved, with a velocity v, in a perpendicular direction (hereinafter called sub scanning direction) to the electrical scanning direction (hereinafter called main scanning direction) of the color sensor, thereby scanning the entire surface of the original.

The signal processing unit 211 electrically processes the read signals to separate the components of magenta (M), cyan (C), yellow (Y) and black (BK), for supply to the printer unit 202.

(Structure of the Printer Unit)

The image signals M, C, Y, BK supplied from the image scanner unit 210 are supplied to a laser driver 212, which in response modulates a semiconductor laser 213. The laser beam emitted therefrom is guided through a polygon mirror 214, an f-θ lens 215 and a mirror 216 and scans a photosensitive drum 217.

A rotary developing unit 218 is composed of a magenta developing unit 219, a cyan developing unit 220, a yellow developing unit 221 and a black developing unit 222, which in turn come into contact with the photosensitive drum to develop the electrostatic latent images of M, C, Y and BK formed on the photosensitive drum 217 with corresponding toners.

A sheet supplied from a sheet cassette 224 or 225 is wound on a transfer drum 223, and the toner images developed on the photosensitive drum 217 are transferred onto said sheet.

After the successive transfers of the four color images of M, C, Y and BK in this manner, the sheet is discharged through a fixing unit 226.

In the foregoing there has been briefly explained the structure of the scanner unit and the printer unit principally constituting the apparatus, and in the following there will be given a detailed explanation on the image scanner unit 201.

(Original)

Figure 12:
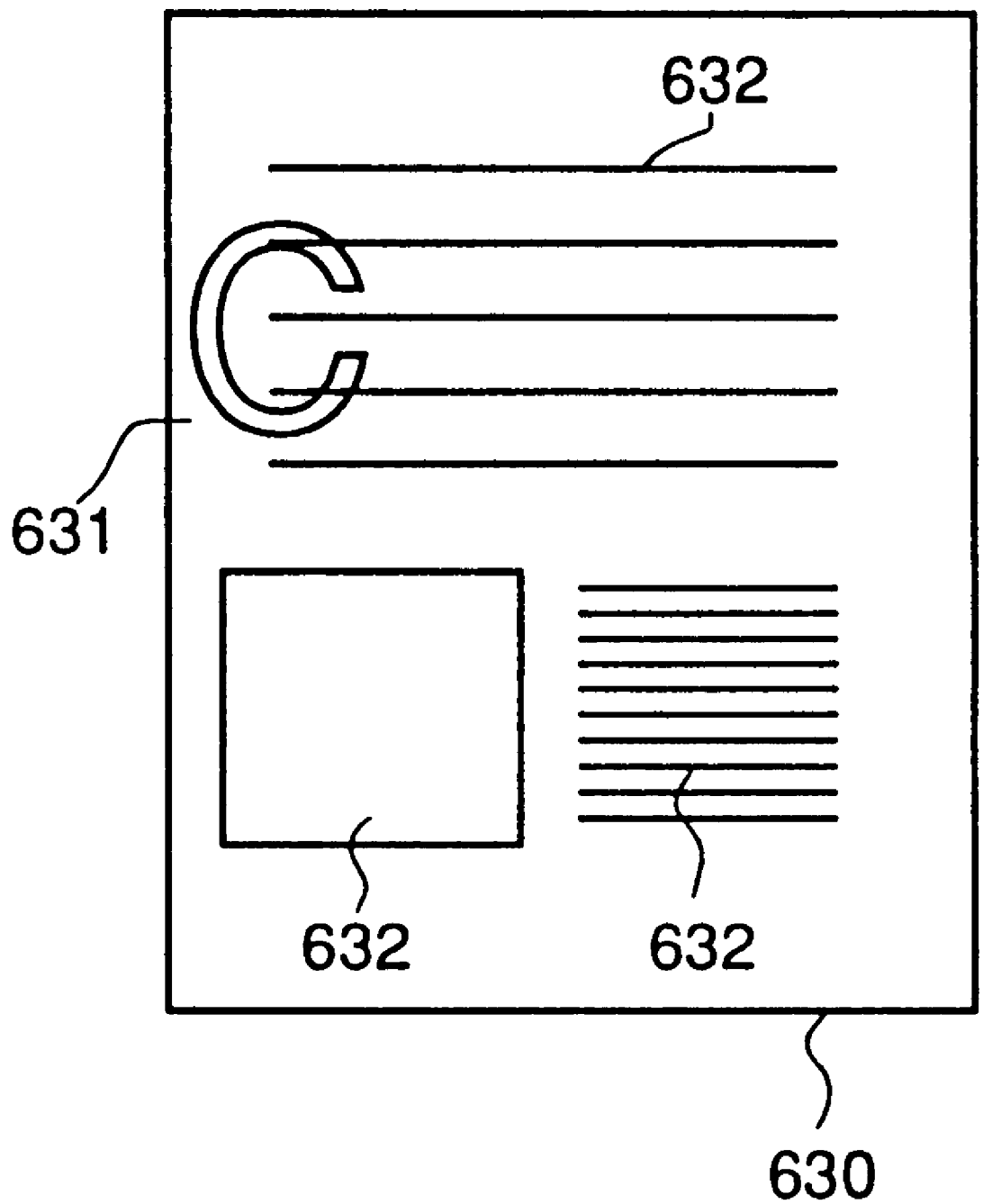
FIG. 12 is a schematic view of an original image to be read by the image reading device of the present invention.

FIG. 12 shows an original 630 on which a pre-registered pattern 631 is printed with infrared absorbing paint.

In addition to the pattern 631, characters and images 632 are printed with ordinary ink on the original 630.

The printed infrared absorbing paint, absorbing the infrared light having wavelength in excess of 700 nm, appears almost colorless to the human eyes sensitive to a spectral region of 400–700 nm, and is therefore extremely difficult to recognize.

The spectral characteristics of said infrared absorbing paint is same as shown in FIG. 7.

The amount of the above-mentioned infrared absorption can be detected by cutting off the visible light component and extracting the infrared light component only by the element array 101 in the sensor 1.

(Pre-scan)

The image scanner unit 201 effects a pre-scan, as a pre-treatment before the copying of the original 630, as will be explained in the following.

Figure 13:
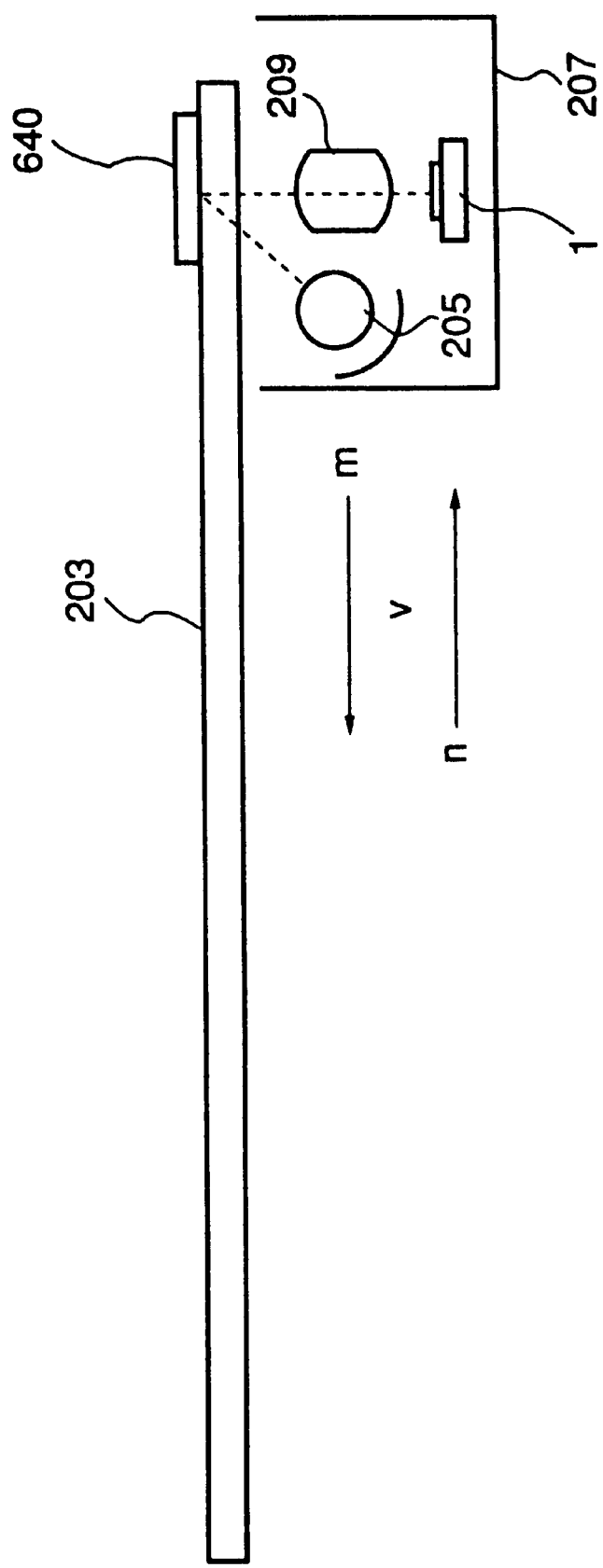
FIG. 13 is a schematic view showing the reading operation of the image reading device of the present invention.

At first the lamp 205 illuminates a white shading plate 640, fixed in a part of the platen 203 as shown in FIG. 13.

The reflected image of said white shading plate 640 is focused, through the lens 209, onto the CCD 210.

The image of the white shading plate 640, read by the element arrays 100, 101 of the sensor 1, is processed in the signal processing unit 211, and the data for compensating the unevenness in the illumination by the lamp 205, and the data for compensating the unevenness in the sensitivity of the element arrays 100, 101 of the sensor 1 are prepared and are stored for respective arrays.

Subsequently the reading unit 207 is mechanically moved in a direction m with a velocity v by an unrepresented driving system, thereby scanning the entire surface of the original. In this operation, the signal processing unit 211 extracts the maximum and minimum values of the original density, from the image of the original 630 read by the element array 100 of the sensor 1, and calculates the print density at the copying operation.

Thereafter the reading unit 207 is mechanically moved in a direction n shown in FIG. 13 with a velocity v by the unrepresented driving system, for returning to the reading start position, or, the home position.

(Copying of Original and Pattern Detection)

After the preparation of the above-mentioned shading correction data, the reading unit 207 returns to the home position and starts the reading of the original 630. At the same time there is detected whether the original 630 has the pattern 631.

The presence or absence of the pattern is discriminated by the comparison of the information read by the element array 100 of the sensor 1 and that read by the element array 101.

More specifically, the image reading for image reproduction is conducted by the element array 100, while the image reading for detecting the pattern 631 is conducted by the element array 101.

Figure 14:
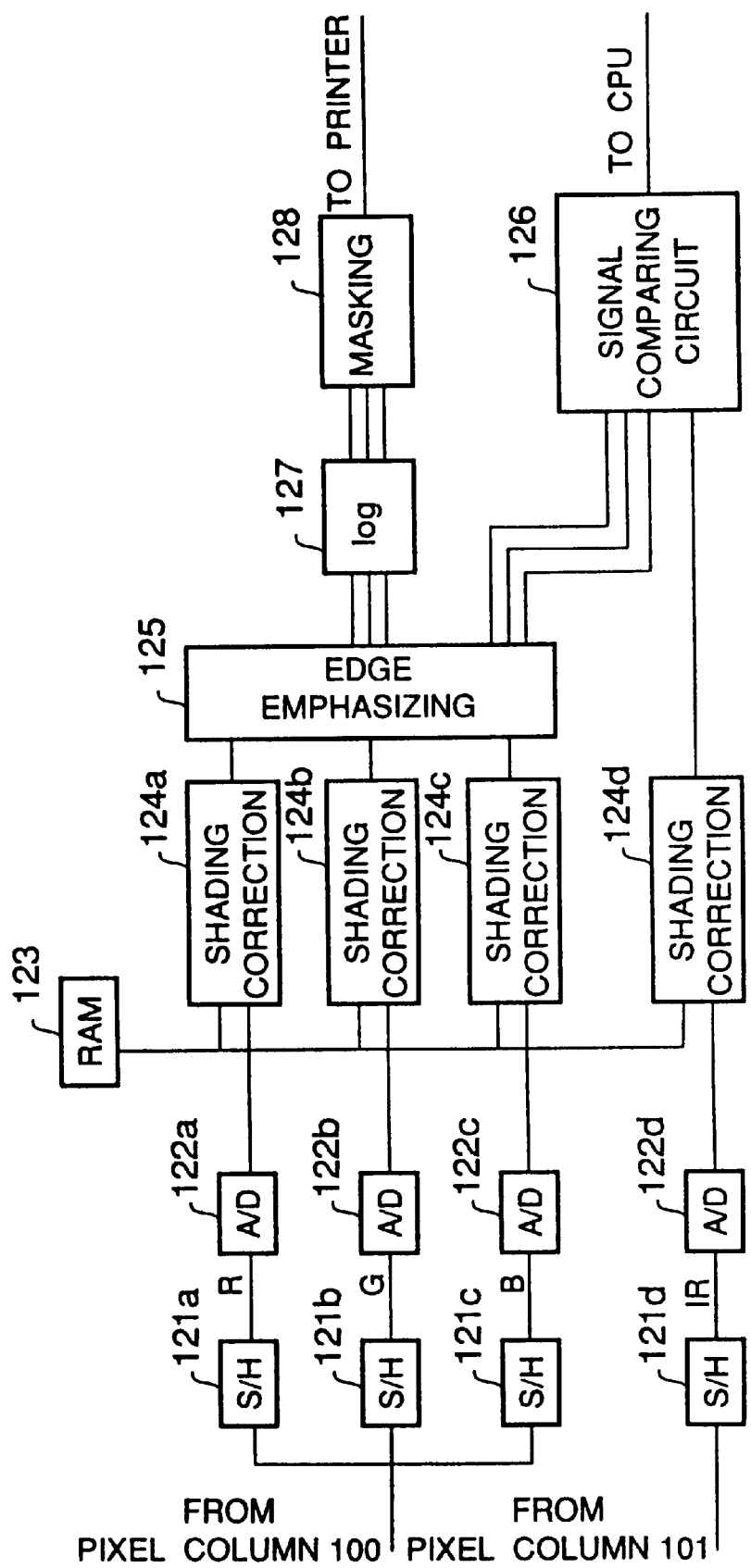
FIG. 14 is a block diagram showing a signal processing unit of the image reading device of the present invention.

In the following there will be given an explanation on the signal processing unit 211 for processing the read signals. The block diagram of said unit 211 is shown in FIG. 14.

At first there will be explained the signal processing system for the element array 100.

The analog image signals released from the element array 100 are entered, in the order of R, G and B and in synchronization with the drive signal for the sensor 1, simultaneously to three sample-hold circuits 121a–121c. The sample hold circuit 121a generates a sampling signal at the timing of entry of the R signal, and is capable of retaining the analog level of the sampled signal until a next R signal is entered.

Similarly the sample-hold circuit 121b generates a sampling signal at the timing of entry of the G signal and the sample-hold circuit 121c generates a sampling signal at the timing of entry of the B signal.

As a result, the sample-hold circuits 121a–121c respectively release the R, G and B signals, which are respectively supplied to A/D converters 122a–122c, wherein the analog image signal is converted into an 8-bit digital image signal. The obtained digital signals are supplied to shading correction circuits 124a–124c, for being subjected to shading correction.

The shading correction has already been explained in relation to the pre-scanning, and the correction data for R, G and B colors prepared therein are stored in a RAM 123.

During the image reading, the correction data for each element are supplied from the RAM 123 to the shading correction circuits 124a–124c, thereby correcting the read data.

The image signals released from the shading correction circuits 124a–124c are supplied to a 5×5 edge enhancing circuit 125, which emphasizes the contour of the read image in the following manner.

Figure 15:
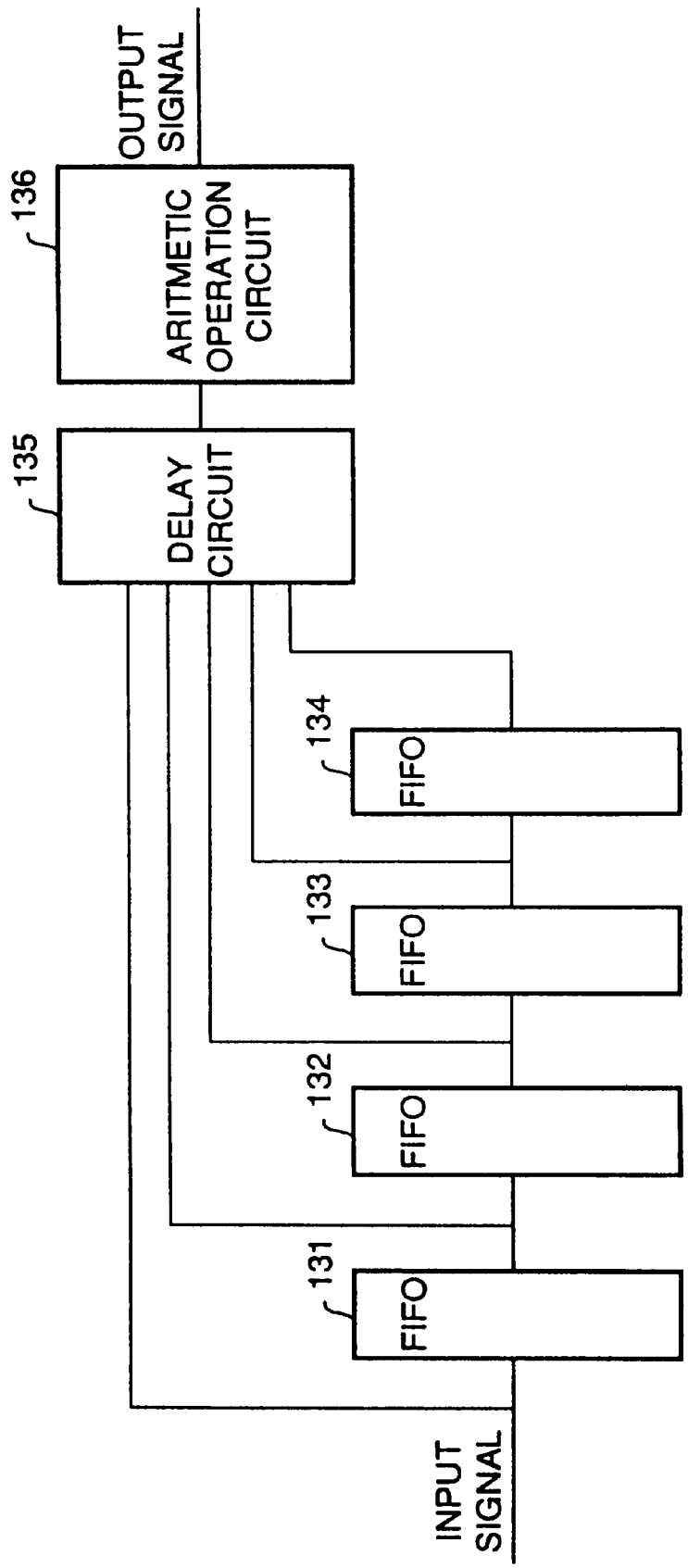
FIG. 15 is a block diagram of an edge enchancing circuit of the image reading device of the present invention.

FIG. 15 shows the structure of said edge enhancing circuit 125. The edge enhancement is conducted for each of the R, G and B colors, but FIG. 15 shows the circuit for one color only. Naturally other two circuits have the identical structure.

In FIG. 15 there are provided FIFO memories 131–134 each having a capacity capable of retaining the data of a line in the element array 100 of the CCD 210.

The four FIFO memories are connected as shown in FIG. 15, so that, when the pixel data of an n-th line are entered to the FIFO 131, the FIFO memories 131, 132, 133, 134 respectively release the data of an (n–1)-th line, an (n–2)-th line, an (n–3)-th line and an (n–4)-th line.

The input signal and the output signals of the FIFO memories 131–134 are supplied to a delay circuit 135.

Said delay circuit 135 is provided with several pixel delaying circuits for the entered signal of m-th pixel, thereby providing an arithmetic operation circuit 136 with the pixel data of the (m–1)-th, (m–2)-th, (m–3)-th and (m–4)-th pixel as well as the m-th pixel. Thus the circuit 136 receives the data of 25 pixels in total.

Figure 16:
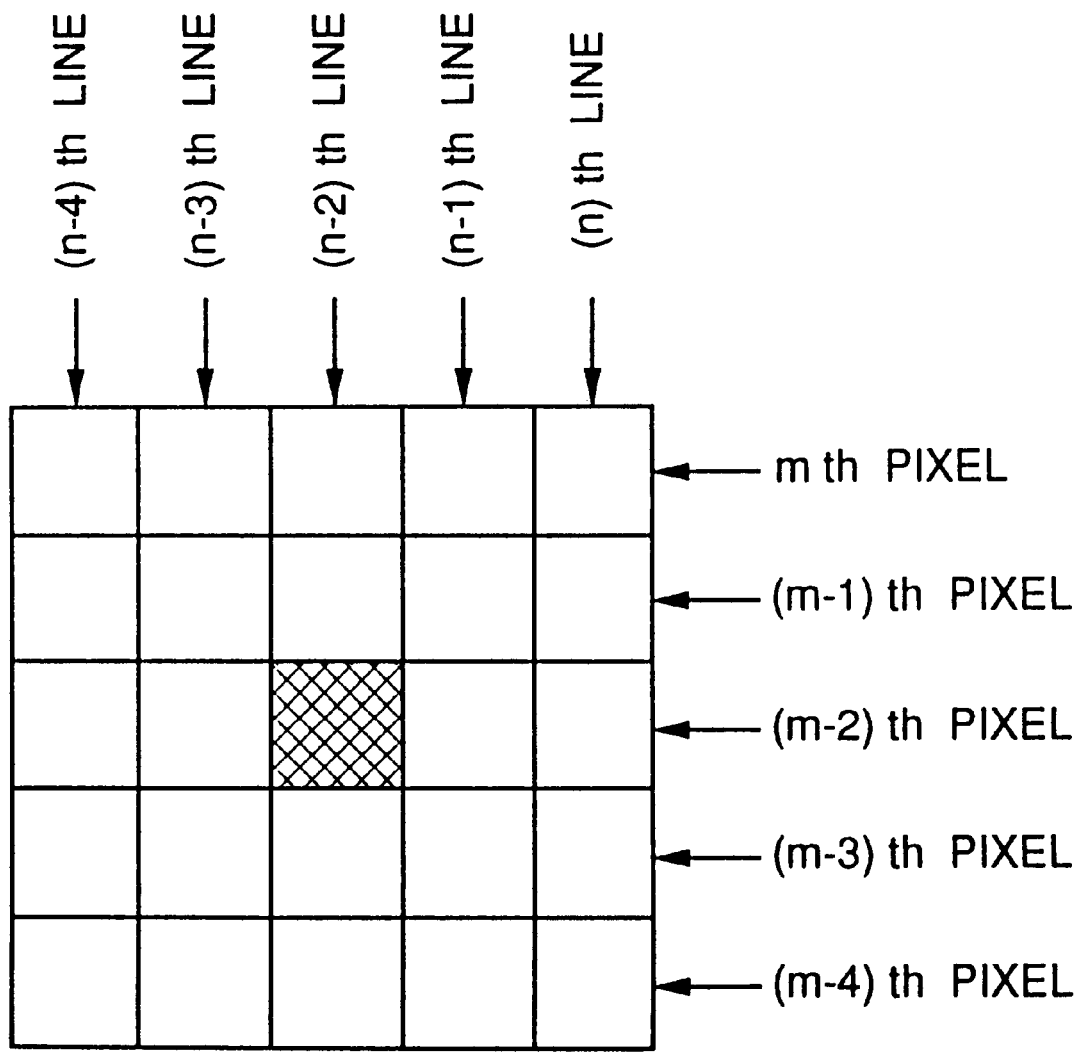
FIG. 16 is a schematic view of a pixel data map.

FIG. 16 shows the map of the entered data. Thus the operation unit 136 receives the data of the surrounding 24 pixels together with the data of a hatched object pixel.

The operation unit 136 multiplies the data of the object pixel by 25, and subtracts the data of the surrounding pixels.

Thus, if the data of the object pixel is larger than the data of the surrounding pixels, the data of the object pixel becomes even larger, and vice versa.

This process increases the contrast of the contour of the image, thus enhancing the reproduced image.

The edge enhanced image data are supplied, through a logarithmic conversion unit 127 for effecting luminance-density conversion, and a masking conversion unit 128 for effecting optimum correlated color correction, to the printer unit.

In the following there will be explained the signal processing system for the element array 101. Although it is basically same as that for the element array 100, but the edge enhancing circuit is eliminated because the image reproduction is not the object.

The data released from a shading correction circuit 124d are supplied to a signal comparison circuit 126.

Other input data are obtained from the edge enhancing circuit, but, as will be apparent from FIG. 6, the object pixel in the edge enhancing circuit is present on the (n–2)-th line.

The comparison of the data of the arrays 100, 101 would require a line buffer for compensating the distance of two lines as shown in FIG. 6, but the edge enhancement on the data of the array 100 provides the data corresponding to a same position on the original. The signal comparison circuit 126, serving as the discrimination means, compares the image data of the arrays 100, 101 and sends the result of comparison to an unrepresented CPU.

In the signal comparison, it is to be noted that the printing ink of a high density and a low saturation tends to contain pigment of carbon black family, and such ink, absorbing the infrared light, has to be separated from the information to be discriminated.

In the present embodiment, therefore, whether the IR absorption pattern corresponds to the pattern to be discriminated is identified by the comparison of the minimum value K of the R, G and B signals and the IR signal in the following manner:

$$X = IR - \text{const.} \times \min(R, G, B).$$

More specifically, the value X is determined for each pixel and is cumulatively added for the entire original, and when the cumulative value reaches a predetermined reference level, the unrepresented CPU functions as the control means for the image forming operation and controls the printer unit so as to immediately interrupt the copying of the original.

There can be conceived certain variations in the image information processing apparatus explained above.

For example the line position correction for the element arrays 100, 101 need not necessarily utilize the FIFO memories of the 5×5 edge enhancing circuit, but may instead utilize the FIFO memories for example of the error diffusion process.

Also the pattern discrimination is not necessarily limited to the signal comparison in the signal comparison circuit but may rely on pattern matching according to the image shape extracted by the signal comparison, in order to control the original copying operation. In this case there is required a large and complex pattern matching circuit, but, as the kind of the original can be identified from the pattern shape, there is enabled such control as to authorize the copying operation for certain originals in response to the entry of a password, but to prohibit the copying operation for other originals.

This embodiment enables precise detection of the optical signal with a wide dynamic range and over a wide spectral range, without complicating the optical system.

(Embodiment 2-1)

The following embodiment shows an application of the present invention to a copying apparatus, but such application is not limitative and the present invention is naturally applicable to various other apparatus, such as an image scanner connected to a computer.

Figure 18:
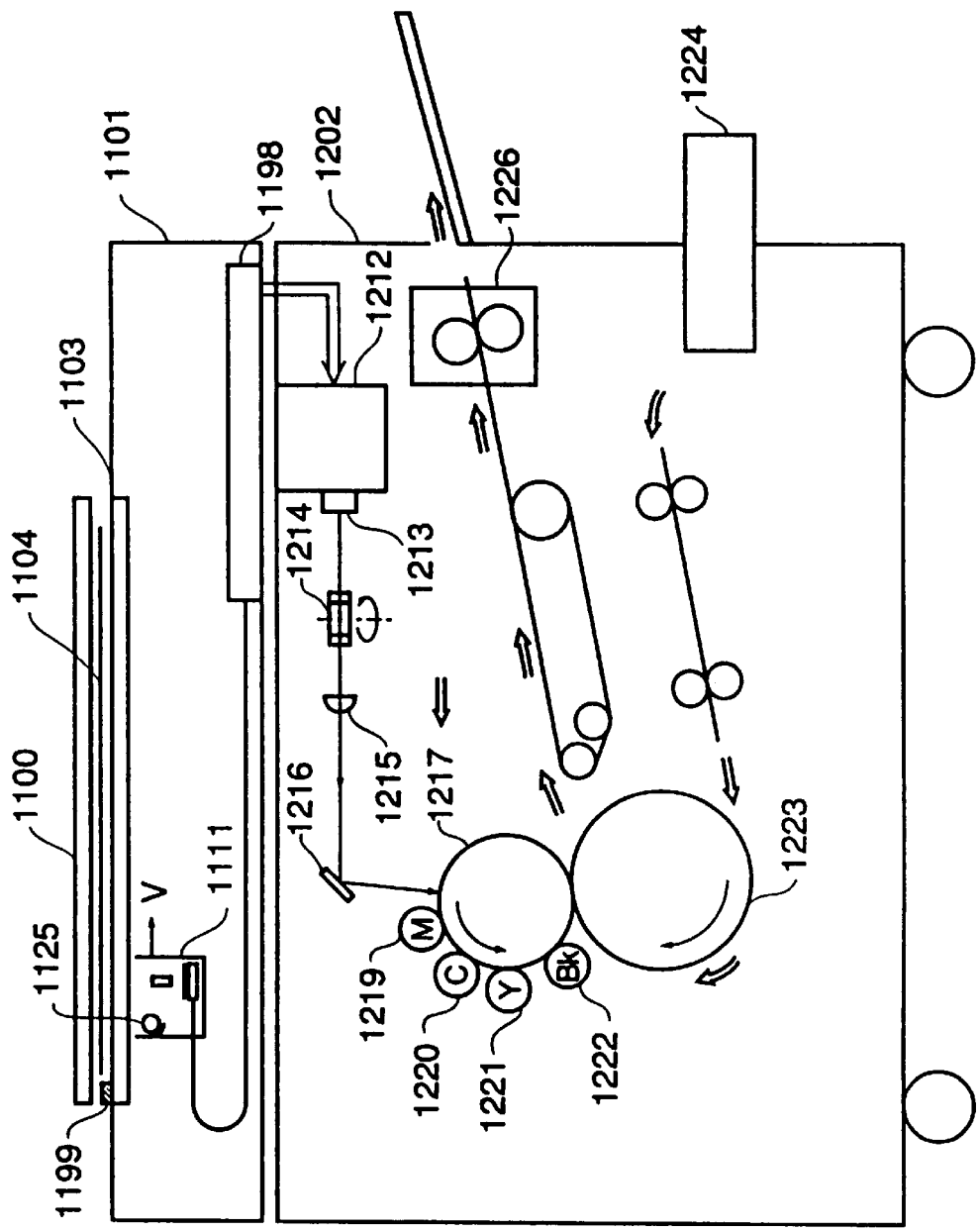
FIG. 18 is a schematic view of a full-color copying machint in the embodiment 2-1.

FIG. 18 shows the structure of an embodiment 2-1 of the device of the present invention, wherein an image scanner unit 1101 effects original reading and digital signal processing, and a printer unit 1202 for printing a full-color image on a sheet, corresponding to the original image read by the image scanner unit 1101.

(Image Scanner Unit)

Figure 17:
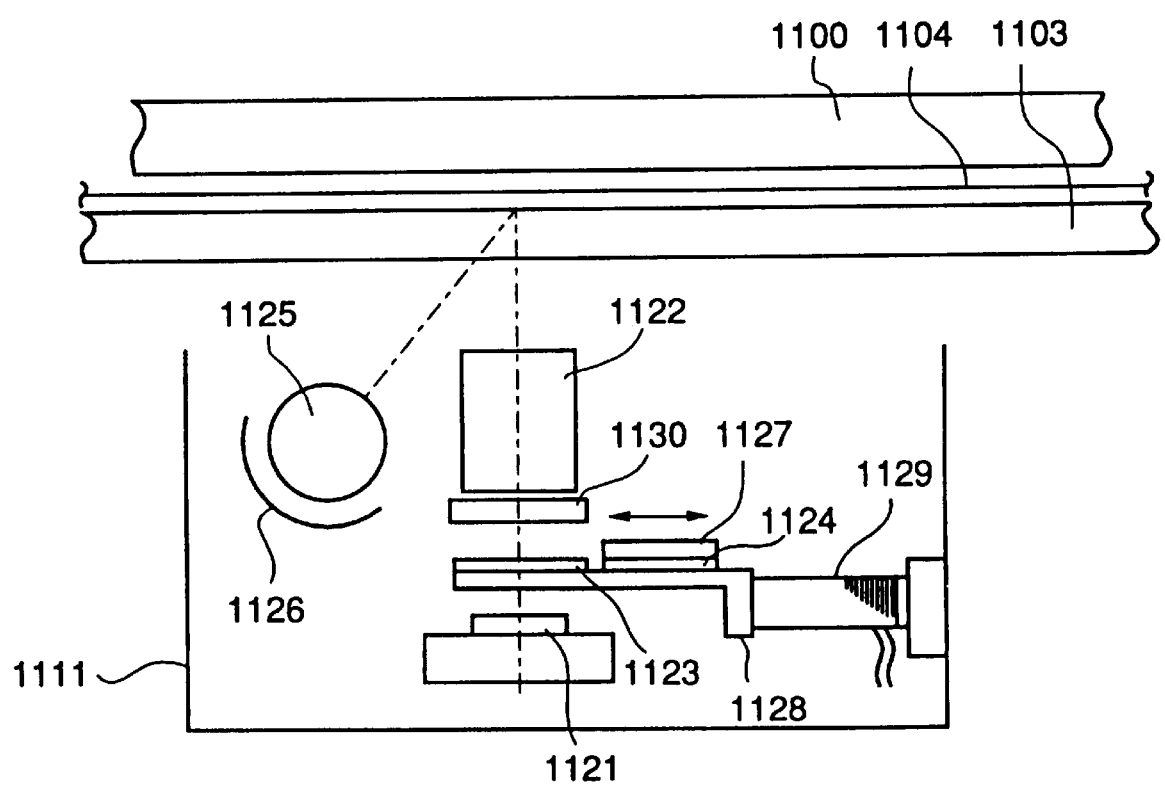
FIG. 17 is a schematic view of a part of the original reading unit in an equal-size optical system in an embodiment 2-1.
Figure 24:
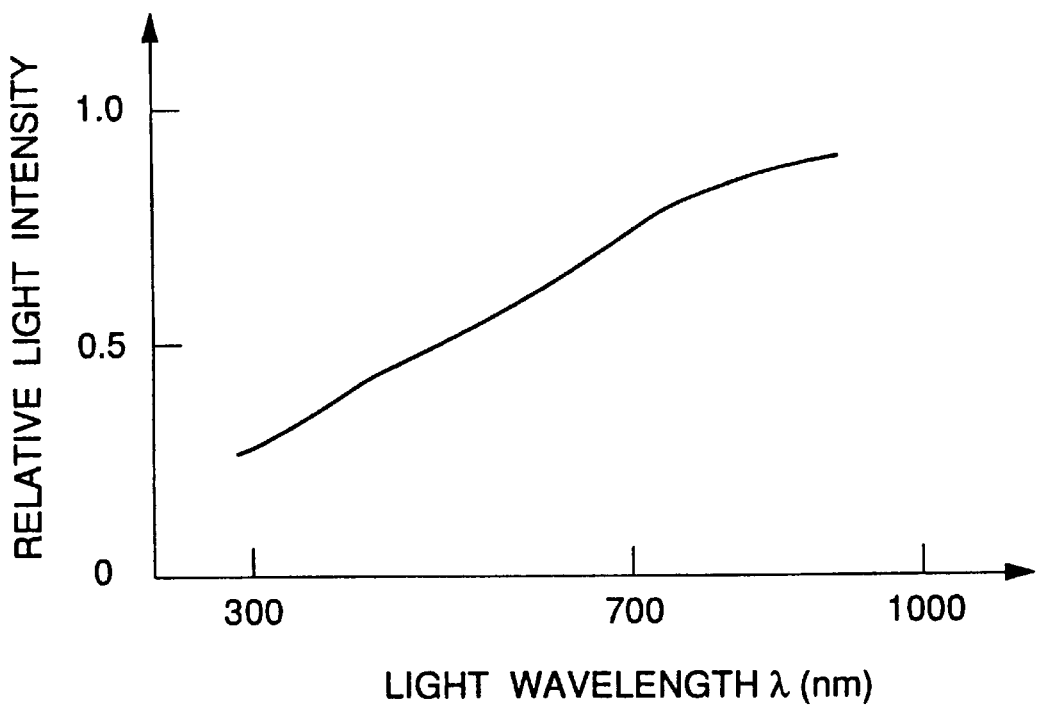
FIG. 24 is a chart showing the spectral characteristics of the original illuminating lamp employed in the embodiment.
Figure 25:
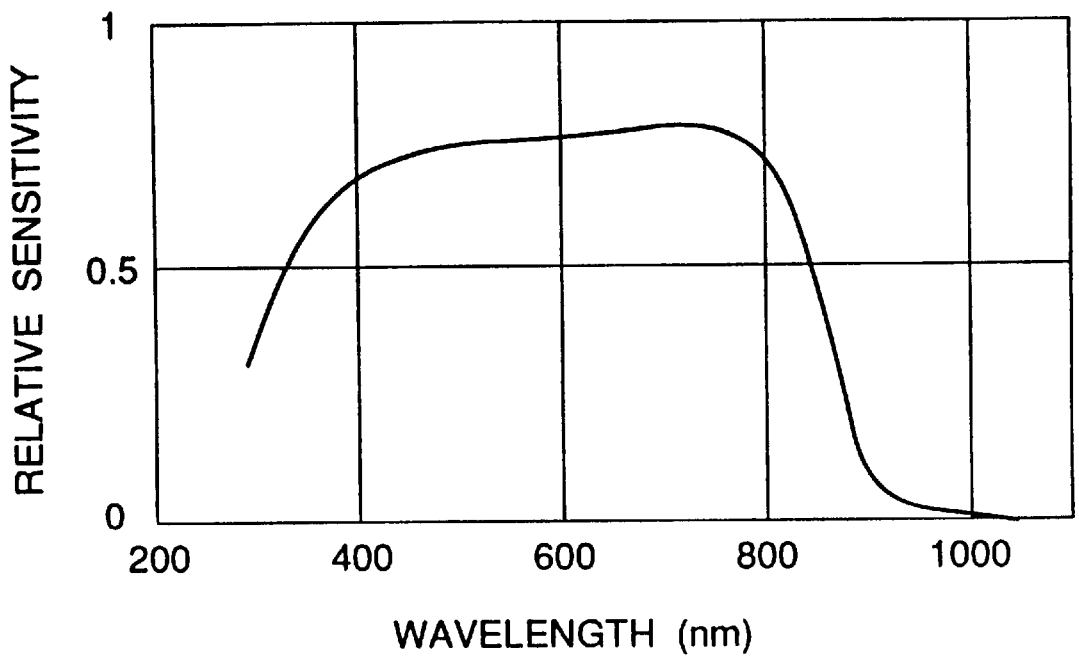
FIG. 25 is a chart showing the spectral characteristics of the far-infrared cut-off filter employed in said embodiment.
Figure 26:
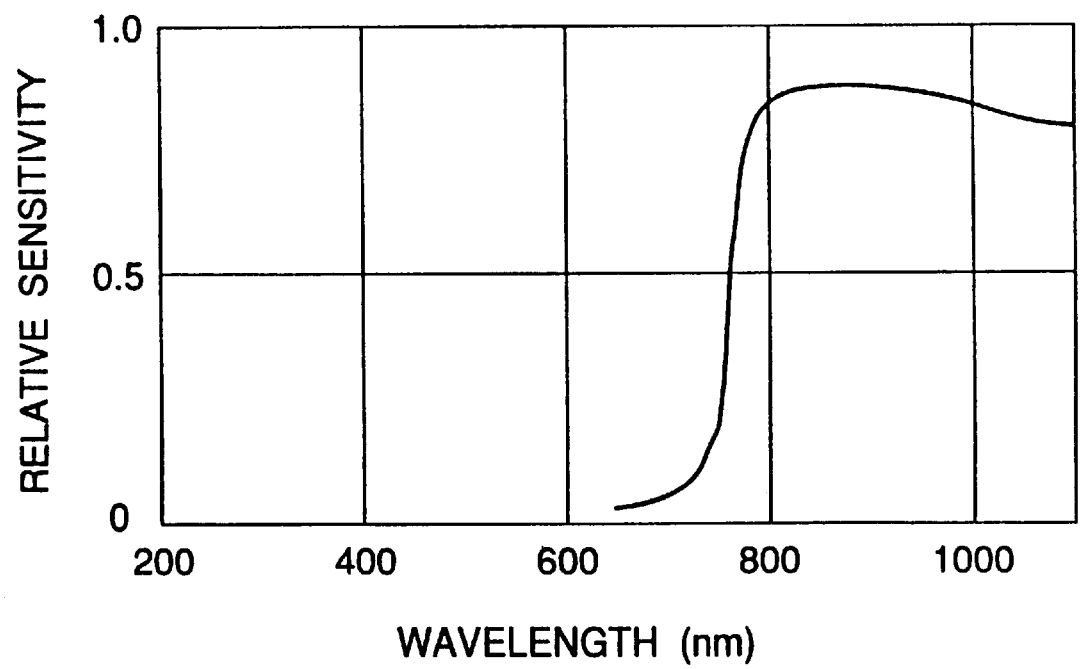
FIG. 26 is a chart showing the spectral characteristics of the visible cut-off filter employed in the embodiment.
Figure 27:
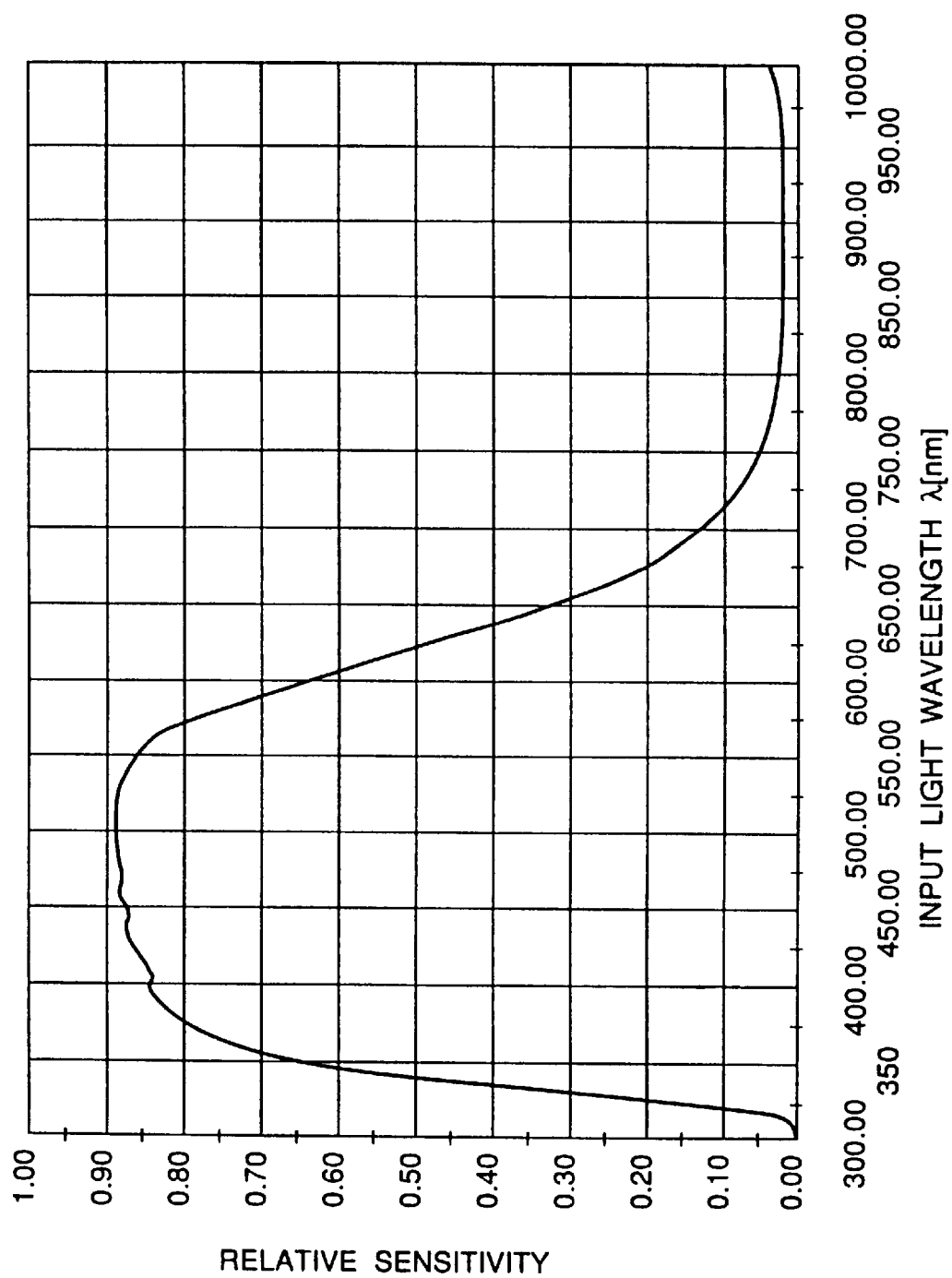
FIG. 27 is a chart showing the spectral characteristics of the infrared cut-off filter employed in the embodiment.

FIG. 17 is a schematic view showing a part of the original reading unit of the equal-size optical system of said image scanner unit 1101, provided with a mirror-surface pressure plate 1100. An original document 1104 placed on an original supporting glass (hereinafter called platen) 1103 is illuminated by a halogen lamp 1125, of which spectral characteristics are shown in FIG. 24, and the reflected light from the original is supplied to a lens array 1122 and is subjected to the cut-off of a spectral region above about 850 nm by a dichroic filter 1130 of which the spectral characteristics are shown in FIG. 25. Then by means of switchable filter means provided on a horizontally movable stage 1128, the image of the near-infrared region around a wavelength of 800 nm or the image of the visible spectral region of 400–700 nm is selectively supplied to a CCD line sensor for image reading. Said stage 1128 is driven by a laminated piezoelectric actuator 1129 and selectively moves in the lateral direction in FIG. 17. On said stage 1128 there are mounted a filter 1123 of which the spectral characteristics are shown in FIG. 26, and a near-infrared cut-off filter 1124 of which the spectral characteristics are shown in FIG. 11, and said stage 1128 is so moved that the filter 1123 or 1124 is inserted between the lens array 1122 and the sensor 1121 respectively at the image reading in the near-infrared region or that in the visible region. On said filter 1124 there is provided a glass plate 1127 for compensating the difference in image positions between the near-infrared light and the visible light in this embodiment 2-1.

Figure 21A:
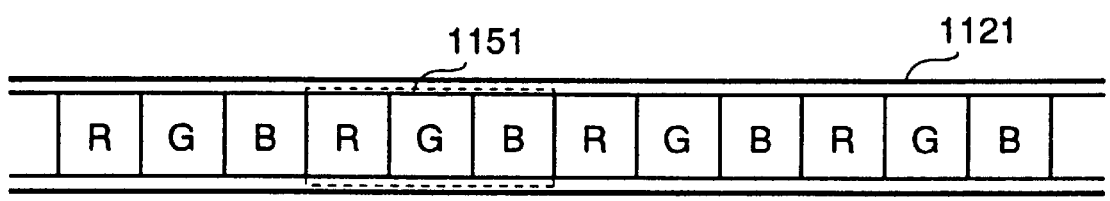
FIGS. 21A and 21B are magnified views of the light-receiving elements of the CCD sensor in the embodiment 2-1.
Figure 21B:
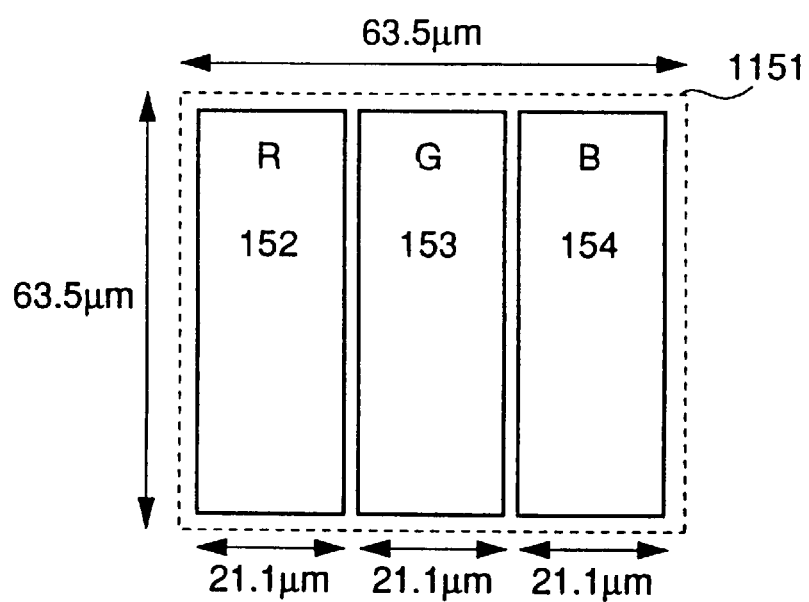

FIGS. 21A and 21B show the structure of the sensor 1121 employed in the present embodiment.

Figure 22:
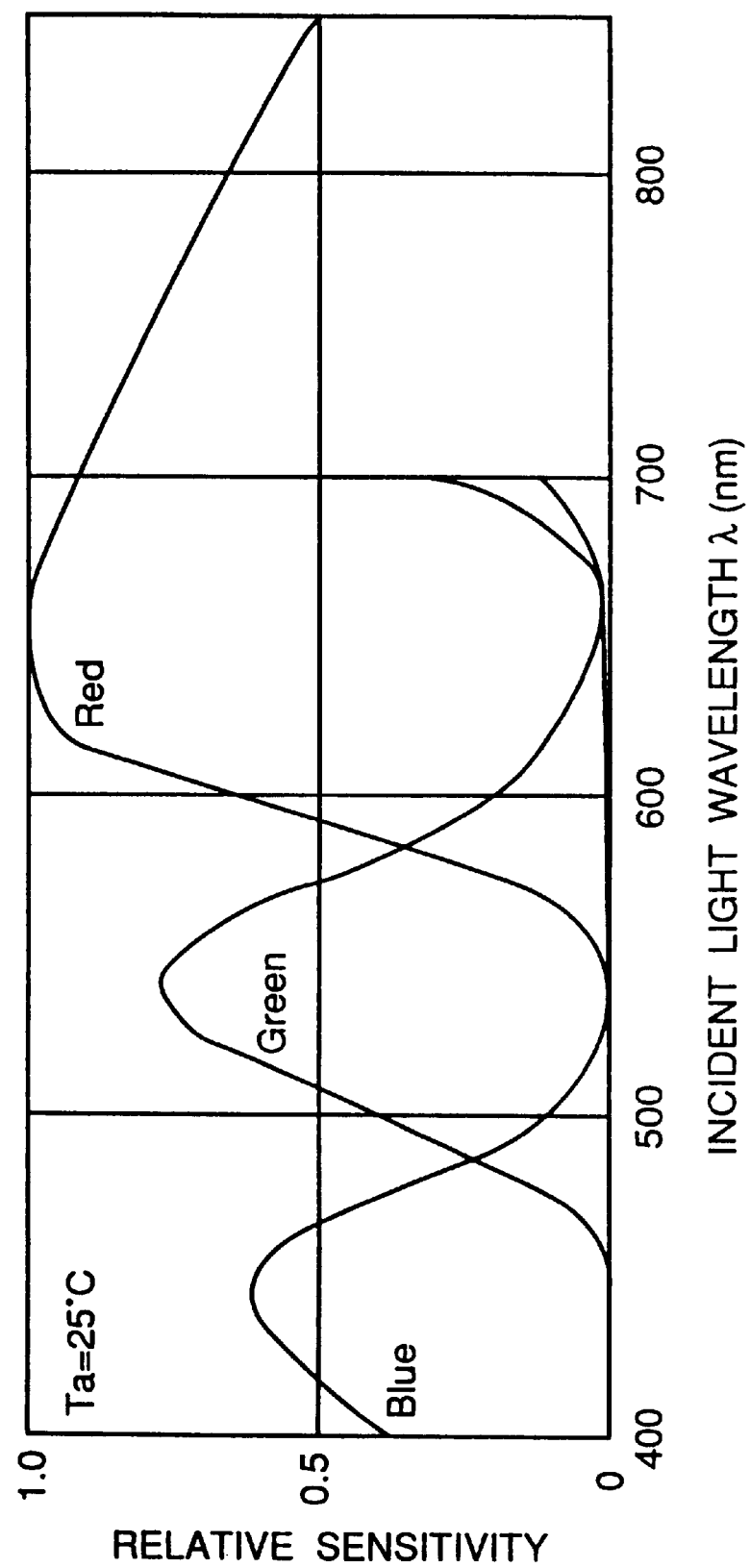
FIG. 22 is a chart showing the spectral sensitivity characteristics of the CCD sensor in the embodiment.

The sensor 1121 is composed of a single photosensor element array, in which the photosensor elements are provided with evaporated filters of R, G and B colors which are cyclically arranged in the order of R, G, B, R, G, B . . . thereby constituting a reading system in which a pixel consisting of a set of R, G and B photosensor elements is the minimum reading area. The spectral characteristics of said filters are shown in FIG. 22. The elements equipped with the R filter are sensitive also to the invisible spectral region above 700 nm, and are capable of satisfactory image reading in the near-infrared region around 800 nm, by the use of the filter 1123 and the dichroic filter 1130. For the photosensor elements having the G or B filter the relative sensitivity above 700 nm is not shown, because the data from said photosensor elements are used only for the image reading in the visible region. In fact the relative sensitivity above 700 nm can be considered as almost zero in the image reading in the visible region, because the aforementioned near-infrared cut-off filter 1124 is used in the image reading in the visible region.

In order to realize a resolving power of 400 DPI (dots per inch) with this sensor, the minimum reading area should be of a size of 63.5×63.5 μm. Consequently, the R element 152, G element 153 and B element 154 should be of a size of 21.1×63.5 μm each. Also the image reading in the IR region utilizes the R elements, so that the reading area becomes 21.1×63.5 μm.

The image data focused on the sensor 1121 are supplied, in the form of the red (R), green (G) and blue (B) components of the color information, to a signal processing unit 1198. The original scanning unit 1111 is mechanically moved with a velocity V, in the perpendicular direction (hereinafter called sub scanning direction) to the electrical scanning direction (hereinafter called main scanning direction) of the line sensor, thereby scanning the entire area of the original.

A standard white board 1199, positioned to be illuminated by said original illuminating means when it is in a reference position (hereinafter called home position) and positioned at an optical distance same as the distance from the sensor to the original on the platen, serves to correct the unevenness in the image data read by the sensor 1121 when the halogen lamp 1125 is used. More specifically, the data obtained from said white board are used as the correction data in the known shading correction.

The signal processing unit 1198 electrically processes the read R, G and B signals to separate said signals into the components of magenta (M), cyan (C), yellow (Y) and black (BK) for supply to the printer unit 1202. In an original scanning operation of the image scanner unit 1101, one of the above-mentioned components M, C, Y and BK is supplied to the printer unit 1202, so that a printout is completed by four original scanning operations in total.

(Printer Unit)

The M, C, Y and BK image signals supplied from the image scanner unit 1101 are sent to a laser driver 1212, which modulates a semiconductor laser 1213 according to the image signal. The emitted laser beam is guided through a polygon mirror 1214, an f-θ lens 1215 and a mirror 1216 and scans a photosensitive drum 1217.

A magenta developing unit 1219, a cyan developing unit 1220, a yellow developing unit 1221 and a black developing unit 1222 are brought in turn into contact, by means of an unrepresented sliding mechanism, with the photosensitive drum 1217 to develop the electrostatic latent images of M, C, Y and BK colors formed on thereon with toners of corresponding colors.

A sheet supplied from a sheet cassette 1224 is wound on a transfer drum 1223 and the toner images developed on the photosensitive drum 1217 are transferred onto said sheet.

After the successive transfers of four color images of M, C, Y and BK in this manner, the sheet is discharged through a fixing unit 1226.

(Original Scanning)

Figure 28:
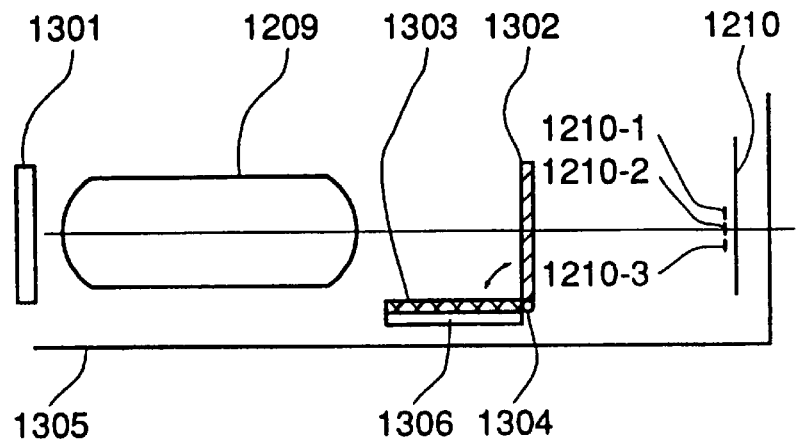
FIG. 28 is a schematic view showing the vicinity of the lens and the CCD sensor in a reduction optical system in an embodiment 2-2.
Figure 30:
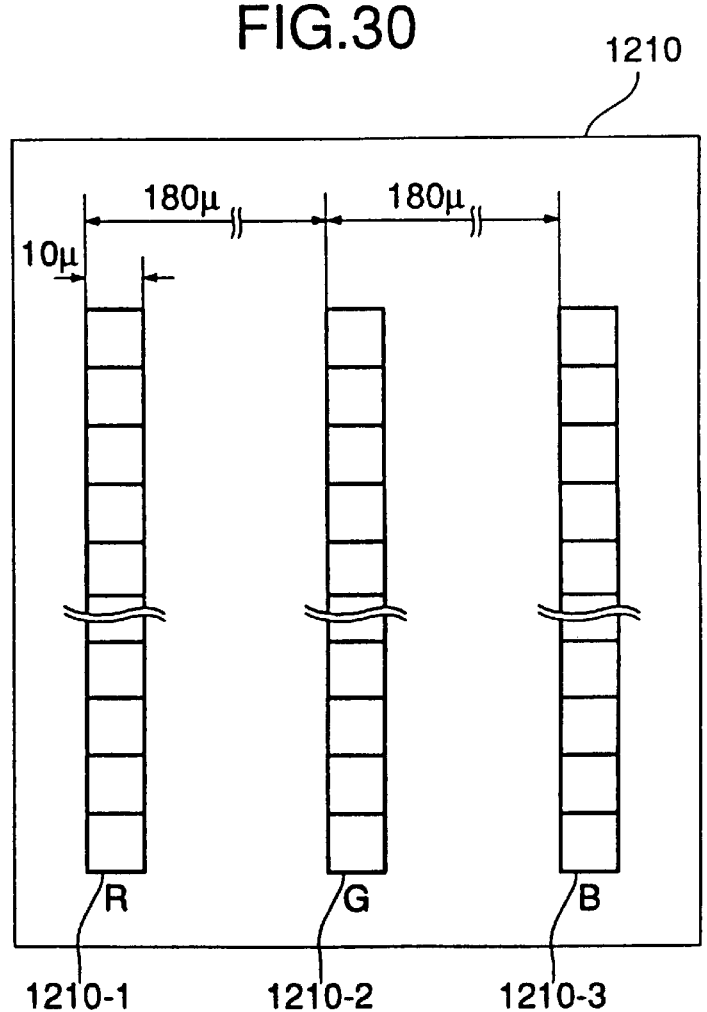
FIG. 30 is a view showing the structure of the CCD sensor in the embodiment 2-2.

In the following the original scanning sequence in the present embodiment will be explained with reference to a flow chart shown in FIG. 26. When the original is set on the platen 1103 and a start button of the full color copying apparatus shown in FIG. 28 is depressed, the aforementioned movable stable 1128 is moved to the right in FIG. 17 and is set in a state for reading the image in the near-infrared region (S1). In this state there are conducted the fetching of the shading correction data (S2) and the first pre-scanning (S3) and the image data of the near-infrared region, read by the sensor elements with the R filter with a density of 400 DPI both in the main and sub scanning directions, are subjected to A/D conversion into 8-bit digital signals and are stored in a memory (DRAM) 1161 shown in FIG. 19 (S4). Subsequently said movable stage is moved to the left and is set in a state for ordinary image reading in the visible region (S5), and, in this state, there are conducted the fetching of the known shading correction data (S6) and the second pre-scanning (S7). The image data, obtained in color separated state by the sensor elements having the R, G and B filters with a density of 400 DPI both in the main and sub scanning directions, are subjected to A/D conversion into 8-bit digital signals and are supplied to a discrimination unit 1163, together with the image data of the near-infrared region stored in the above-mentioned memory 1161 (S8). If the original is not identified as a specified original by said discrimination unit (S9), the original scanning operation is repeated four times for releasing the aforementioned M, C, Y and BK signals (S10). At the same time the image processing unit 1162 effects image processings such as the variation of the image magnification, masking, undercolor removal etc. and the image signal of one of M, C, Y and BK colors is supplied to the printer unit at each scanning operation (S11).

If the discrimination unit 1163 identifies a specified original (S9), the ordinary image reading operation is suspended. Otherwise the recording control unit 1164 prohibits the faithful image reproduction, for example by painting the entire image with a particular color, or by modifying the recording signal.

(Original Discrimination)

In the following there will be briefly explained the image pattern to be detected in the present invention, with reference to FIGS. 23 and 32.

Figure 23:
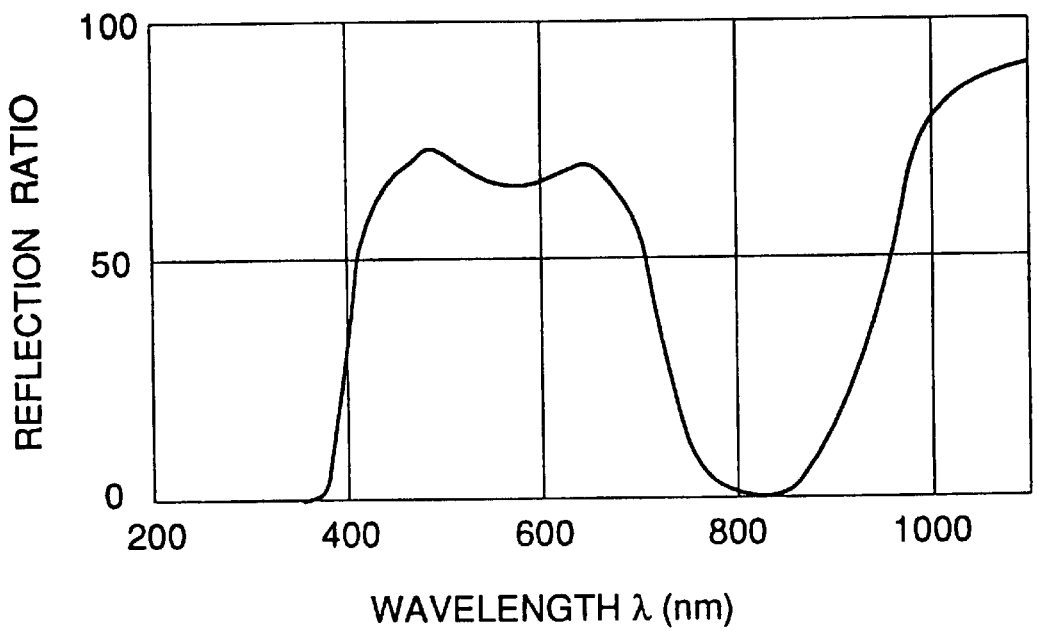
FIG. 23 is a chart showing the spectral transmittance of the near-infrared absorbing ink employed in said embodiment.

The transparent ink shown in FIG. 23 has the spectral characteristics of a transparent dye substantially transmitting the light of the visible region but absorbing the infrared light around 800 nm. A representative example of such dye is SIR-159 supplied by Mitsui Toatsu Chemical Co., Ltd.

Figure 32:
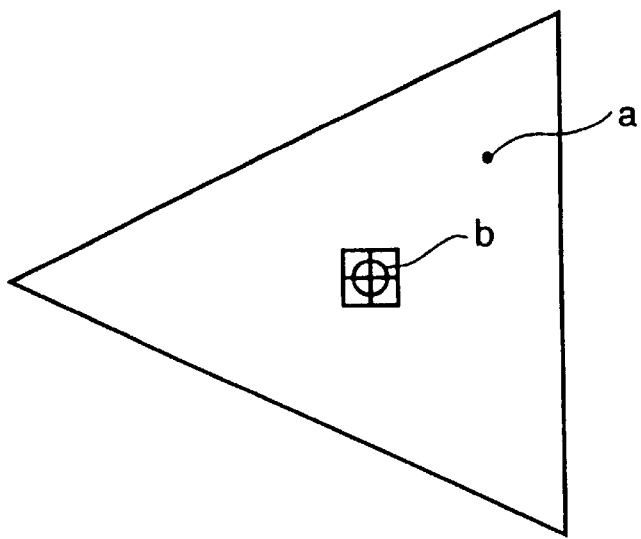
FIG. 32 is a view showing an example of the pattern in the embodiment.

FIG. 32 shows an example of the pattern formed by the transparent ink containing the above-mentioned transparent infrared-absorbing dye. On a triangular pattern recorded with ink reflecting the specified infrared light, a small square pattern b with a side of about 120 $\mu$m is printed with said transparent ink.

Said pattern b, being of almost same color as that of the triangular pattern in the visible region, is unrecognizable to the human eyes, but is detectable in the infrared region. Said pattern of ca. 120 $\mu$m, when read with a density of 400 DPI, corresponds to the size of about 4 pixels, as shown in FIG. 32. In the following there will be explained the details of the discrimination unit 1163 shown in FIG. 19, with reference to FIG. 15 wherein provided are FIFO memories 131–135 each having a capacity capable of retaining the data of a line of the 1121.

Figure 33:
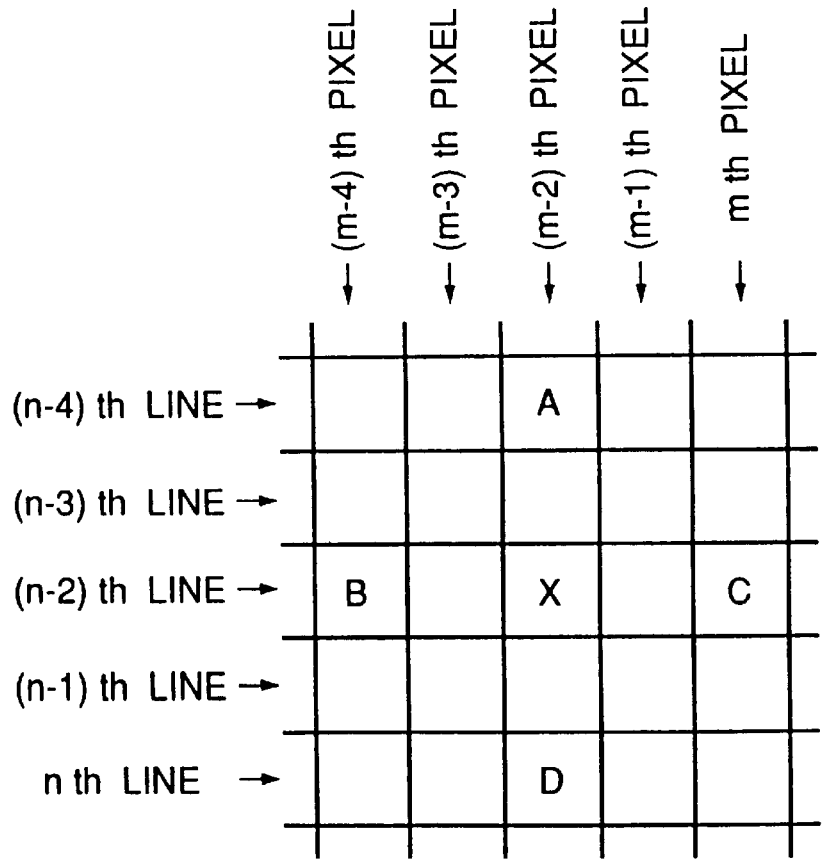
FIG. 33 is a view showing the method for discriminating a specified original in the embodiment.

The four FIFO memories are mutually connected as shown in FIG. 15, so that, when the pixel data of an n-th line are entered into the FIFO memory 131, the FIFO memories 131, 132, 133, 134 respectively release the data of an (n−1)-th line, an (n−2)-th line, an (n−3)-th line and an (n−4)-th line. The input signal and the output signals of the FIFO memories 131–134 are supplied to a delay circuit 135, which has several pixel delay circuits for the entered m-th pixel signal, thereby supplying an operation circuit 136 with the data of the (m−1)-th, (m−2)-th, (m−3)-th and (m−4)-th as well as the m-th pixel. Consequently the operation circuit 136 receives the data of 25 pixels in total. The map of the entered data is shown in FIG. 33. With respect to the object pixel position X, four pixels A, B, C and D are positioned as shown in FIG. 33. Therefore, if the object pixel X is reading the pattern b in FIG. 32, the pixels A, B, C and D are reading the image of the pattern a positioned therearound.

(Discrimination Algorithm)

Let us assume that the signal of the pixel A is composed of an R component $A_R$, a G component $A_G$, a B component $A_B$ and an IR component $A_{IR}$, and likewise for the pixels B, C and D. The averages $Y_R$, $Y_G$, $Y_B$ and $Y_{IR}$ of the same color component in the signals of the pixels A, B, C and D are determined by the following equation:

$$Y_K = \tfrac{1}{4}(A_K + B_K + C_K + D_K) \quad (K=R, G, B, IR)$$

The discrimination of the object pattern is made according to the difference between the average $Y_K$ determined in the foregoing equation and the object pixel X. More specifically, the object pattern is discriminated as present when the next relation stands:

$$\Delta K = |Y_K - X_K| \quad (K=R, G, B, IR)$$

wherein:

$$(\Delta R < H) \cap (\Delta G < H) \cap (\Delta B < H) \cap (\Delta IR > J) \quad (H, J: \text{constant})$$

Figure 34:
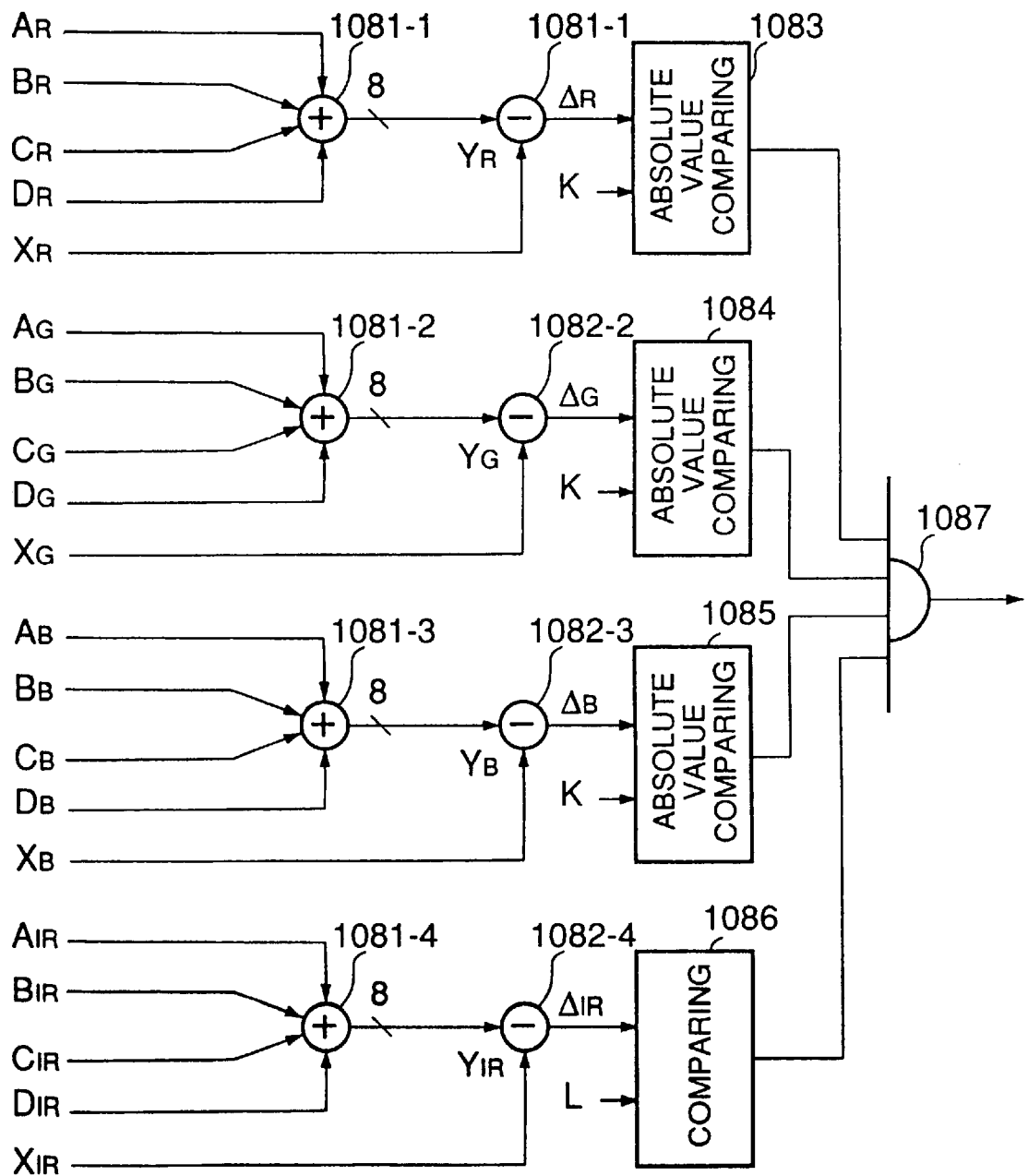
FIG. 34 is a block diagram of the hardware realizing the discriminating algorithm of the embodiment.

In this situation, in comparison with the surrounding pixels, the object pixel is little different in the color hue in the visible region and has a difference exceeding a constant L in the infrared region. FIG. 34 shows an example of the hardware realizing the discrimination algorithm explained above.

Adders 1081 respectively add the components of four pixels and release upper 8 bits to obtain $Y_R$, $Y_G$, $Y_B$ and $Y_{IR}$, respectively. Subtractors 1082 calculate the differences from the components of the signal of the object pixel. For three components R, G and B, the absolute values of said differences are respectively compared with the constant H in comparators 1083, 1084 and 1085. On the other hand, the infrared component is compared with the constant J in a comparator 1086. The outputs of the above-mentioned comparators are supplied to an AND gate 1087, and the object pattern is discriminated as present when an output signal "1" is obtained from said AND gate.

(Embodiment 2-2)

Figure 29:
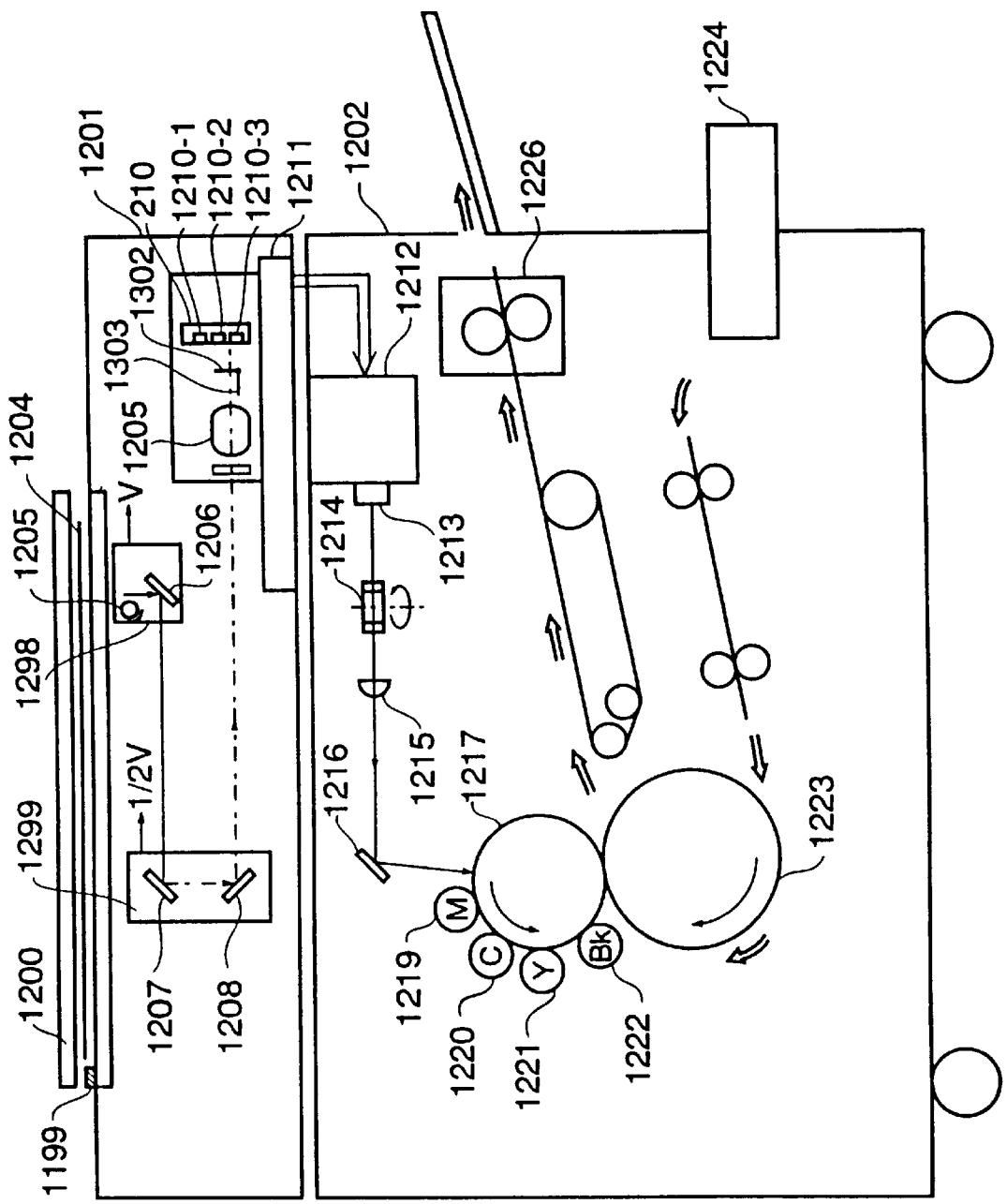
FIG. 29 is a view showing the structure of a full-color copying machine in the embodiment 2-2.

FIG. 29 is a schematic view of a full-color copying machine employing an embodiment 2-2 of the present invention, wherein provided are an image scanner unit 1201, and a full-color printer 1202 same as in the embodiment 2-1. An original illuminating halogen lamp 1205 and a first mirror 1206 are included in a first original scanning unit 1298. Second and third mirrors 1207, 1208 are included in a second original scanning unit 1299. In the original scanning operation, the first original scanning unit 1298 is driven with a velocity V by unrepresented drive means, while the second original scanning unit 1299 is driven with a velocity V/2 in the same direction as that of the first original scanning unit, by means of the unrepresented drive means, whereby the light reflected from an original 1204 on the platen glass 1203 is focused on a 3-line CCD sensor 1210 through a condenser lens 1209, maintaining always a constant optical distance, 1211 indicates a signal processing unit.

FIG. 28 is a schematic view around the condenser lens and the CCD sensor in said embodiment 2-2, which employs a 1:6 reduction optical system in the image scanner unit 1201.

In FIG. 28, there is provided a 3-line sensor 1210 of which basic structure is shown in FIG. 34. The lines respectively bear R, G and B dyes evaporated thereon. Each pixel has a size of 10×10 μm, and the lines are separated by a distance of 180 μm. Said line distance corresponds to a spatial aberration 1.08 mm on the original in the sub scanning direction, so that, in the actual original reading operation, the signal processing unit 1211 delays the preceding R and G signals in the sub scanning direction to match the B signal. A far infrared cut-off filter 1301 has the same spectral characteristics as those of the dichroic mirror 1130 in the embodiment 2-1 shown in FIG. 17. A visible cut-off filter 1302 and a near-infrared cut-off filter 1303 have the substantially same spectral characteristics as those of the filters 1123, 1124 in the embodiment 2-1. Also, as in the embodiment 2-1, the filter 1303 is provided with a focus correcting transparent glass plate 1306 of a high refractive index. Said filters 1302, 1303 are mutually separated by an angle 90° on a rotary shaft 1304, which is connected to an unrepresented stepping motor with a minimum rotation angle of 3.6°. Thus, said filters 1302, 1303 can be switched by rotating said stepping motor by 25 pulses in a direction CW or CCW.

(Embodiment 2-3)

Figure 31:
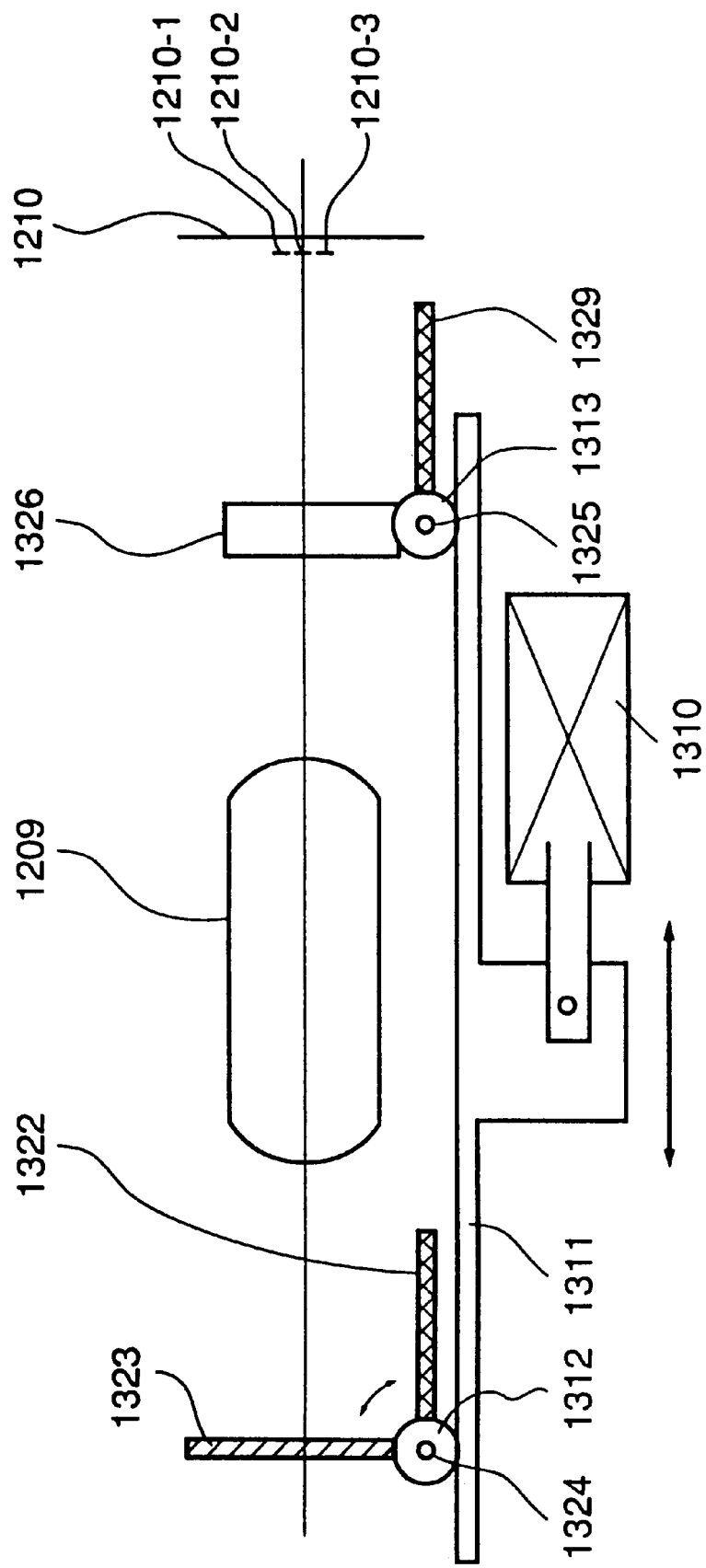
FIG. 31 is a schematic view showing the vicinity of the lens and the CCD sensor in a reduction optical system in an embodiment 2-3.

FIG. 31 is a schematic view around the lens and the CCD sensor of the full-color image scanner employing a reduction optical system, wherein a visible cut-off filter 1322 for cutting off the visible light below a wavelength 750 nm, and an infrared cut-off filter 1323 for cutting off the light above a wavelength 750 nm, are positioned mutually perpendicularly about a rotary shaft 1324. Also a filter 1329, for cutting off the light above a wavelength 850 nm, and a glass plate 1326 of a thickness of 2 mm for focus correction between the visible image reading and the near-infrared image reading, are fixed on a rotary shaft 1325. Said two rotary shafts 1324, 1325 respectively have pinions 1312, 1313, and a linear movement of a rack 1311 connected to a solenoid 1310 simultaneously switches the filters 1322, 1323 and the filters 1326, 1329.

(Other Embodiments)

The foregoing embodiment employs a transparent dye capable of absorbing the infrared light around 800 nm, but such dye is not limitative and there may be employed any substance which is nearly transparent in the visible region and is capable of absorbing the light of a specified wavelength range in the invisible region.

The switching between two filter systems can also be achieved by moving the image reading sensor with respect to fixed filter means.

The optical filters are not limited to flat ones but may also be curved.

Also the correction for focus position in different wavelength regions may be achieved by a movement of the sensor or the lens.

Also the image reading sensor is not limited to the line sensor.

The foregoing embodiment employs a halogen lamp, but there may be employed any light source capable of emitting the light in the visible and near-infrared regions.

Also in the foregoing embodiment the standard white board is commonly used for visible image reading and for infrared image reading, but there may be employed separate standard boards respectively for both image readings.

The solid-state image reading device can be composed, in addition to the charge-coupled device (CCD) explained above, of a MOS sensor or an amplifying device in which a capacitative load is connected to the emitter of a phototransistor, as disclosed in the U.S. Pat. No. 4,791,469 awarded to the inventors T. Ohmi and N. Tanaka.

As explained in the foregoing, the embodiments allow to securely detect the feature of the original with a simple structure.

(Embodiment 3-1)

Figure 36:
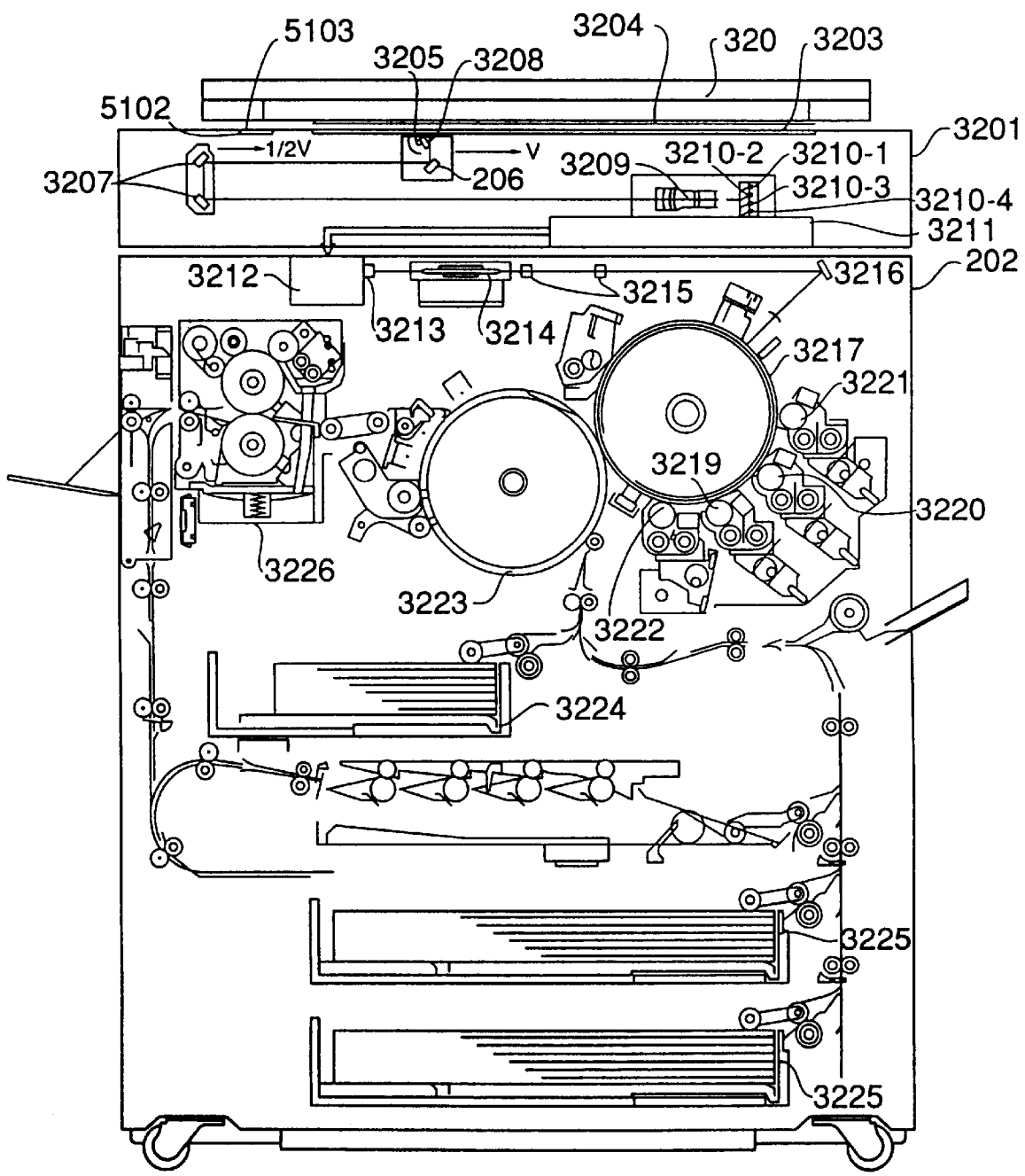
FIG. 36 is a view showing the structure of a color copying apparatus employing the present invention.

FIG. 36 is a view of the apparatus constituting an embodiment 3-1 of the present invention, wherein provided are an image scanner unit 3201 for reading the original and effecting the digital signal processing, and a printer unit 3202 for printing a full-color image on a sheet, corresponding to the original image read by the image scanner 3201.

The image scanner unit 3201 is provided with a pressure plate 3200. An original 3204 placed on a platen glass 3202 is illuminated by the light coming from a halogen lamp 3205 through an infrared cut-off filter 3208, and the reflected light from said original is guided by mirrors 3206, 3207 and is focused by a lens 3209 onto a 4-line sensor (hereinafter called CCD) 3210, whereby the full-color information consisting of red (R), green (G) and blue (B) components and the infrared (IR) component are supplied to a signal processing unit 3211.

A standard white board 5102 generates correction data for the data read by the R, G, B sensors 3210-2 to 3210-4.

Figure 42:
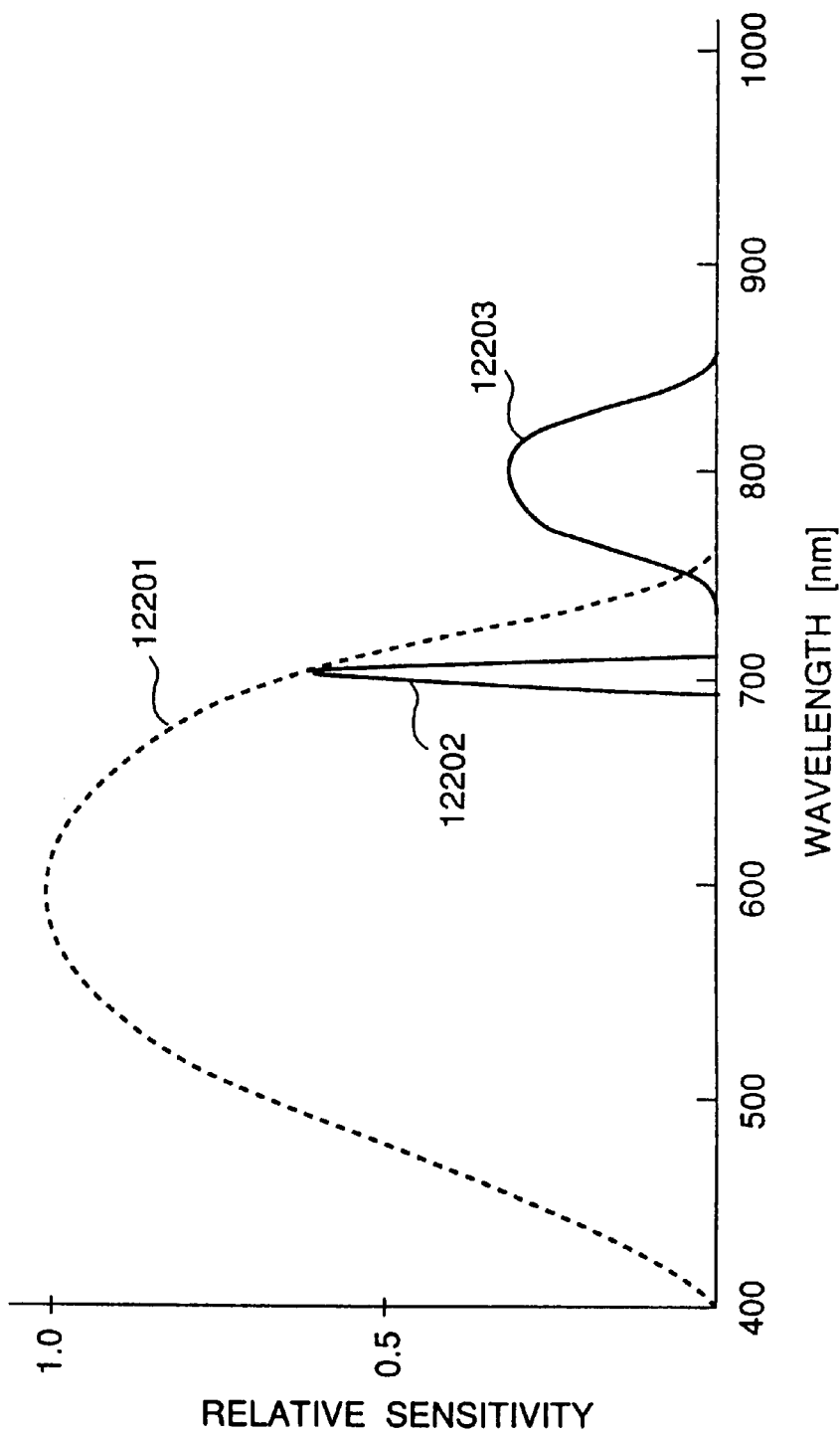
FIG. 42 is a chart showing the spectral characteristics of fluorescent light in the embodiment.

A reference fluorescent plate 5103 is uniformly coated with fluorescent ink showing fluorescent characteristics as shown in FIG. 42 and substantially same as those of the fluorescent information to be detected, and is used for the correction of the output data of the IR sensor 3210-1.

The signal processing unit 3211 electrically processes the read signals to separate the magenta (M), cyan (C), yellow (Y) and black (BK) components, for supply to the printer unit 3202. In each original scanning operation in the image scanner unit 3201, one of the M, C, Y and BK components is plane sequentially supplied to the printer unit 3202, whereby a printout is completed by four original scanning operations in total.

The M, C, Y and BK image signals coming from the image scanner unit 3201 are supplied to a laser driver 3212, which in response modulates a semiconductor laser 3213. The emitted laser beam is guided by a polygon mirror 3214, an f-θ lens 3215 and a mirror 3316 and scans a photosensitive drum 3217.

A magenta developing unit 3219, a cyan developing unit 3220, a yellow developing unit 3221 and a black developing unit 3222 in succession develop the electrostatic latent images of M, C, Y and BK colors with corresponding toners.

A sheet supplied from a sheet cassette 3224 or 3225 is wound on a transfer drum 3223, and the toner images developed on the photosensitive drum 3217 are transferred onto said sheet.

After the transfers of the four images of M, C, Y and BK colors in succession, the sheet is discharged through a fixing unit 3226.

Figure 37:
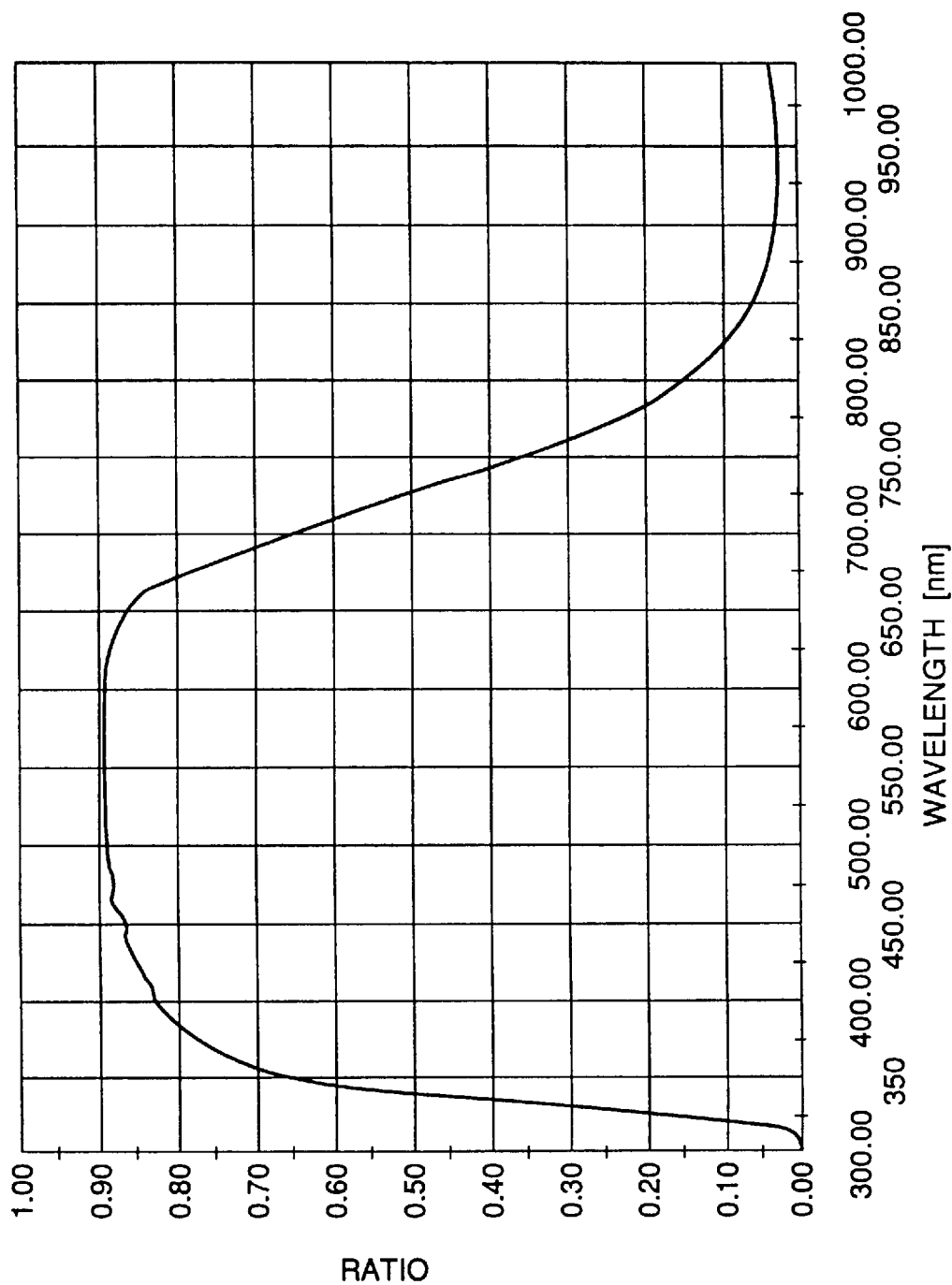
FIG. 37 is a chart showing the spectral characteristics of the filter positioned immediately after the original illuminating lamp in the embodiment.
Figure 38:
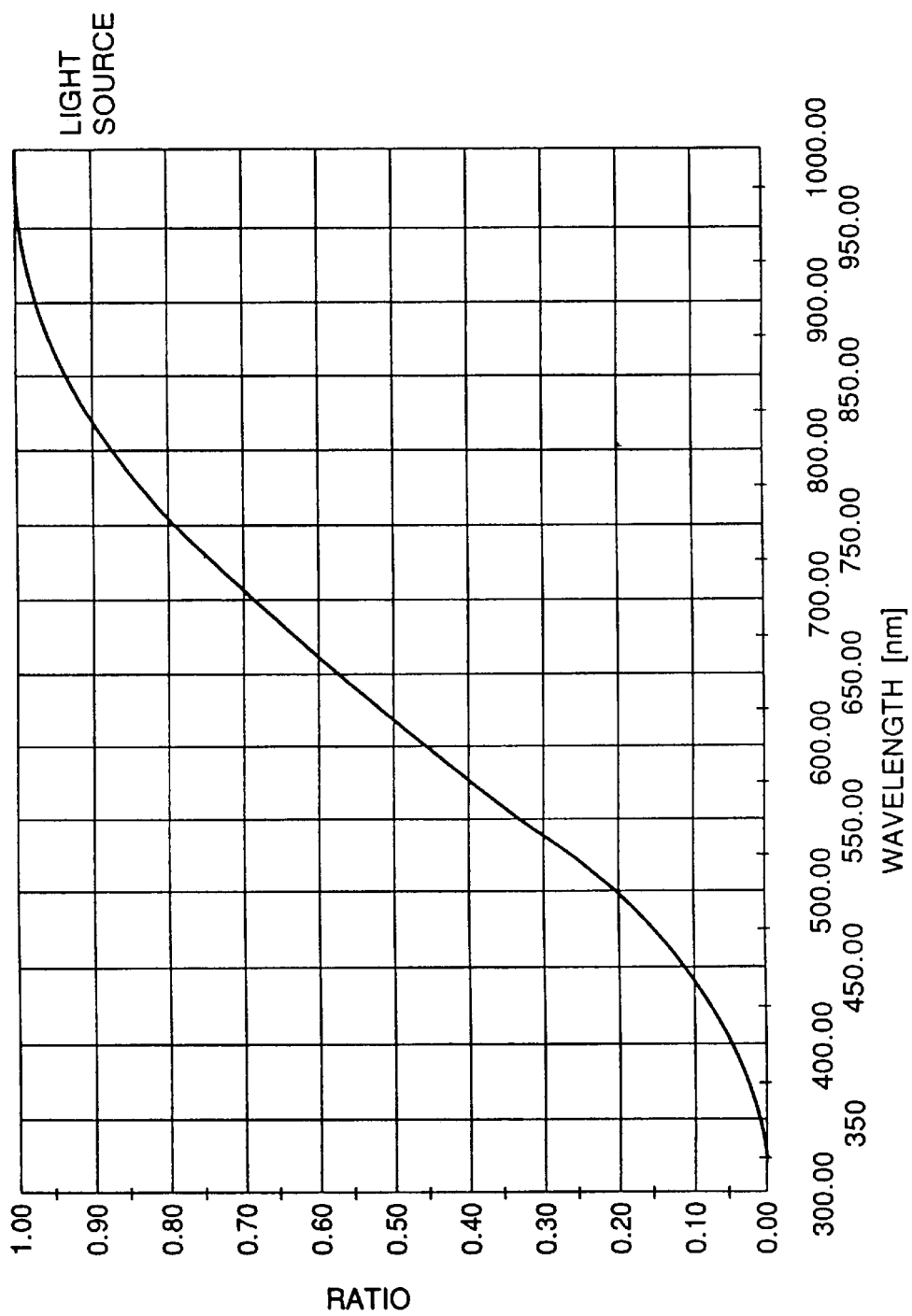
FIG. 38 is a chart showing the spectral characteristics of the original illuminating lamp employed in the embodiment.

FIG. 37 shows the spectral characteristics of an infrared cut-off filter 3208 positioned between the illuminating halogen lamp 3205 and the platen glass 3203, and said filter cuts of the infrared component above about 700 nm, within the spectral emission of the halogen lamp 3205 shown in FIG. 38.

Figure 39A:
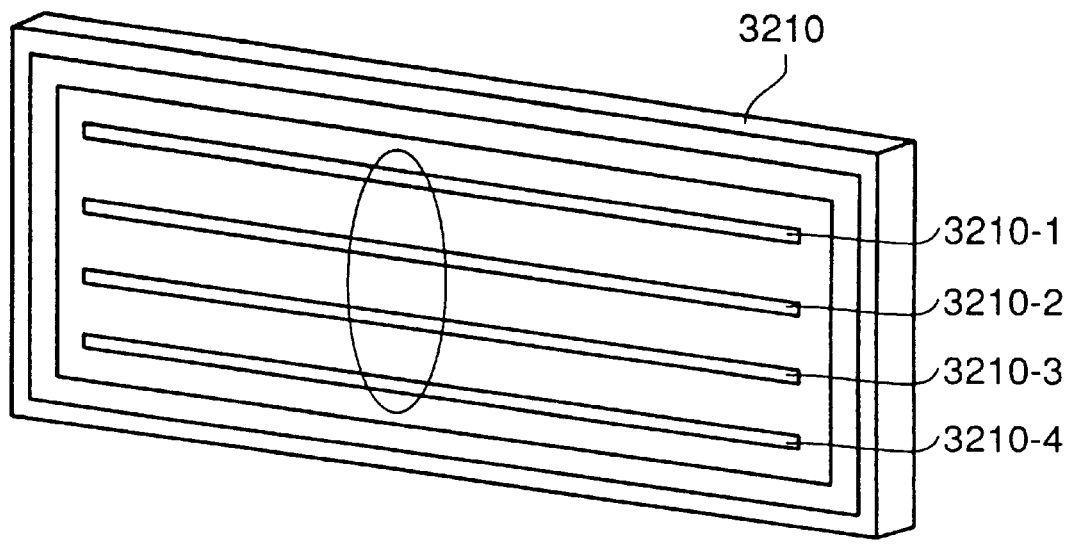
FIGS. 39A and 39B are views showing the structure of the CCD sensor employed in the embodiment.

FIG. 39A shows the structure of the sensor 3210 (composed of CCD line sensors in the present embodiment).

There are provided a photosensor array 3210-1 for reading the infrared (IR) light, and photosensor arrays 3210-2, 3210-3, 3210-4 for respectively reading the R, G and B light components.

Said four photosensor arrays of different optical characteristics are formed on a same silicon chip in monolithic manner, in mutually parallel arrangement in order to read a same line on the original.

Such configuration of the sensor allows to use the optical system, such as the lens, commonly for the visible light reading and the infrared light reading. It is thus rendered possible to improve the precision of the optical adjustment and to facilitate the operation thereof.

Figure 39B:
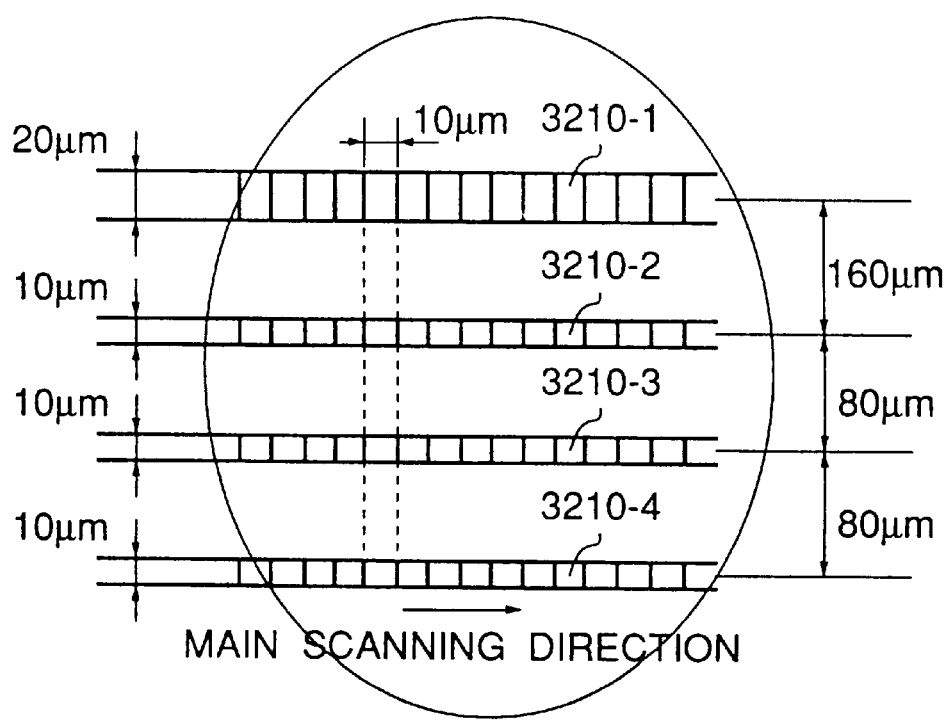

FIG. 39B is a magnified view of the photosensor elements, each having a length of 10 μm per pixel in the main scanning direction. Each sensor has 5000 pixels in the main scanning direction, in order to read the shorter side (297 mm) of the A3-sized original with a resolving power of 400 dpi. The R, G and B sensors are mutually separated by a distance of 80 μm, corresponding to 8 lines for the sub scanning resolving power of 400 lpi.

Figure 40:
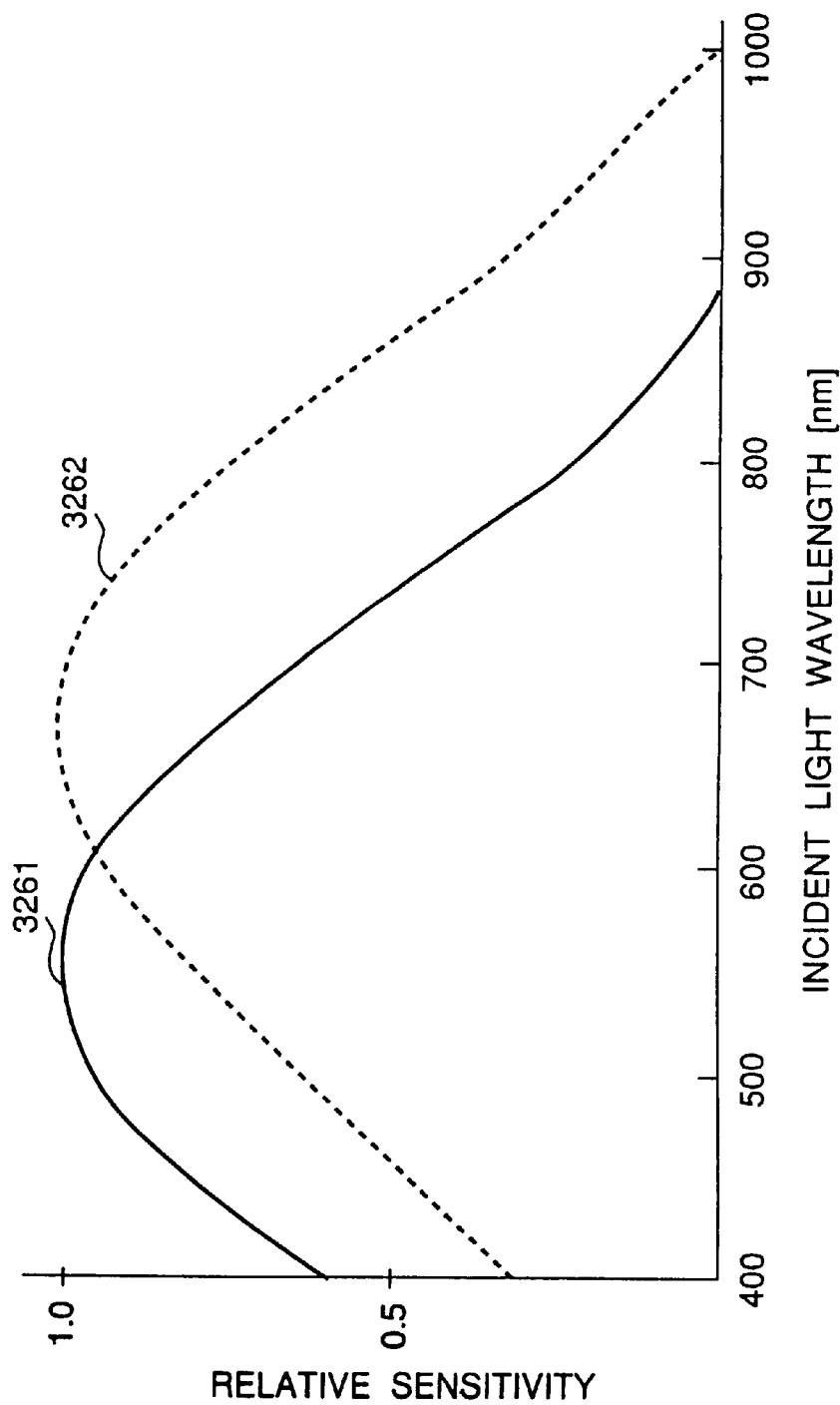
FIG. 40 is a chart showing the spectral sensitivity characteristics of the CCD employed in the embodiment.

The IR line sensor 3210-1 and the R sensor 3210-2 are separated by a distance of 160 μm (16 lines) corresponding to the double of other line spacings. FIG. 40 shows the spectral sensitivities of this CCD, wherein curves 3261, 3262 respectively show the spectral characteristics of the CCD's for visible light and the CCD for IR light.

The R, G and B sensors 3210-2–3210-4 have apertures of 10 μm in the sub scanning direction, but the IR sensor 3210-1 has a doubled aperture of 20 μm, in consideration of a fact that said sensor reads the fluorescent light of the IR light.

In general, the intensity of the fluorescent light is less than half, often about 10% or even less, of that of the exciting light. The present embodiment secures the dynamic range of the infrared read signal by increasing the light-receiving area per pixel, sacrificing the sub scanning resolving power of the IR sensor.

In the present embodiment, the dynamic range of the read signal is secured by increasing the length of each pixel of the IR sensor in the sub scanning direction, but it is also possible to increase the length of each pixel in the main scanning direction, sacrificing the resolving power therein.

However, the above-mentioned difference in the size of the apertures may be unnecessary if a sufficient dynamic range can be secured in the output of the IR sensor.

The line sensors are provided with optical filters thereon, in order to attain predetermined spectral characteristics in the IR, R, G and B regions.

Figure 41:
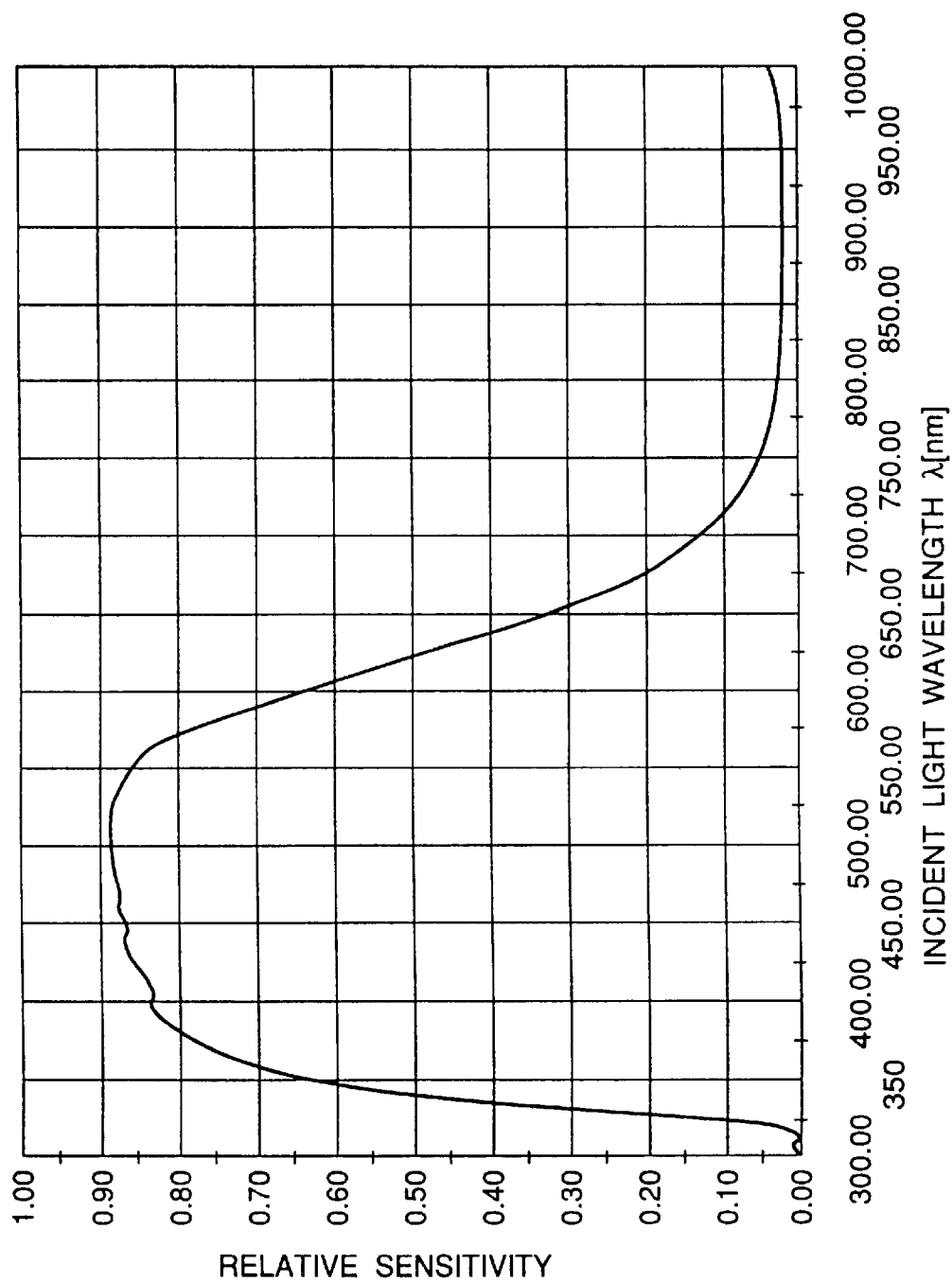
FIG. 41 is a chart showing the spectral characteristics of the infrared cut-off filter employed in the embodiment.

The spectral characteristics of the G, R and B line sensors will be explained in the following, with reference to FIGS. 2 and 41.

FIG. 2 shows the characteristics of the conventional R, G and B filters, which also transmit the infrared light above the wavelength of 700 nm. For this reason, an infrared cut-off filter as shown in FIG. 41 has conventionally been provided on the lens 209. In the present embodiment, however, the lens 209 cannot have such infrared cut-off filter, because the infrared component transmitted by said lens 209 is read by the IR sensor 3210-1.

In order to exclude the influence of said infrared light, the infrared cut-off filter is to be provided only between the R, G and B sensors and the lens.

FIG. 3 shows the characteristics of a visible cut-off filter provided on the IR sensor 3210-1. Said filter serves to eliminate the visible light component entering the IR sensor for reading the fluorescent component of the IR region.

Figure 35:
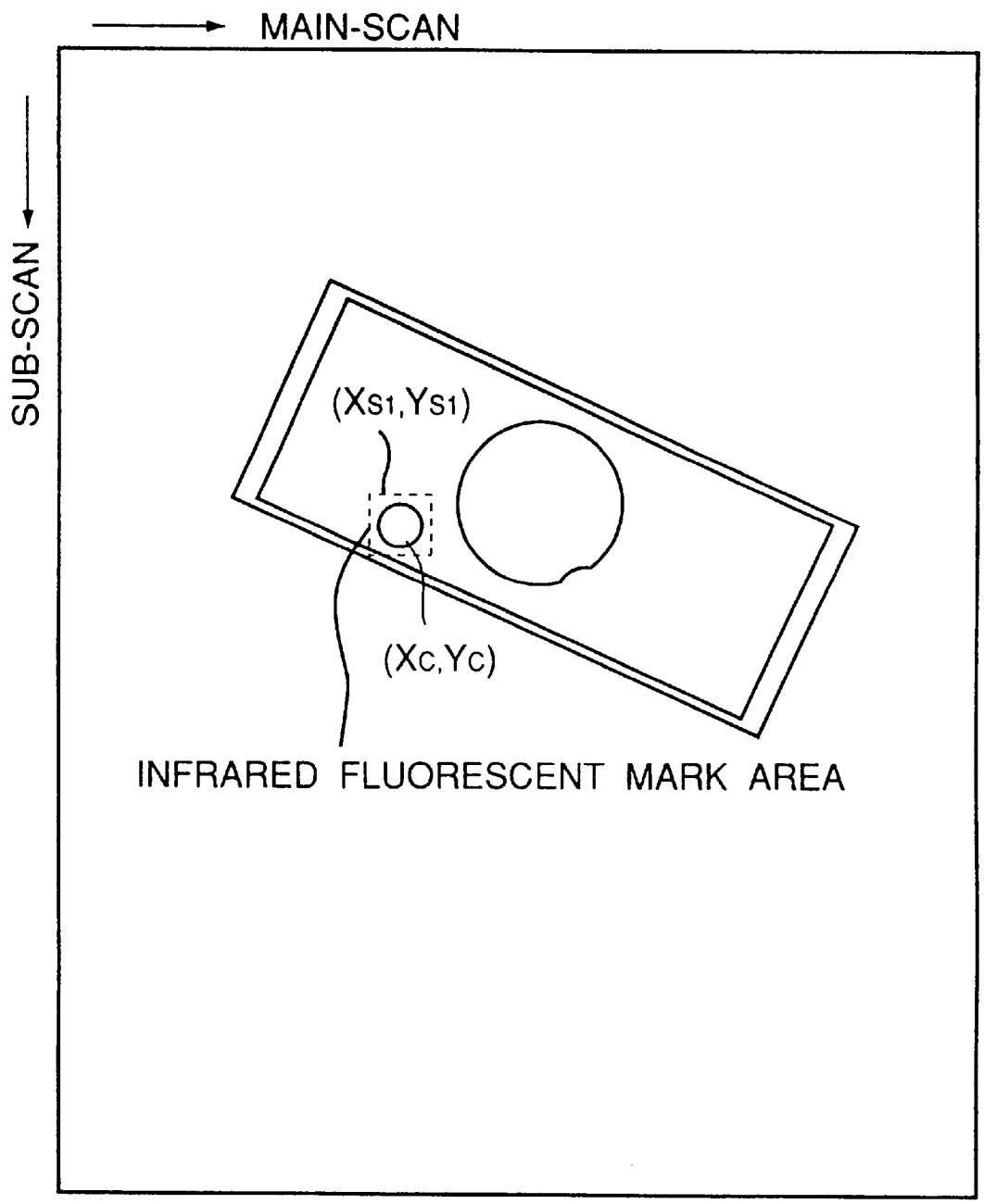
FIG. 35 is a view showing the state of detecting the identification mark of a copy-inhibited original, in an embodiment 3-1.

In the present embodiment there is conceived, as an example of the copy prohibited original, an original marked in a position (Xc, Yc) shown in FIG. 35 with ink having the above-explained fluorescent characteristics.

If the above-mentioned mark is detected in the infrared signal read from the original on the platen, the ordinary image forming operation is prohibited.

However the copy prohibited original is not limited, in size and in the marking, to that shown in FIG. 35.

FIG. 42 shows the reflective spectral characteristics of a recognition mark contained in the copy prohibited original.

A curve 12201 indicates the synthesized spectral characteristics of the halogen lamp 3205 and the infrared cut-off filter 3208 positioned between said lamp and the platen glass 3203. In the present embodiment, the copy prohibited original is recognized by utilizing, within said spectral characteristics, an infrared component 12202 around 700 nm as the exciting light and detecting infrared fluorescent light 12203 having peak at about 800 nm, coming from the recognition mark.

The present embodiment employs a halogen lamp as the original illuminating lamp for simultaneously emitting at least the visible light and the exciting light component for the infrared fluorescence, and the filter 3208 is employed for preventing a wavelength component of the infrared fluorescent from reaching the original.

In the present embodiment, the recognition mark is composed of a substance capable of being excited by the infrared light and generating infrared fluorescence. For this reason said recognition mark can have arbitrary characteristics for the visible light. In the present embodiment there is employed infrared fluorescent ink which is substantially transparent to the visible light, so that the infrared fluorescent light can be detected without the recognition mark in the copy prohibited original being noticed by the general public.

In the following, the principle of IR fluorescence reading will be briefly explained. The original 3204 on the platen glass 3203 is illuminated by the light coming from the halogen lamp 3205 through the infrared cut-off filter 3208. In general, the intensity of the fluorescence for example of 800 nm emitted from the recognition mark is weak, less than half, often about 10%, of that of the exciting light.

For this reason, within the light directly reflected from the original, longer wavelength components containing the wavelength component of the aforementioned infrared fluorescent light of 800 nm is eliminated by the infrared cut-off filter 208, whereby the wavelength component of 800 nm entering the CCD is substantially composed of the fluorescent component.

As explained in the foregoing, the light illuminating the original is made free of the spectral component of the fluorescent light generated by said recognition mark and is made to sufficiently contain the aforementioned exciting light of 700 nm, whereby the S/N ratio of the fluorescent signal from the recognition mark can be improved.

The reflected light from the original is guided by mirrors 3206, 3207 and is focused by a lens 3209 on the line sensors for reading the red (R), green (G), blue (B) and infrared (IR) components, in the CCD sensor 3210.

Since the R, G and B line sensors 3210-2–3210-4 are provided with the infrared cut-off filter for sufficiently attenuating the exciting light of 700 nm as explained before, the full-color image reading can be achieved without the influence of said infrared exciting wavelength of 700 mn and of the infrared fluorescent light.

Also the IR sensor 3210-1 is provided with a filter for cutting off the wavelength components below 700 nm as shown in FIG. 3, whereby it can only read the infrared fluorescent component 12203 shown in FIG. 42.

These filters enable the extraction of the infrared fluorescent light simultaneously with the operation of reading and recording the original image, whereby the additional original scanning operation, such as the pre-scanning, required only for detecting the recognition mark by the infrared fluorescent light, can be dispensed with.

The configuration explained above satisfactorily separates the ordinary color area and the infrared recognition mark area of the original.

(Embodiment 3-2)

Figure 43:
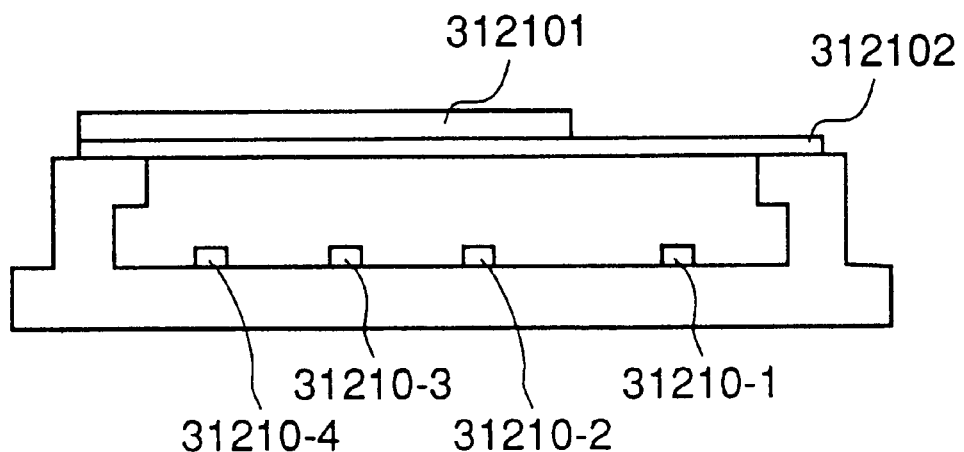
FIG. 43 is an external view of the CCD sensor in an embodiment 3-2.

The filter of the present invention may be provided in any position between the lens and the CCD sensor, capable of separating the visible light beam and the infrared light beam. For example, it may be adhered to a cover glass of the CCD device as shown in FIG. 43, as a part of the CCD. Such structure improves the positional precision, and dispenses with the positional adjustment of the compensating glass plate, thereby enabling to reduce the assembling time.

(Embodiment 3-3)

Figure 44:
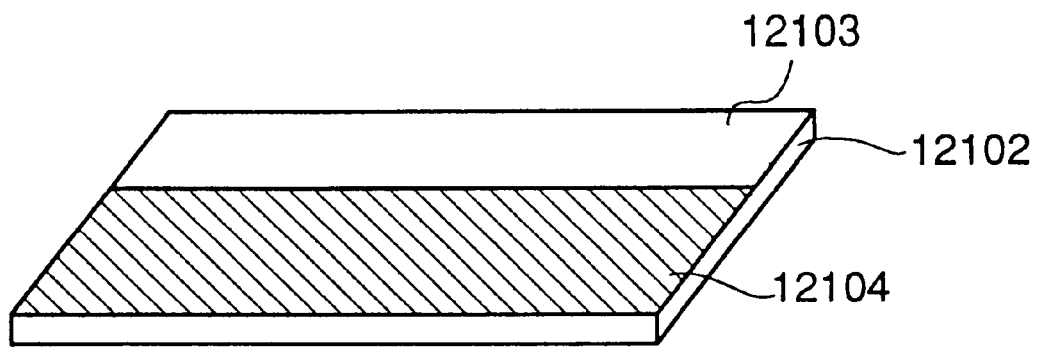
FIG. 44 is an external view of the CCD sensor in an embodiment 3-3.

The filter of the present invention need not necessarily be composed of a pigment or dye filter, but can be composed of a dichroic filter evaporated, as shown in FIG. 44, in a part of the cover glass where the visible light beam passes.

(Embodiment 3-4)

Figure 45:
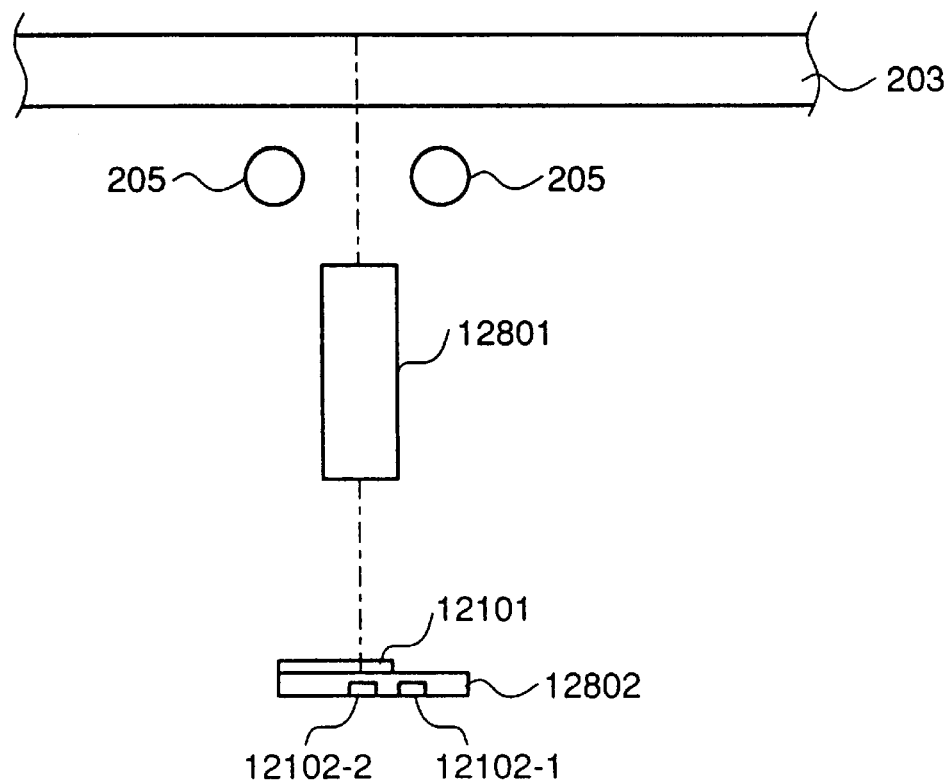
FIG. 45 is a view showing the equal-size optical system in an embodiment 3-4.
Figure 46:
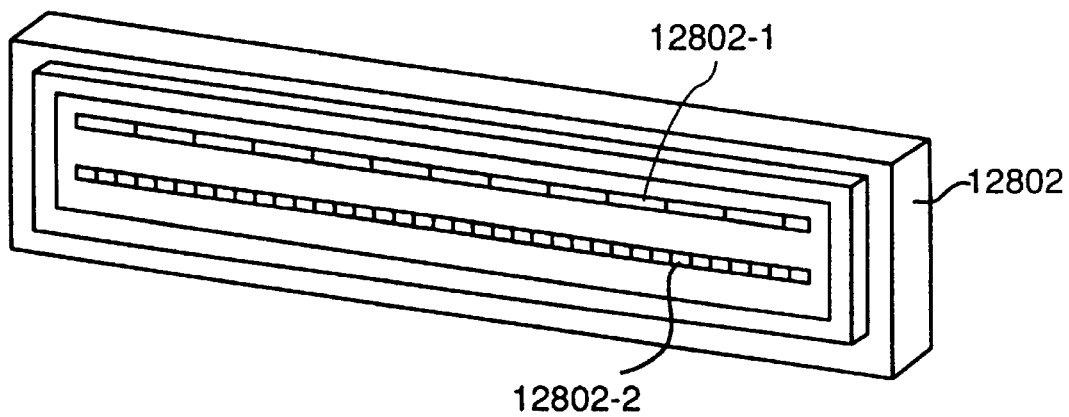
FIG. 46 is a view showing the structure of the CCD sensor employed in the embodiment.

All the foregoing embodiments employ a 4-line sensor of monolithic structure. However, the present invention is applicable also to an equal-size optical system employing a short-focus lens array 12801 as shown in FIG. 46. In such case there may be employed a 2-line sensor consisting, as shown in FIG. 45, of an RGB in-line sensor 12802-2 for visible light reading and an IR sensor 12802-1 for infrared light reading.

(Embodiment 3-5)

Figure 47:
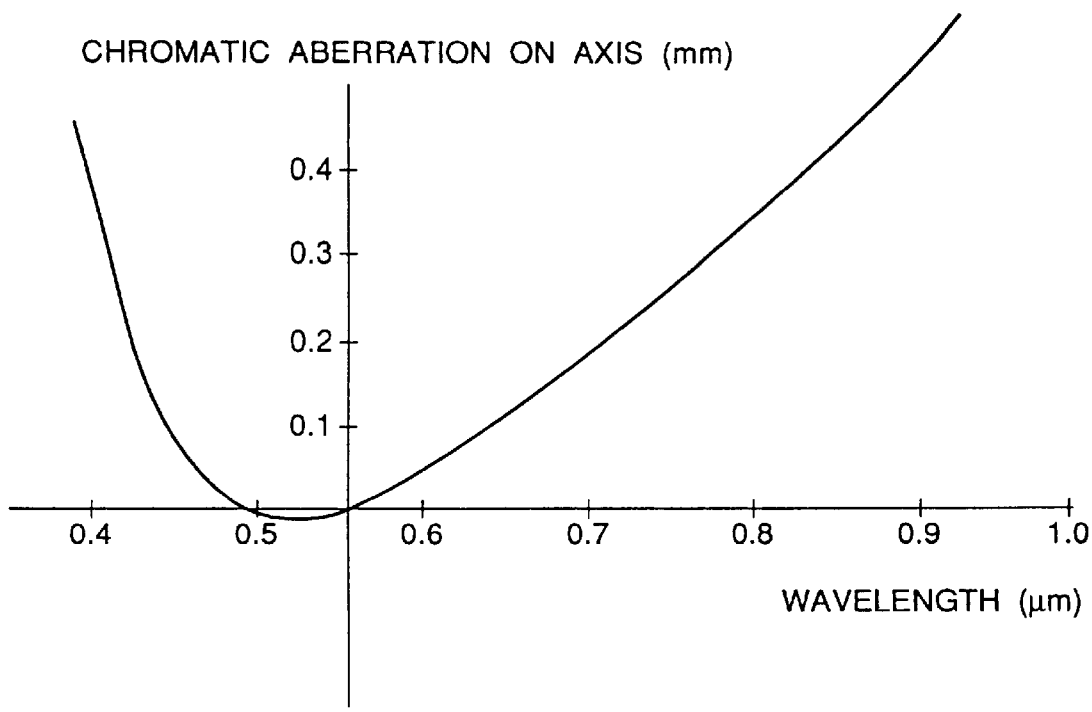
FIG. 47 is a chart showing the axial chromatic aberration of the reading lens.

FIG. 47 shows the aberration (axial chromatic aberration) in the focus position, depending on the wavelength, in the optical system employed in the image reading system of the above-explained spectral characteristics.

As will be understood from FIG. 47, the optical system is usually so designed as to provide a satisfactory resolving power in the visible region, so that the focus position becomes aberrated in the infrared or ultraviolet fluorescent region and the resolving power becomes deteriorated. The correction of said deteriorated resolving power, if made by the lens itself, requires a significantly increased number of lens elements, inevitably resulting in undesirably low cost performance. For correcting said deterioration in the resolving power, therefore, a flat glass plate 12101 for correcting the focus position is inserted between the lens and the sensor for the visible light. Since the difference in the focus position between the visible region and the infrared region is about 0.4 mm as shown in FIG. 47, there can be employed a correcting glass plate with a thickness of 1 to 1.5 mm. In this manner a desired resolving power can be obtained in the entire range including the visible region and the infrared region.

(Embodiment 3-6)

Figure 48:
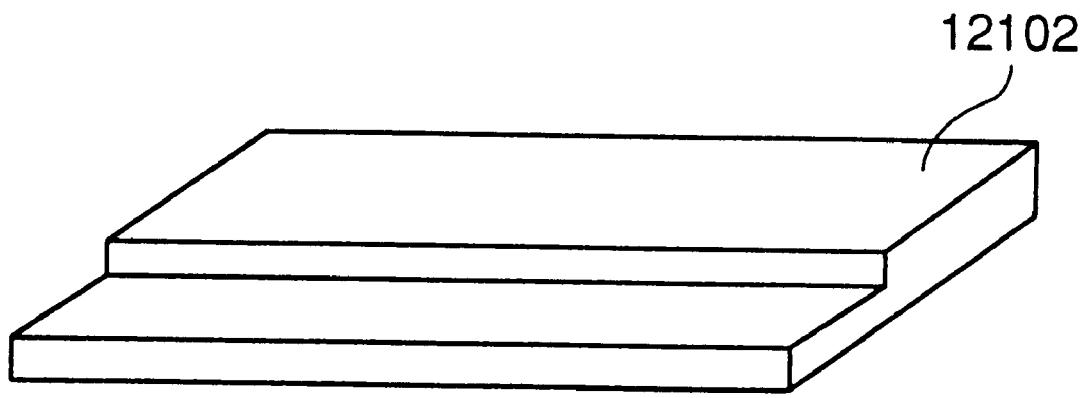
FIG. 48 is a view showing the shape of the CCD cover glass employed in an embodiment 3-6.

The correcting glass plate of the present invention may be integrally formed with the cover glass plate, utilizing plastic molding, as shown in FIG. 48. Such structure improves the precision of alignment, and enables cost reduction since the correcting glass plate is not composed of a separate part.

(Embodiment 3-7)

Figure 49:
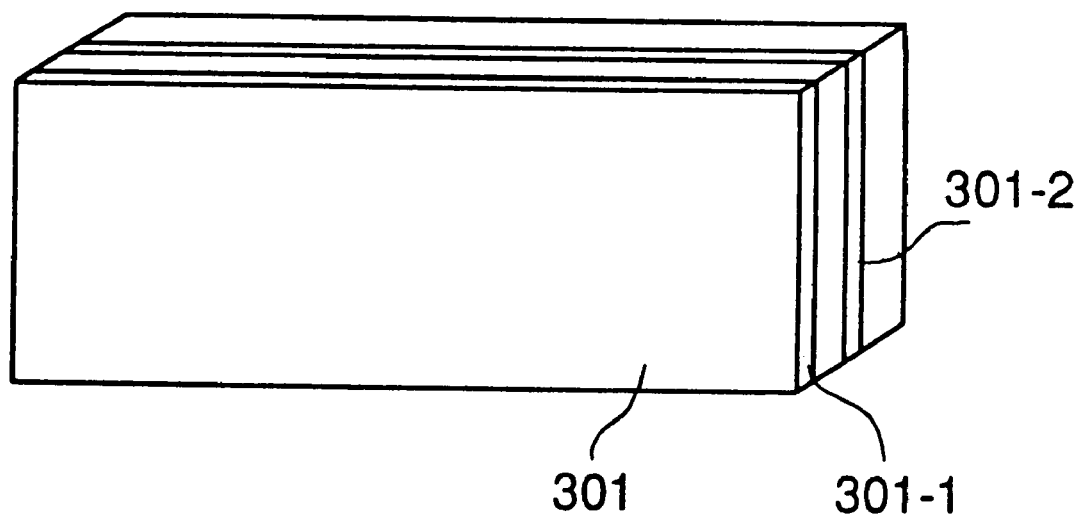
FIG. 49 is an external view of the element for optical path splitting and optical length correction employed in the present invention.

FIG. 49 shows the structure of the optical path splitting means and the optical path length correcting means in the present embodiment, wherein provided are a half mirror 3001-1 for splitting the optical path, and an ordinary mirror 3001-2 with modified characteristics of the reflecting film for obtaining a high reflectance in the infrared region.

Figure 51:
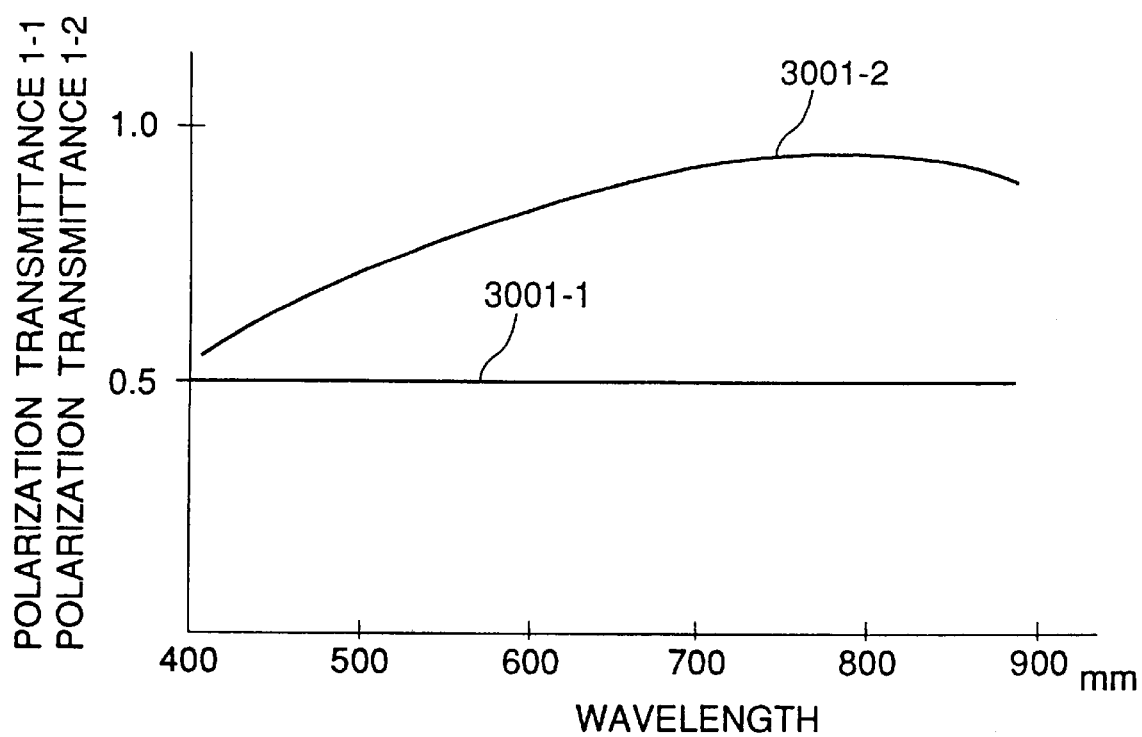
FIG. 51 is a chart showing the spectral characteristics of the element.

FIG. 51 shows the spectral reflectance of the mirrors 3001-1 and 3001-2.

Figure 50:
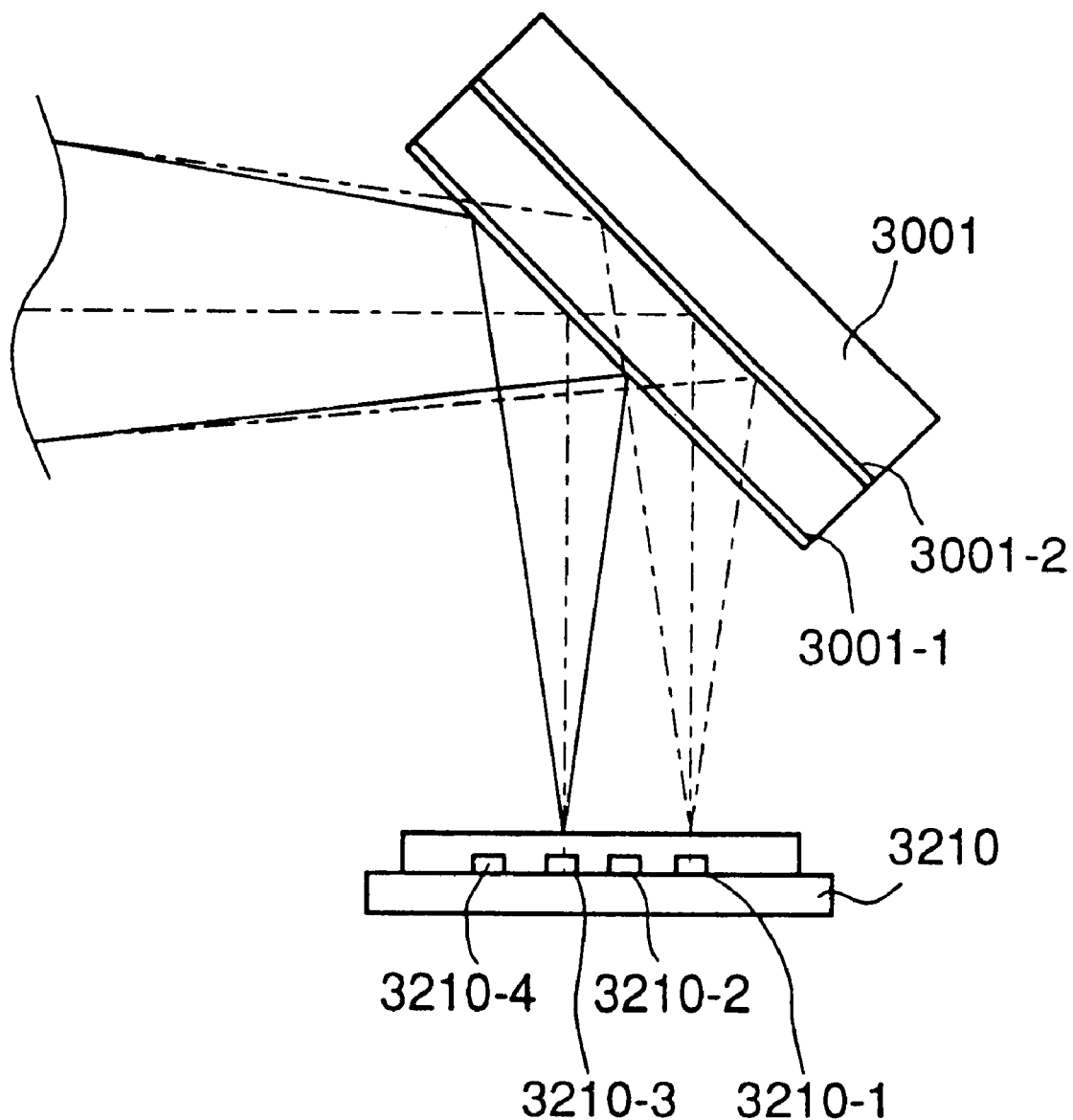
FIG. 50 is a magnified view of the reading unit.

FIG. 50 shows the configuration, after the light beams emerge from the lens, of a reading optical system employing the device of the present embodiment. The light beam emerging from the lens is split into two by the half mirror 3001-1 constituting a first plane of the device and the reflected light is focused on the visible light sensor, while the transmitted light is reflected by the mirror 3001-2 constituting a second plane, thereby being subjected to the correction of the optical path length, and is focused on the sensor for the IR light.

In this configuration, the difference L in the optical path length between the visible light and the infrared light is represented by:

$$L = 2d(2n - 1 - n^2 \sin^2\theta)/n \cos\theta$$

while the distance y of separation between the visible light beam and the infrared light beam is represented by:

$$y = 2d \tan^2\theta \cos\theta'(\sin\theta' = n \sin\theta)$$

wherein d is the distance between the half mirror 3001-1 and the mirror 3001-2, n is the refractive index of the material present between said half mirror and said mirror, and θ is the incident angle of the light beam into the mirror. In the present embodiment, the desired value of L is about 0.3 to 0.4 mm. For L=0.35 mm and refractive index n=1.51633, the distance d and the separation distance y are uniquely determined for a given value of the incident angle.

Figure 53:
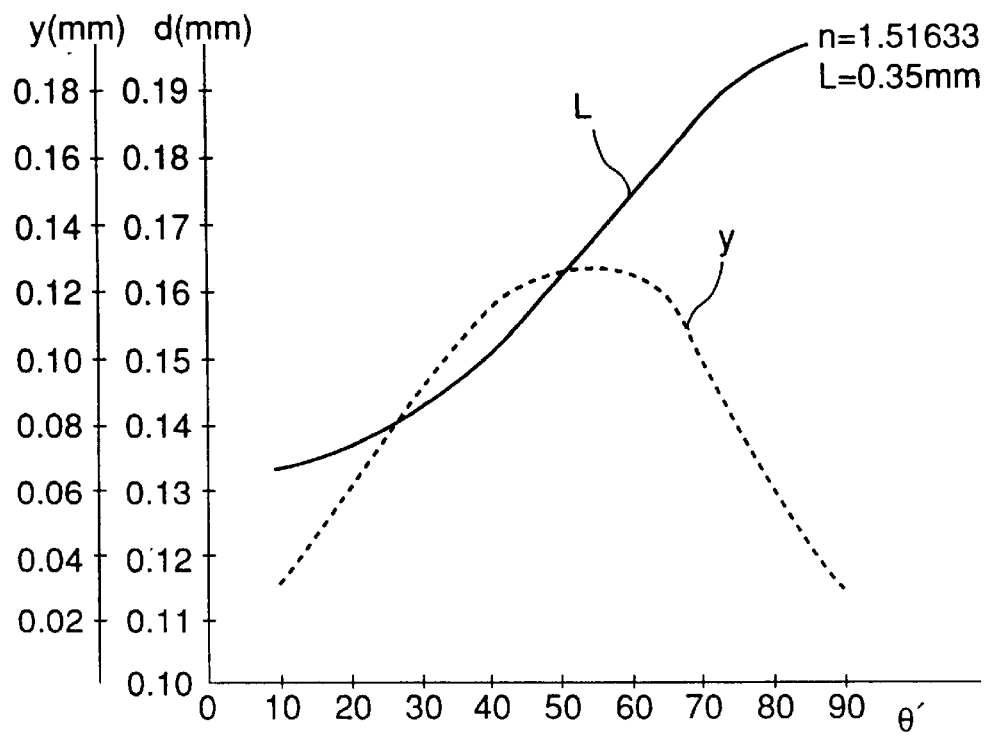
FIG. 53 is a chart showing the distance between the optical path correcting mirror and the half mirror and the distance of separation between the visible and infrared lights as a function of the light incident angle.

FIG. 53 shows the distance d and the separation distance y as a function of the incident angle. As will be understood from FIG. 53, if the incident angle is selected in a range of 50° to 60°, the separation distance y becomes 0.118–0.119 mm, so that the fluctuation in the separation distance between the visible light beam and the infrared light beam, resulting from the fluctuation in the incident angle, can be suppressed to the order of 1 μm. Also for a pixel size of 10 μm, the aberration from a multiple 120 μm of the pixel size (12 times in this case) becomes the order of 2 μm, so that the line interpolation of the visible light beam and the infrared light beam can be satisfactorily achieved.

As will be understood from FIG. 47, the optical system is usually so designed as to provide a satisfactory resolving power in the visible region, so that the focus position becomes aberrated in the infrared or ultraviolet fluorescent region and the resolving power becomes deteriorated. The correction of said deteriorated resolving power, if made by the lens itself, requires a significant increase in the number of lens elements, inevitably resulting in undesirably low cost performance. For correcting said deterioration in the resolving power, therefore, the device 3001 for optical path splitting and for optical path length correction as shown in FIG. 50 is provided between the lens and the sensor. In this manner a desirable resolving power can be attained in the entire spectral range including the visible region and the infrared region.

In this case, the distance of separation between the visible light beam and the infrared light beam is selected as an integral multiple of the pixel size of the aforementioned 4-line sensor. Among the three line sensors for the visible light, the spatial aberration in the sub scanning direction is corrected by line delay elements as explained before. If said distance of separation is so selected that the image reading position of the line sensors subjected to said line delay becomes equal to that of the line sensor not subjected to said line delay, the line delay element can be dispensed with for the infrared sensor.

Figure 52:
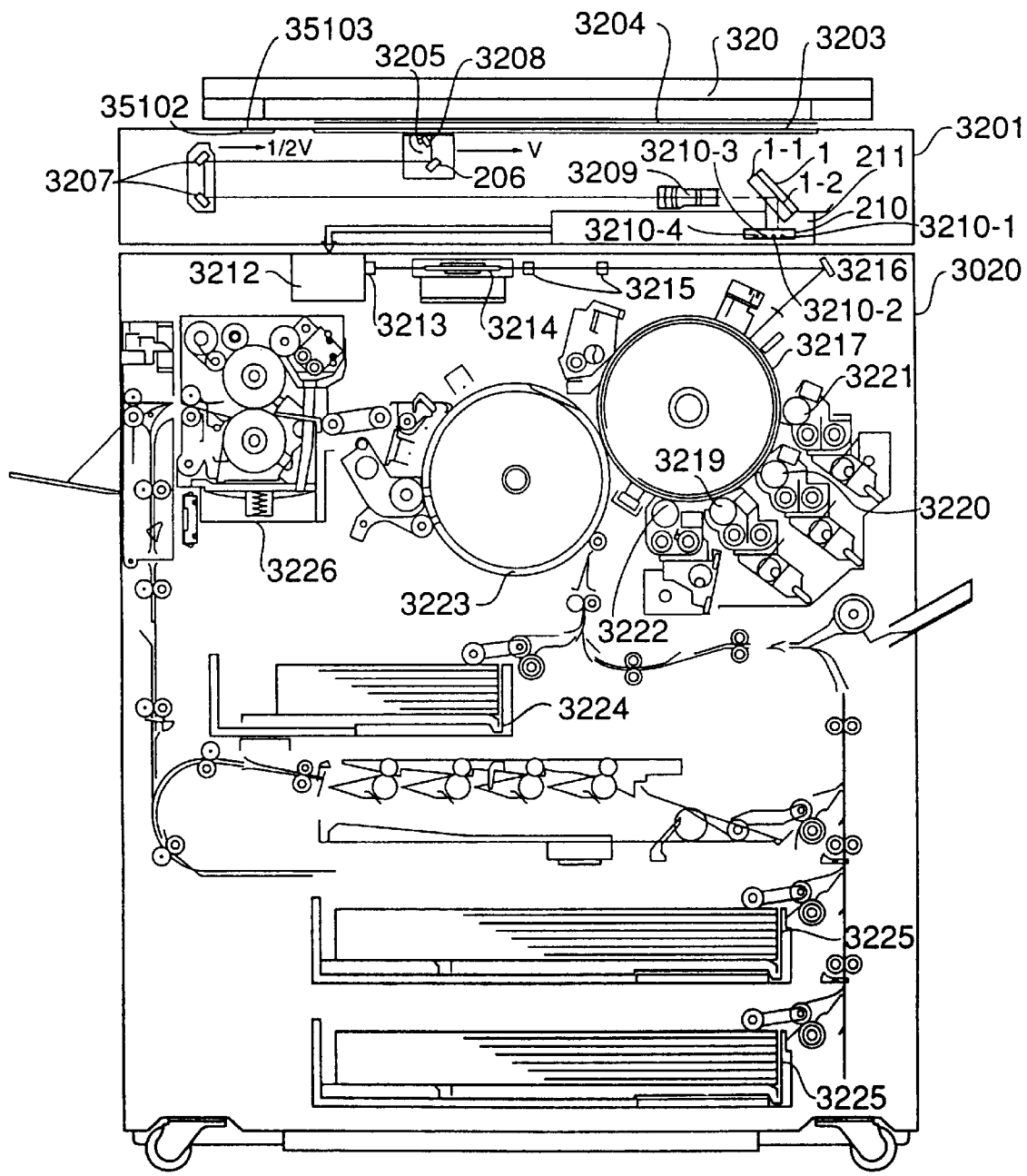
FIG. 52 is a view showing the structure of a color copying apparatus.

FIG. 52 shows the structure of a copying apparatus employing the present embodiment. Said apparatus is different from the apparatus shown in FIG. 36, in that the device 3001 is provided for the optical path length correction.

(Embodiment 3-8)

The foregoing embodiment employs a mirror having a high reflectance in the infrared region, but, in the present embodiment, it is replaced by a dichroic mirror capable of cutting off the visible light as shown in 3210-1, whereby the CCD sensor for the IR light need not be provided with the visible cut-off filter and can be prepared in a more simple manner. Also, different from the pigment or dye filter to be provided on the CCD sensor, the dichroic filter can arbitrarily select the visible cut-off region, so that the precision of separation of the visible and infrared lights can be improved.

(Embodiment 3-9)

Figure 54:
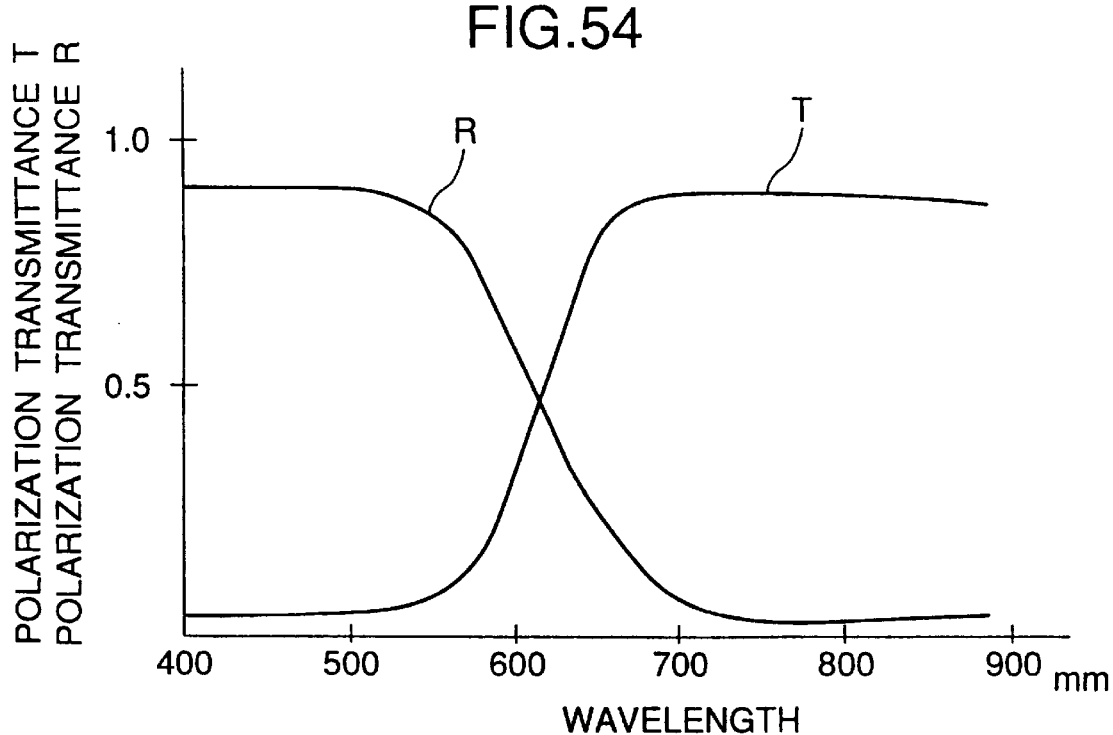
FIG. 54 is a chart showing the spectral characteristics of the dichroic mirror.

The foregoing embodiments employ a half mirror for separating the visible and infrared lights, but, in the present embodiment, it is replaced by a dichroic filter of the characteristics shown in FIG. 54, whereby the light of the desired visible region only is guided by reflection to the CCD for visible image reading. As a result, the filter of said CCD sensor need not have the capability of cutting off the infrared light as shown in FIG. 41 but can be composed of the conventional CCD filter so that the preparation of the CCD can be simplified.

(Embodiment 3-10)

The foregoing embodiment 3-7 employs a 4-line sensor of the monolithic structure, but the same configuration may be applied to an equal-size optical system employing a short-focus lens array as shown in FIG. 45. In this case, there is employed a 2-line sensor 12802 consisting of an RGB in-line sensor 12802-2 for visible light reading and an IR sensor 12802-1 for IR light reading, as shown in FIG. 46. In case of such lens array, the present invention is particularly effective, since the correction of the aberration in the focus position depending on the wavelength is almost impossible by an increase in the number of lens elements, as in the case of the reduction optical system but has to be made in the improvement of the glass composition as it is composed of a single lens.

As explained in the foregoing, the embodiments explained above of the present invention enable detection of the copy prohibited original, utilizing the detection of the infrared fluorescent ink which is substantially transparent in the visible region, without influencing the practical use in the visible light region.

Also satisfactory image reading can be realized without mixed presence of information in the visible and infrared regions, by employing suitable cut-off filters for excluding the light of other wavelength regions in the signal for detecting the infrared fluorescent information and in the signal for reading the visible information.

Also for the copy prohibited original, the ordinary copying operation can be prohibited by recording information, not identifiable in the visible light, in the form of visible information.

Also satisfactory image reading with a high resolving power can be realized in a wide spectral range including the visible and infrared regions, by providing means for correcting the focus positions of the signal for detecting the infrared fluorescent information and the signal for reading the visible information.

Also satisfactory image reading with a high resolving power can be realized in a wide spectral range including the visible and infrared regions, by providing means for satisfactorily separating the signal for detecting the infrared fluorescent information and the signal for reading the visible information and correcting the focus positions of said signals.

The solid-state image reading device may be composed, in addition to the charge-coupled device (CCD) mentioned above, of a MOS sensor or an amplifying device in which a capacitative load is connected to the emitter of a phototransistor, as disclosed in the U.S. Pat. No. 4,791,469 allowed to the inventors T. Ohmi and N. Tanaka.

As explained in the foregoing, the embodiments explained above enables satisfactory reading of the light of the visible region and the invisible region.

The photoelectric converting device of the present invention achieves satisfactory spectral sensitivity characteristics and satisfactory resolving power, through the combination of a photoelectric converting element sensitive to the visible light and an infrared-visible light converting element.

The photoelectric converting element to be employed in the present invention is advantageously composed of an element absorbing the light of the visible region and converting the same into an electrical signal. Examples of such element include a photovoltaic element such as a photodiode, or a photoconductive element such as a phototransistor.

Also the infrared-visible light converting element to be employed in the present invention is preferably composed of an element utilizing:

1) infrared exhaustion effect;
2) multi-step energy transmission; or
3) infrared extinction effect.

Figure 57:
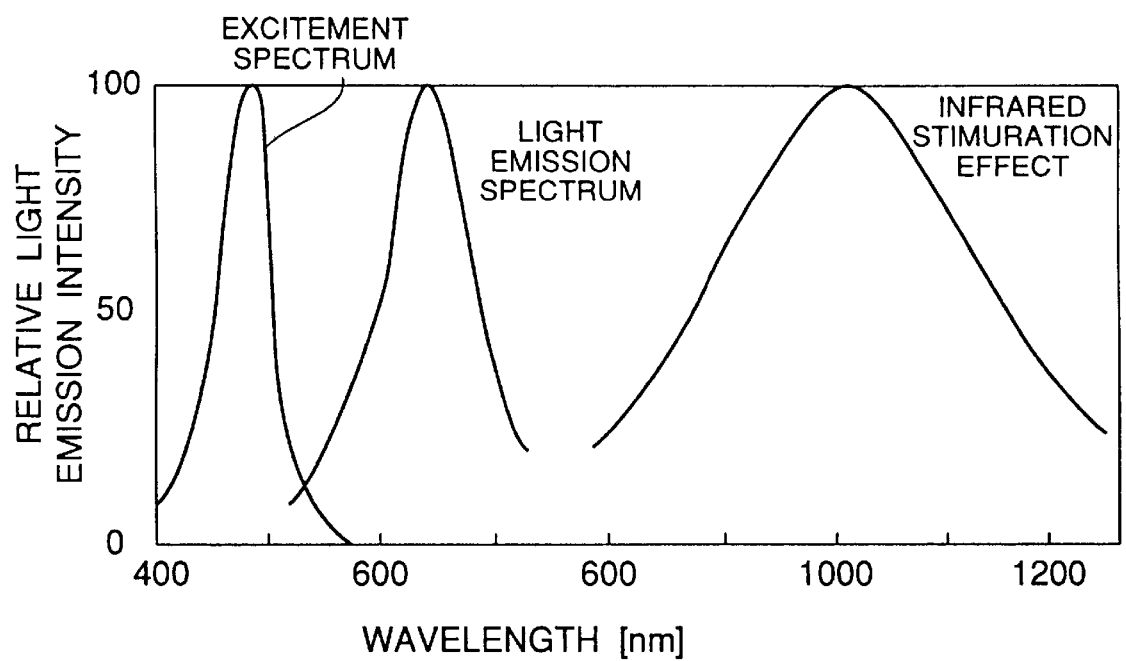
FIG. 57 is a spectral chart showing the infrared exhausting effect.

The element utilizing the infrared exhaustion effect is to irradiate a fluorescent material, excited to a semistable state by the irradiation of the light of a short wavelength, with infrared light thereby generating the fluorescent light in the visible region. FIG. 57 shows an example of the exciting spectrum, infrared exhausting spectrum and light emission spectrum.

Such element is preferably composed of a fluorescent material such as ZnS or SrS doped with a transient metal.

The irradiation of the short-wavelength exciting light may be conducted between the sequence of image reading or simultaneously with the irradiation of the infrared light, but a filter is preferably used, in order that said short-wavelength exciting light does not enter the photocell part.

The element for effecting infrared-visible conversion by multi-step energy transmission preferably employs a material such as $NaWO_4$ doped with $Yb^{3+}$, $Y_{0.84}Yb_{0.15}Er_{0.01}F_3$, $NaY_{0.69}Yb_{0.30}Er_{0.01}F_4$, $BaY_{1.34}Yb_{0.60}Er_{0.60}F_8$, $Y_{0.74}Yb_{0.25}Er_{0.01}OCl$ or $Y_{0.65}Yb_{0.35}Tm_{0.001}F_3$, and these materials generate visible light by the energy transmission in two or three steps from $Yb^{3+}$ to the light emission center.

The element utilizing the infrared extinction effect relies on a phenomenon, when a fluorescent material excited with a fluorescent lamp for example of neat-ultraviolet region is irradiated with infrared light, the light emission is extinguished in the irradiated portion. Such element is preferably composed of ZnS doped with CuAl.

(Embodiment)

Figure 55:
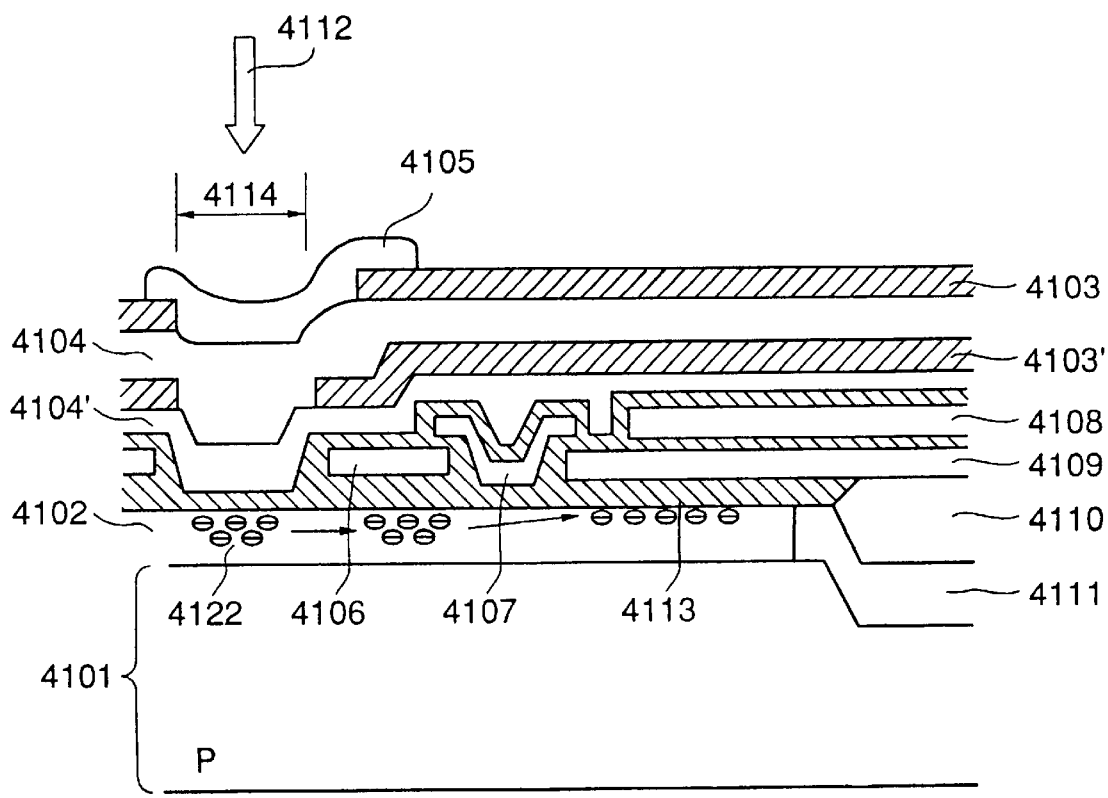
FIG. 55 is a schematic cross-sectional view of an example of the photoelectric converting device of the present invention.

FIG. 55 is a schematic cross-sectional view of a CCD image sensor employing an embodiment of the photoelectric converting element of the present invention.

In a P—Si silicon substrate 4101, a photocell area 4102 having an n⁻ Si area is formed as the photoelectric converting element. The photocarriers 4122 generated by the incident light 4112 are collected in the photocell 4102, then transferred by a polysilicon electrode 4106 of the accumulation unit, a polysilicon electrode 4107 of the transfer unit, and polysilicon electrodes 4108, 4109 of the buried-channel CCD register unit, and taken out as an output signal from an output gate.

Each pixel is isolated by a P⁺ Si channel stopper 4111 and a field oxide layer 4110.

In order to avoid light entry except for the photocell, aluminum light-intercepting layers 4103, 4103' are doubly provided, utilizing insulation layers 4104, 4104' whereby the incident light 4112 only enters an aperture 4114 in which an infrared-visible light converting element 4105 is provided.

Consequently the incident light 4112 is converted, by said element 4105, into the light of a wavelength in the visible region, and thus converted light is converted into the carriers, by the photocell 4102 having satisfactory sensitivity for the visible light. Such photocell 4102 has been developed for many years and, since the photocell structure for the visible light can be employed, the complex photocell structure for the infrared light is not required.

In the image reading device shown in FIG. 55, with the aperture 4114 of a size of 13 μm and irradiated with the light of 800 nm, utilizing the IR Phosphor Plate consisting of Mn-doped SrS and prepared by Eastman Kodak Co. as the infrared-visible light converting element, there was obtained a signal intensity ratio as high as 50 dB in comparison with the adjacent pixel completely shielded from the light.

A similar measurement when said infrared-visible light converting element was replaced by a known visible cut-off filter provided an insufficient signal intensity ratio of 20 dB to the adjacent pixel, and the output was as low as ½ of the output when the infrared-visible light converting element was employed.

Figure 56:
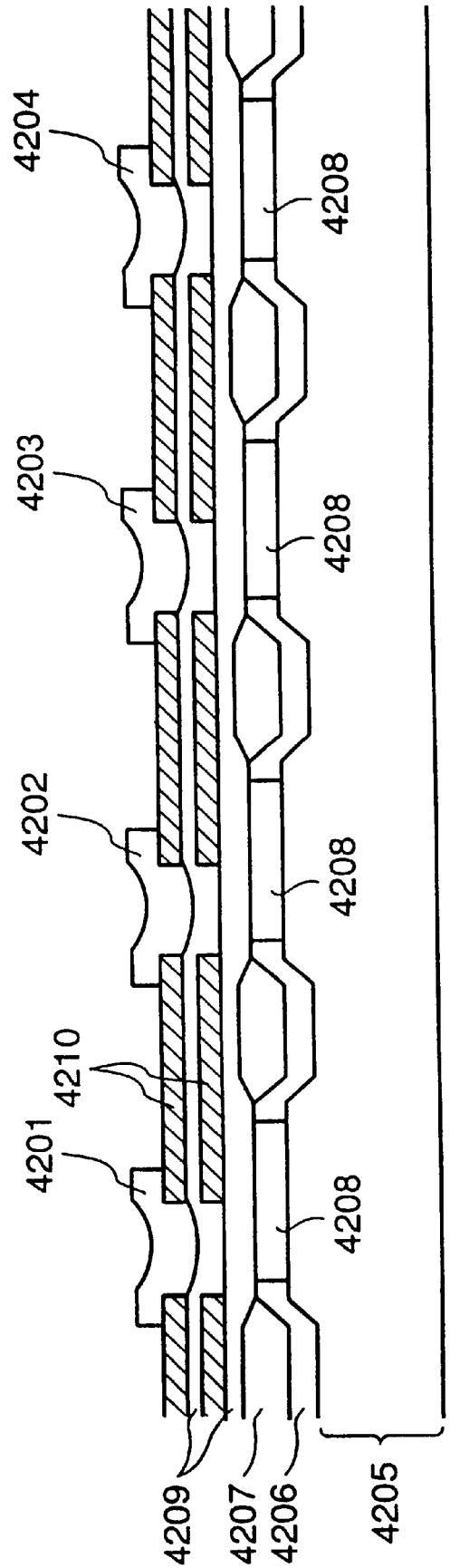
FIG. 56 is a schematic cross-sectional view of another example of the photoelectric converting device of the present invention.

FIG. 56 shows an example of the image reading device utilizing the photoelectric converting element of the present invention, applied to a full-color image reading.

On photocells 4208 there are provided wavelength selecting filters, consisting of a blue transmitting filter 4201, a green transmitting filter 4202 and a red transmitting filter 4203, by means of which the visible optical signals are read. Also the photoelectric conversion by way of infrared light-visible light-carriers is achieved by the combination of an element 4204 composed of an infrared-visible light converting material and a photocell 4208' provided thereunder and having sensitivity to the visible light.

Since such photocells 4208, 4208' can be prepared with a same material in a same process, they are advantageously employed in the image sensor consisting of integrated semiconductor circuits, for effecting the detection in the visible and invisible regions.

Figure 58:
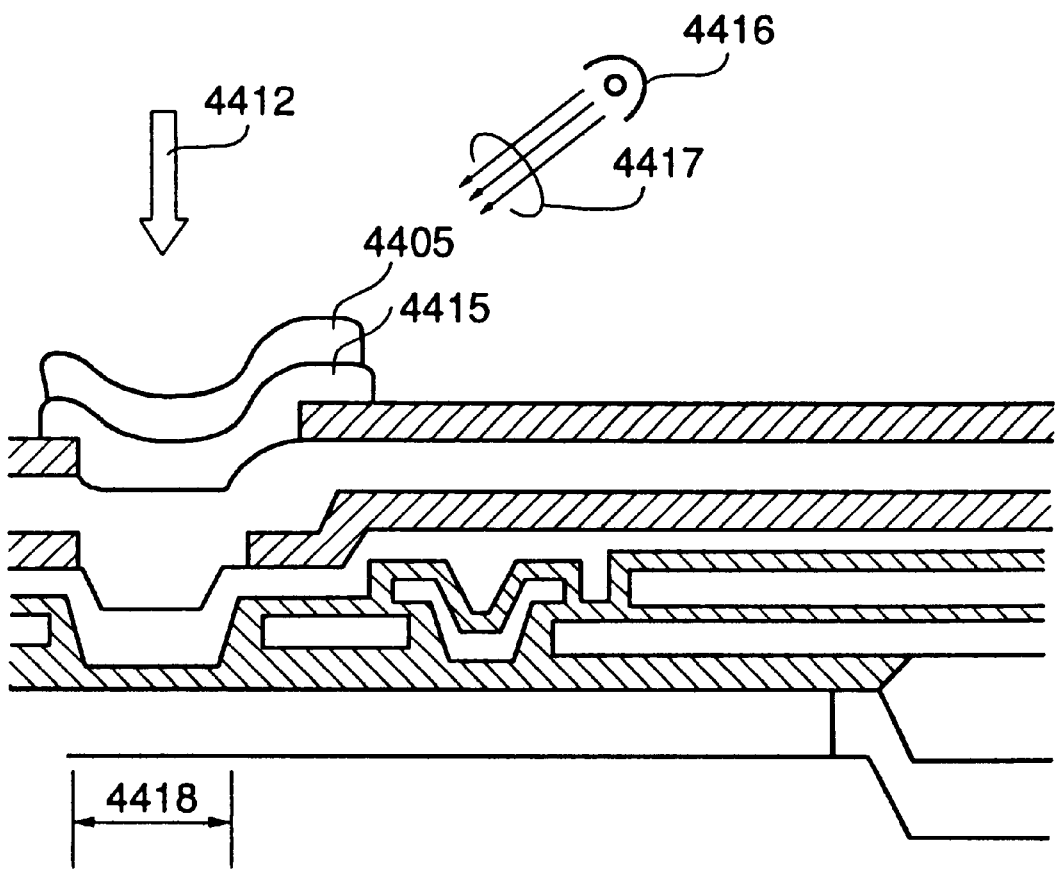
FIG. 58 is a schematic cross-sectional view of the photoelectric converting device of the present invention, utilizing the infrared exhausting effect.

FIG. 58 shows an example utilizing the infrared extinction effect.

A fluorescent lamp 4416 emits the exciting light 4417 to generate fluorescent light from an infrared-visible light converting element 4405 consisting of an infrared extinction material, into which the infrared light 4412 enters to extinguish the fluorescent light in the irradiated position. A filter 4415 only transmits the light generated by said infrared-visible light converting element 4405, thus introducing the fluorescent light into a photocell 4418. In response to the entry of the infrared light 4412, the fluorescent light is extinguished, whereby the photocell 4418 no longer receives the incident light and the photocarriers are no longer generated.

As explained in the foregoing, the use of an infrared-visible converting element in the photoelectric converting device provides satisfactory sensitivity and excellent resolving power even in the detection of the infrared optical signal.

What is claimed is:

1. An image information processing apparatus comprising:

reading means having a first sensor for converting an optical signal of the visible region into a first electrical signal and a second sensor for converting an optical signal of the invisible region into a second electrical signal, wherein a light-receiving face of the first sensor is offset with respect to the incident direction of the light from a light-receiving face of the second sensor;

image forming means for forming an image based on said first electrical signal;

discrimination means for effecting discrimination based on said second electrical signal and a reference signal; and control means for controlling the function of said image forming means based on the output of said discrimination means.

2. An information processing apparatus according to claim 1, wherein the optical signal of the invisible region is comprised of an optical signal of the infrared region.

3. An information processing apparatus according to claim 1, wherein the light-receiving face of the first sensor is offset in stepped relation with respect to the incident direction of light from the light-receiving face of the second sensor.

4. An information processing apparatus according to claim 1, wherein the light-receiving face of the first sensor is offset in inclined relation with respect to the incident direction of light from the light-receiving face of the second sensor.

5. An information processing apparatus according to claim 1, wherein said image reading device is comprised of multiple arrays of plural first and second sensors, each array extending in a direction traverse to the incident direction of light, and wherein each light-receiving face of each first sensor is offset with respect to the incident direction of light from each light-receiving face of each second sensor.

6. An information processing apparatus according to claim 5, wherein each of the second sensors corresponds to a signal first sensor.

7. An information processing apparatus according to claim 5, wherein said image forming means forms a color image, and wherein each of the second sensors corresponds to plural ones of the first sensors.

8. An image reading device having a first sensor for converting an optical signal of the visible region into a first electrical signal and a second sensor for converting an optical signal of the invisible region into a second electrical signal, wherein a light-receiving face of the first sensor is offset with respect to the incident direction of light from a light-receiving face of the second sensor, and
wherein the light-receiving face of the first sensor is offset in stepped relation with respect to the incident direction of light from the light-receiving face of the second sensor.

9. An image reading device having a first sensor for converting an optical signal of the visible region into a first electrical signal and a second sensor for converting an optical signal of the invisible region into a second electrical signal, wherein a light-receiving face of the first sensor is offset with respect to the incident direction of light from a light-receiving face of the second sensor, and
wherein the light-receiving face of the first sensor is offset in inclined relation with respect to the incident direction of light from the light-receiving face of the second sensor.

10. An image reading device having a first sensor for converting an optical signal of the visible region into a first electrical signal and a second sensor for converting an optical signal of the invisible region into a second electrical signal, wherein a light-receiving face of the first sensor is offset with respect to the incident direction of light from a light-receiving face of the second sensor, and
wherein said image reading device is comprised of multiple arrays of plural first and second sensors, each array extending in a direction traverse to the incident direction of light, and wherein each light-receiving face of each first sensor is offset with respect to the incident direction of light from each light-receiving face of each second sensor.

11. An image reading device according to claim 10, wherein each of the second sensors corresponds to a signal first sensor.

12. An image reading device according to claim 10, wherein each of the second sensors corresponds to plural ones of the first sensors.

13. An image information processing apparatus comprising:

illumination means for illuminating an original to obtain an optical signal;

image reading means for reading the optical signal, said image reading means comprising (1) a first array of photoelectric conversion elements, arranged in a line, for respectively converting red, green and blue light of the optical signal into electrical signals, and (2) a second array of photoelectric conversion elements, arranged in another line, for converting light not comprising red, green or blue light of the optical signal into electrical signals, said first and second arrays being arranged in the two lines on a common substrate;

image forming means for forming an image from the electrical signals of said first array of photoelectric conversion elements;

discrimination means for discriminating the electrical signals of said second array of photoelectric conversion elements from a reference signal; and control means for controlling an operation of said image forming means based on an output from said discrimination means.

14. An image information processing apparatus comprising:

illumination means for illuminating an original to obtain an optical signal;

image reading means for reading the optical signal, said image reading means comprising (1) a first array of photoelectric conversion elements, arranged in a line, for respectively converting light of at least three different visible wavelength ranges of the optical signal into electrical signals, and (2) a second array of photoelectric conversion elements, arranged in another line, for converting non-visible light of the optical signal into electrical signals, said first and second arrays being arranged in the two lines on a common substrate;

image forming means for forming an image from the electrical signals of said first array of photoelectric conversion elements;

discrimination means for discriminating the electrical signals of said second array of photoelectric conversion elements from a reference signal; and control means for controlling an operation of said image forming means based on an output from said discrimination means.

15. An image reading device comprising:

a first array of photoelectric conversion elements, arranged in a line, for respectively converting light of at least three different, visible wavelength regions into electrical signals; and a second array of photoelectric conversion elements, arranged in another line, for converting non-visible light into electrical signals, said first and second arrays being arranged in the two lines on a common substrate, wherein said second array is equipped with a visible light cut-off filter.

16. An image reading device according to claim 15, wherein said first array and said second array are arranged so that said first and second arrays are offset laterally by a space corresponding to one pixel.

17. An image reading device according to claim 15, wherein with respect to an incident light direction, a light receiving face of the first array is offset from a light receiving face of the second array.

18. An image information processing apparatus comprising:

illumination means for illuminating an original to obtain an optical signal; and image reading means for reading the optical signal, said image reading means comprising (1) a first array of photoelectric conversion elements, arranged in a line, for respectively converting light of at least three different visible wavelength ranges of the optical signal into electrical signals, and (2) a second array of photoelectric conversion elements, arranged in another line, for converting non-visible light of the optical signal into electrical signals, said first and second arrays being arranged in the two lines on a common substrate, wherein said second array is equipped with a visible light cut-off filter.

19. An image information processing apparatus comprising:

illumination means for illuminating an original to obtain an optical signal;

image reading means for reading the optical signal, said image reading means comprising (1) a first array of photoelectric conversion elements, arranged in a line, for respectively converting light of at least three different visible wavelength ranges of the optical signal into electrical signals, and (2) a second array of photoelectric conversion elements, arranged in another line, for converting non-visible light of the optical signal into electrical signals, said first and second arrays being arranged in the two lines on a common substrate, wherein said second array is equipped with a visible light cut-off filter;

image forming means for forming an image from the electrical signals of said first array of photoelectric conversion elements;

discrimination means for discriminating the electrical signals of said second array of photoelectric conversion elements from a reference signal; and control means for controlling an operation of said image forming means based on an output from said discrimination means.

* * * * *

UNITED STATES PATENT AND TRADEMARK OFFICE
CERTIFICATE OF CORRECTION

PATENT NO.   : 6,094,281
DATED        : July 25, 2000
INVENTOR(S)  : Takehiko Nakai, et al.

It is certified that error appears in the above-identified patent and that said Letters Patent is hereby corrected as shown below:

Sheet 15
FIG. 15, "ARITMETIC" should read -- ARITHMETIC --.

Figure 19:
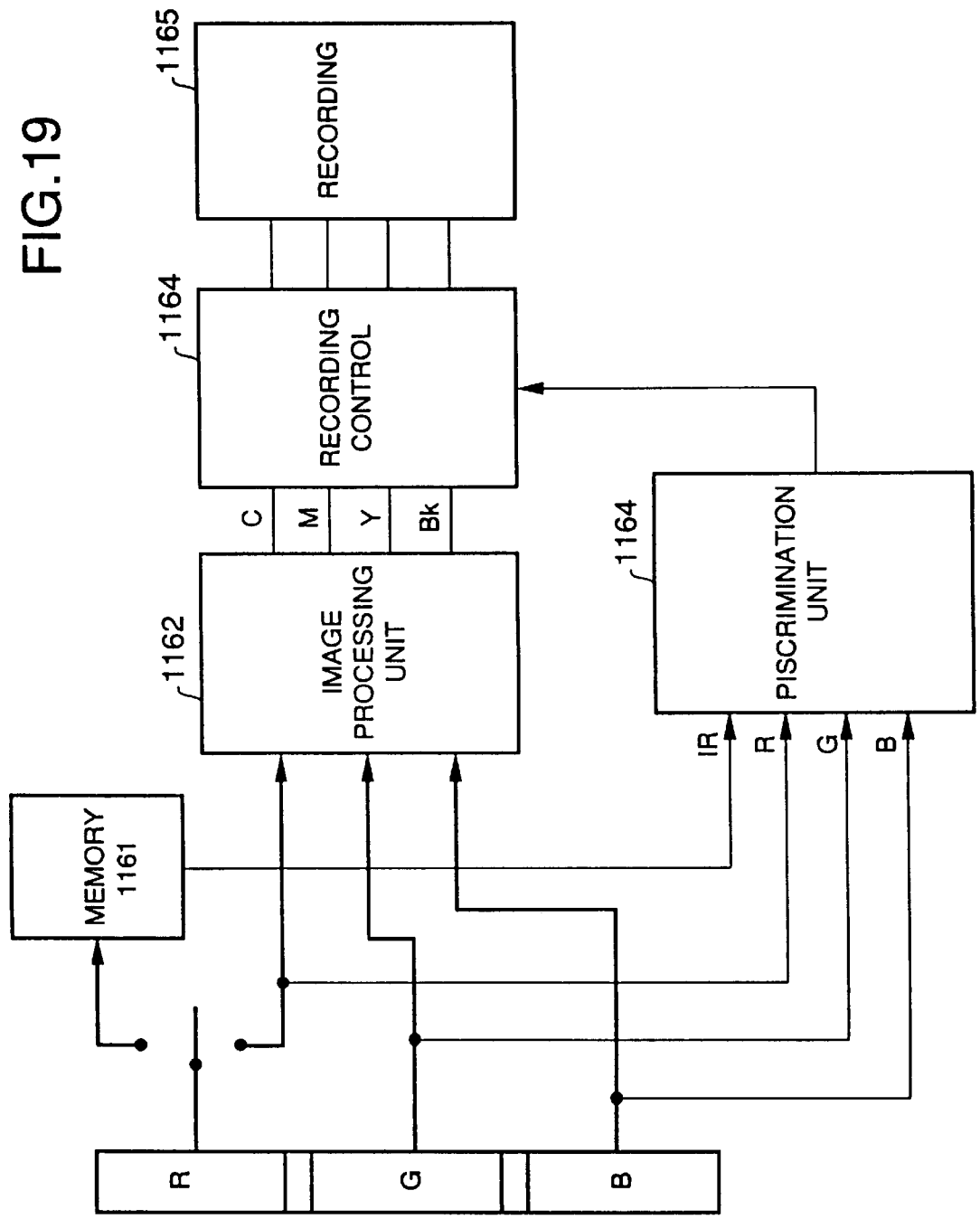
FIG. 19 is a block diagram of the embodiment.

Sheet 19
FIG. 19, "PISCRIMINATION" should read -- DISCRIMINATION --.

Figure 20:
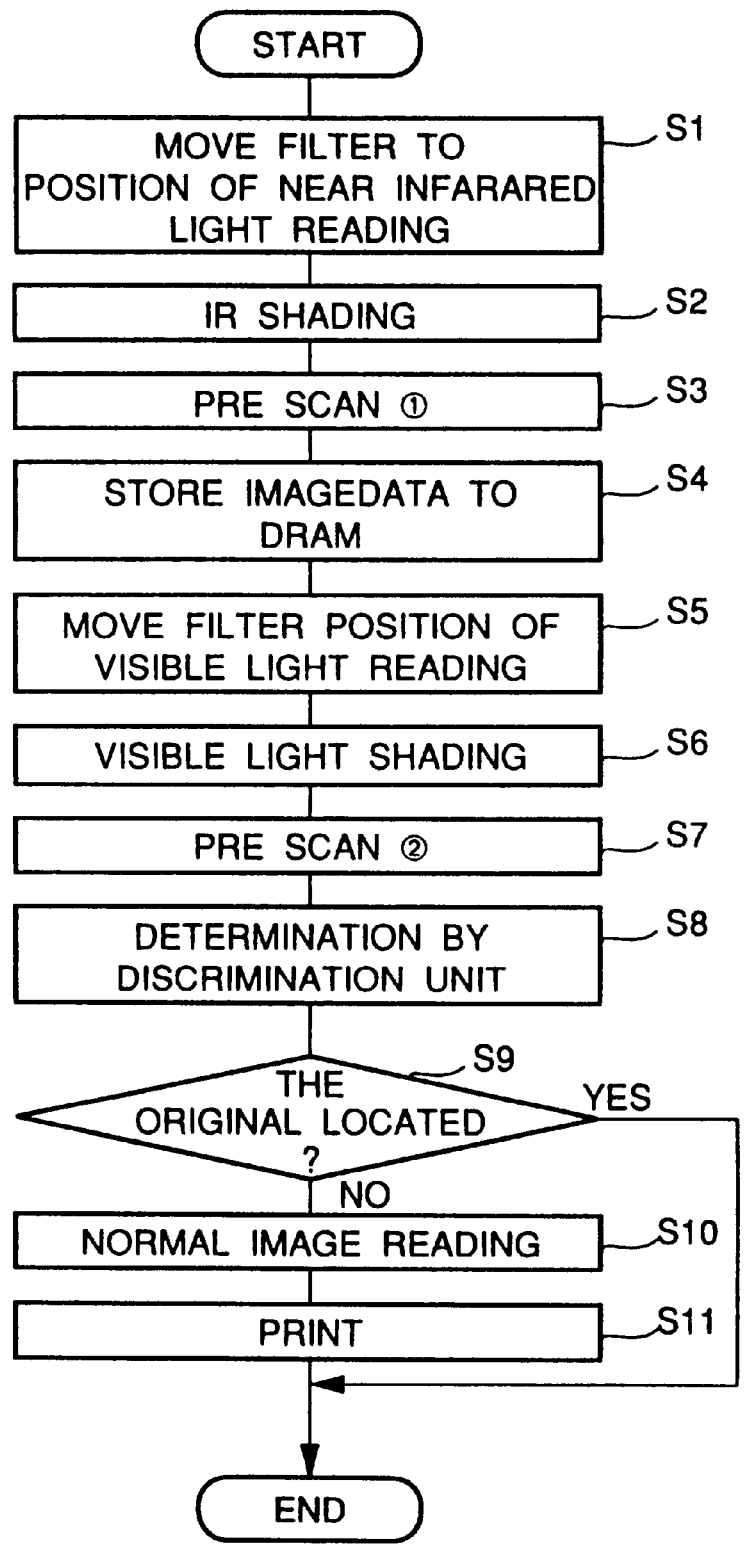
FIG. 20 is a flow chart of the control sequence of the embodiment.

Sheet 20
FIG. 20, "INFARARED" should read -- INFRARED --.

Sheet 49
FIG. 57, "STIMURATION" should read -- STIMULATION --.

Column 1
Line 43, "a" should be deleted.

Column 2
Line 49, "a" should be deleted.

Column 3
Line 51, "sensors" should read -- sensor --.

Column 4
Line 55, "machint" should read -- machine --.

UNITED STATES PATENT AND TRADEMARK OFFICE
CERTIFICATE OF CORRECTION

PATENT NO.    : 6,094,281
DATED         : July 25, 2000
INVENTOR(S)   : Takehiko Nakai, et al.

It is certified that error appears in the above-identified patent and that said Letters Patent is hereby corrected as shown below:

Column 6
Line 28, "lineosensor," should read -- line sensor, --.

Column 7
line 35, "cphotoelectric" should read -- photoelectric --.

Signed and Sealed this

Fourteenth Day of August, 2001

*Attest:*

*Attesting Officer*

NICHOLAS P. GODICI
*Acting Director of the United States Patent and Trademark Office*